(12) United States Patent
Minakata

(10) Patent No.: US 7,114,818 B2
(45) Date of Patent: Oct. 3, 2006

(54) OPTICAL SYSTEM, AND ELECTRONIC EQUIPMENT THAT INCORPORATES THE SAME

(75) Inventor: Hiroyuki Minakata, Hachioji (JP)

(73) Assignee: Olympus Corporation, Tokyo (JP)

( * ) Notice: Subject to any disclaimer, the term of this patent is extended or adjusted under 35 U.S.C. 154(b) by 0 days.

(21) Appl. No.: 11/119,264

(22) Filed: May 2, 2005

(65) Prior Publication Data

US 2005/0248861 A1    Nov. 10, 2005

(30) Foreign Application Priority Data

| May 6, 2004 | (JP) | ............................ 2004-137202 |
| Jun. 7, 2004 | (JP) | ............................ 2004-168492 |
| Jun. 7, 2004 | (JP) | ............................ 2004-168493 |
| Jun. 7, 2004 | (JP) | ............................ 2004-168494 |

(51) Int. Cl.
*G02B 5/10* (2006.01)
(52) U.S. Cl. .................................................... 359/859
(58) Field of Classification Search ................ 359/631, 359/633, 859, 833
See application file for complete search history.

(56) References Cited

U.S. PATENT DOCUMENTS

| 6,268,963 B1 | 7/2001 | Akiyama |
| 6,335,837 B1 | 1/2002 | Aratani et al. |
| 6,388,827 B1 | 5/2002 | Nagata et al. |
| 6,671,099 B1 | 12/2003 | Nagata |
| 2002/0097497 A1* | 7/2002 | Kamo .......................... 359/629 |
| 2002/0105734 A1 | 8/2002 | Kimura et al. |

* cited by examiner

*Primary Examiner*—Euncha P. Cherry
(74) *Attorney, Agent, or Firm*—Kenyon & Kenyon LLP

(57) ABSTRACT

The invention relates to a compact, slimmed-down, low-cost optical system and electronic equipment that incorporates the same. The optical system at least comprises a stop 2, at least one object-side reflecting surface 12 located on the object side with respect to the stop 2 and inclined from the optical axis of the optical system, at least one image-side reflecting surface 22, 23 located on the image side of the optical system with respect to the stop 2 and inclined from the optical axis, and an image pickup device 3. Regarding all reflecting surfaces inclined from the optical axis in the optical system, the reference plane for each reflecting surface is given by a plane defined by an entrance-side axial chief ray and a reflection-side axial chief ray regarding each reflecting surface. In the invention, the reference plane for at least one object-side reflecting surface 12 and the reference plane for at least one image-side reflecting surface 22, 23 cross at any angle, and at least one object-side reflecting surface 12 and at least one image-side reflecting surface 22, 23 have a rotationally asymmetric aspheric shape.

28 Claims, 50 Drawing Sheets

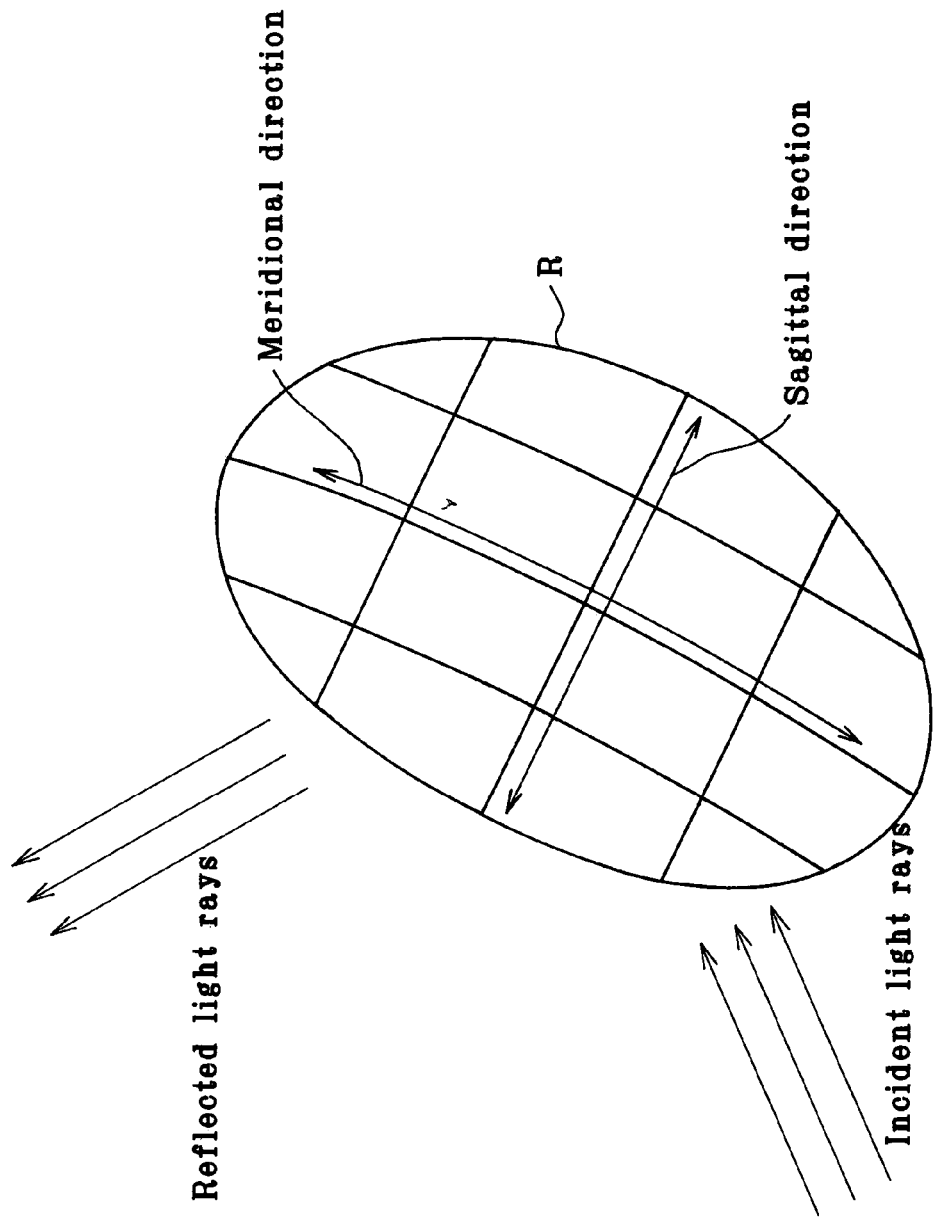

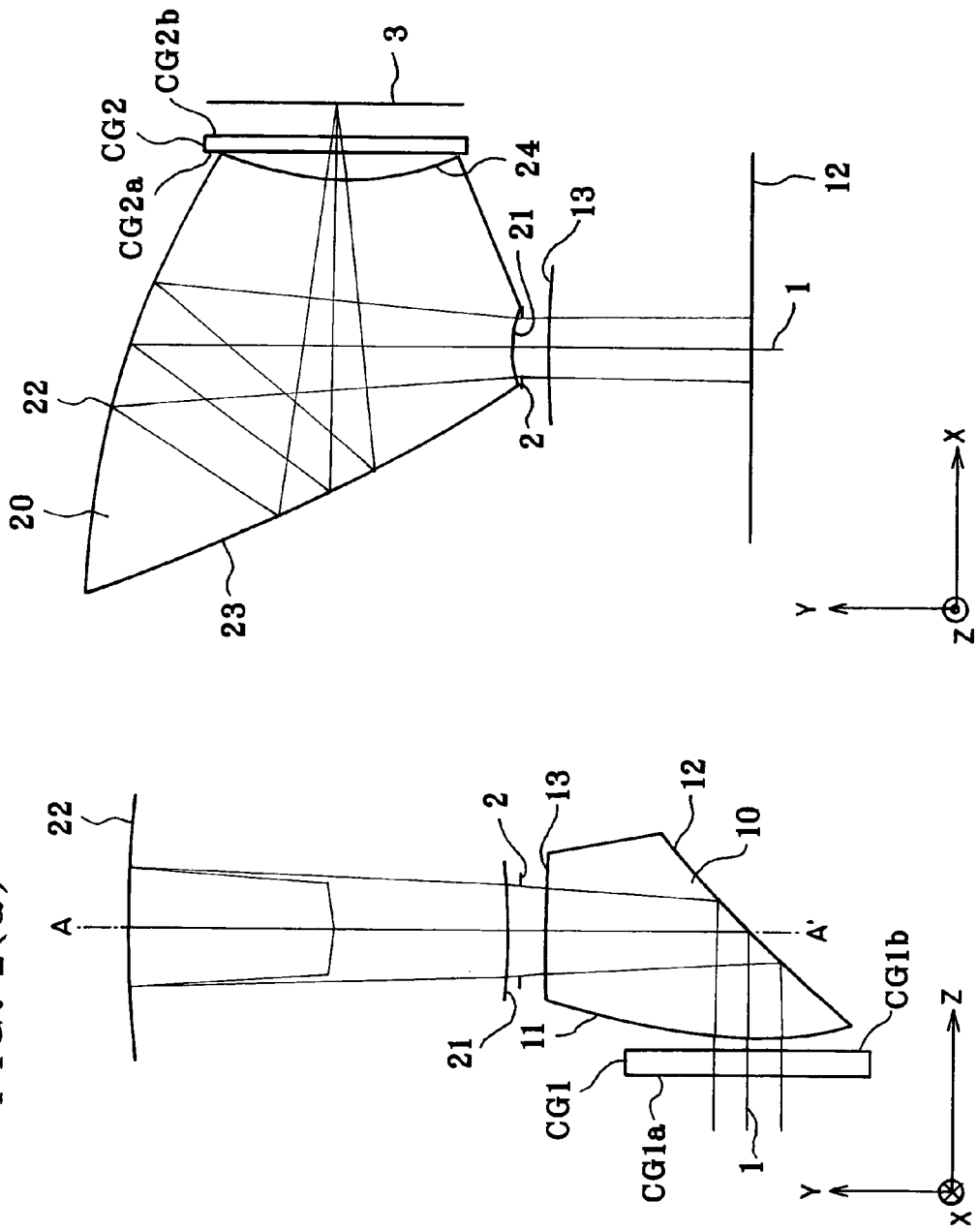

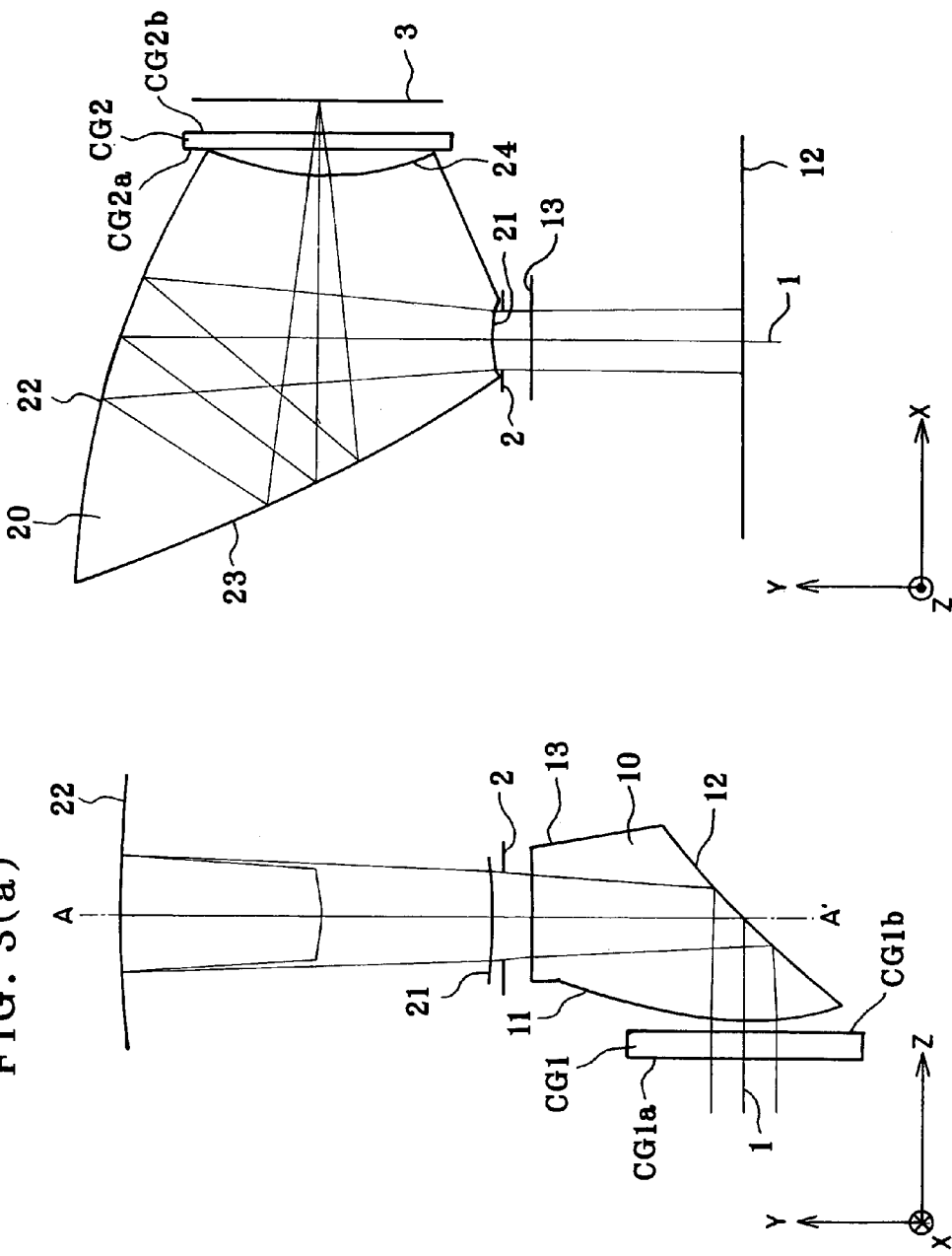

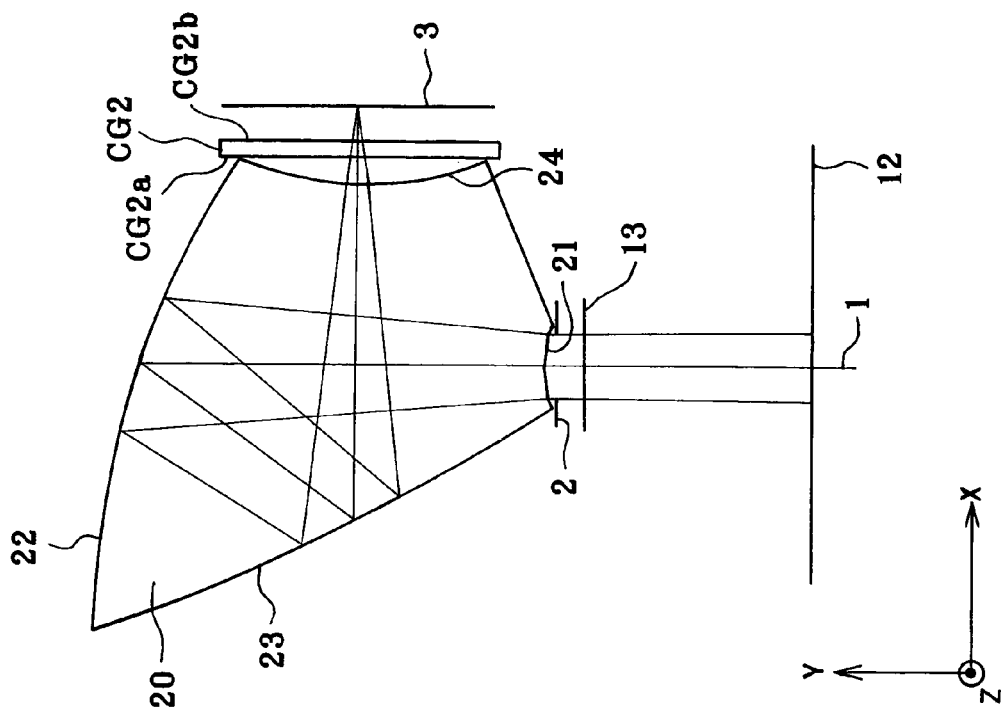
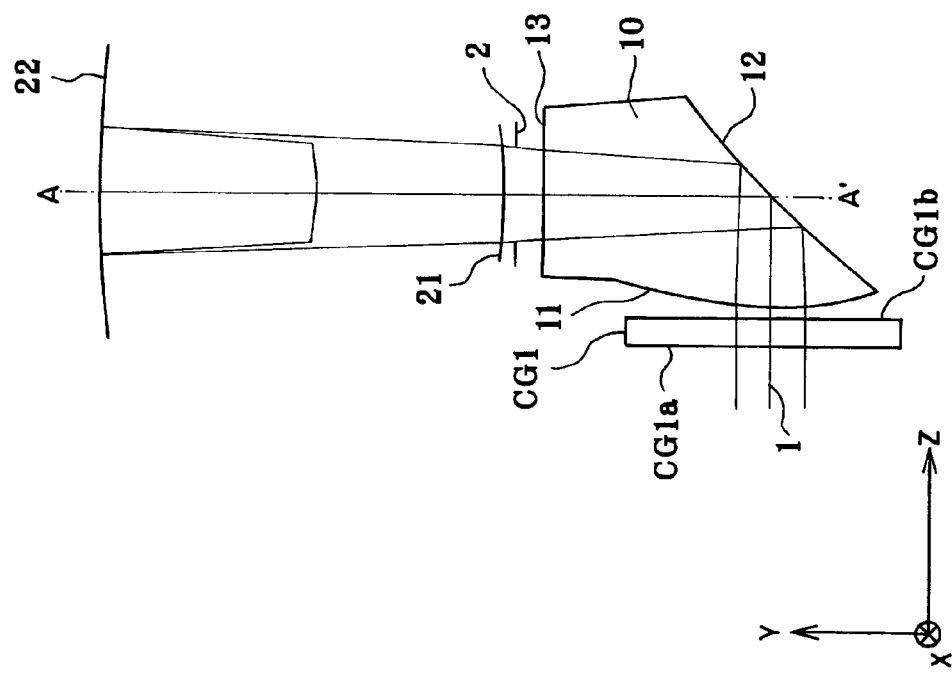

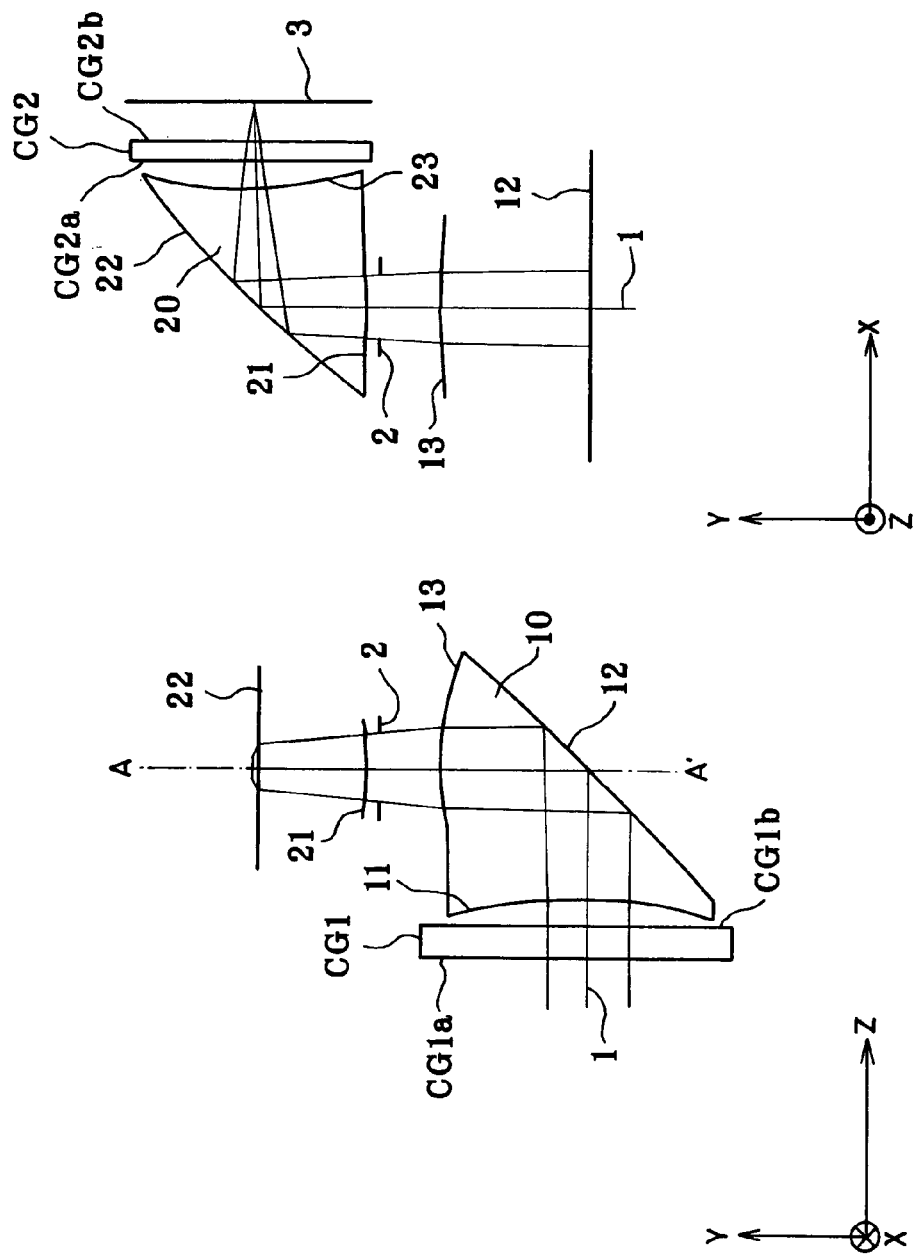

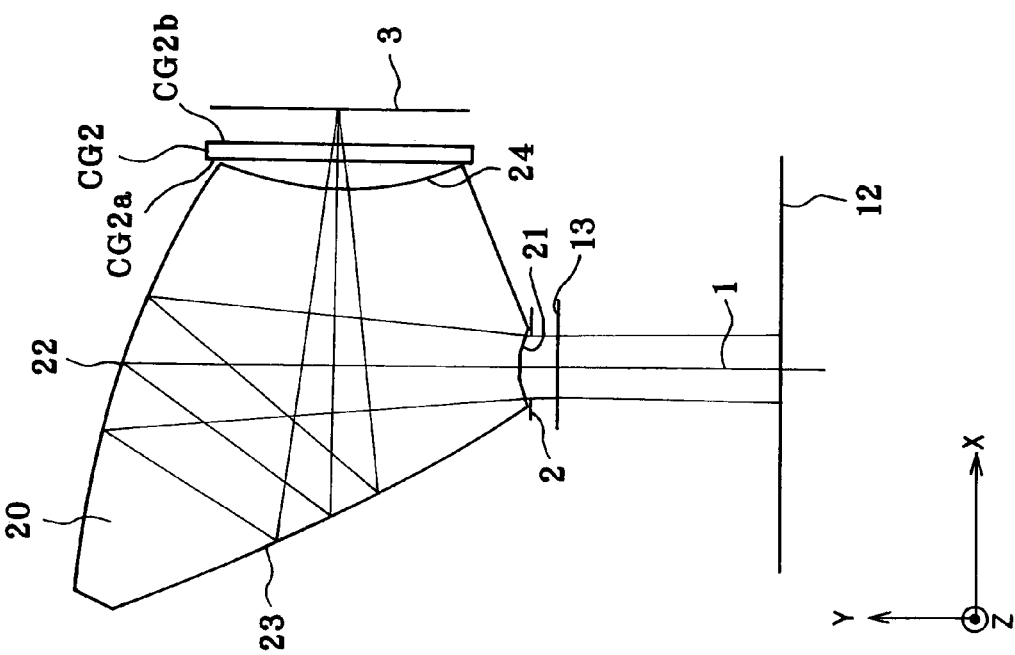
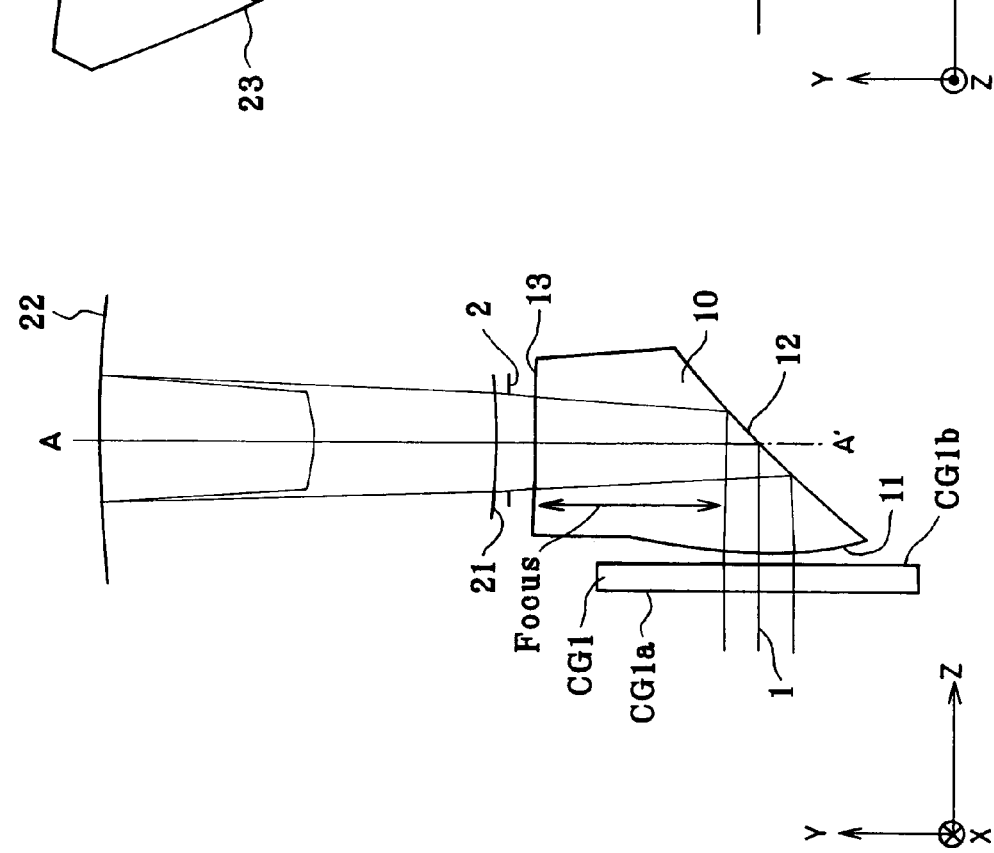

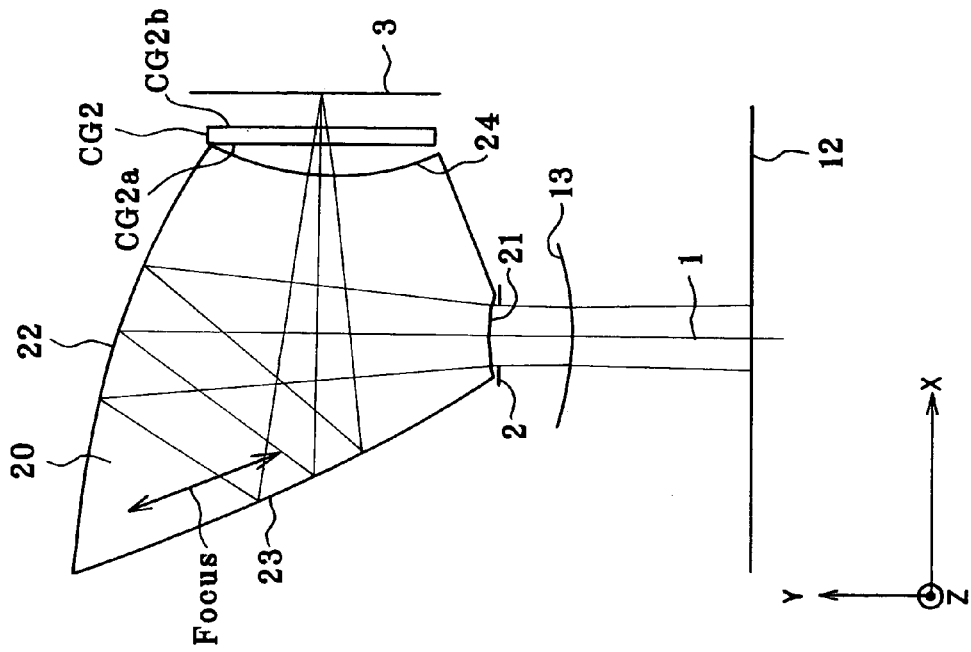
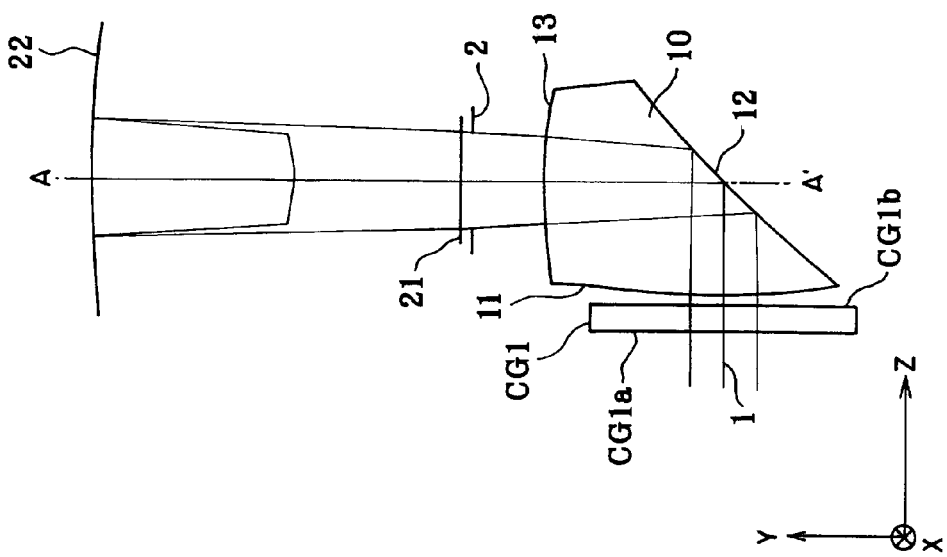

FIG. 31(q)
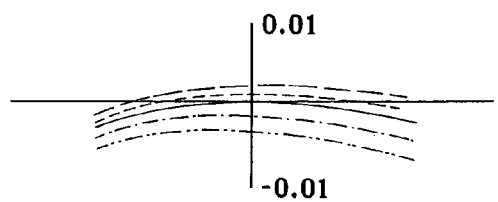
FIG. 31(r)
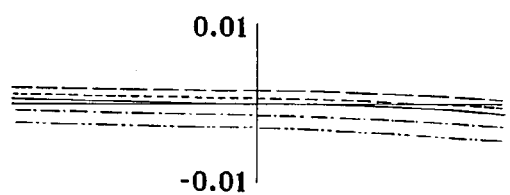
FIG. 31(o)
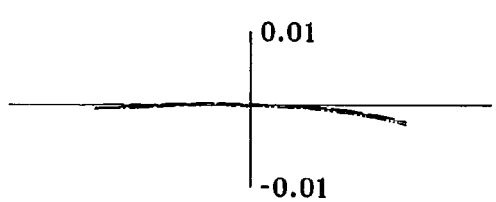
FIG. 31(p)
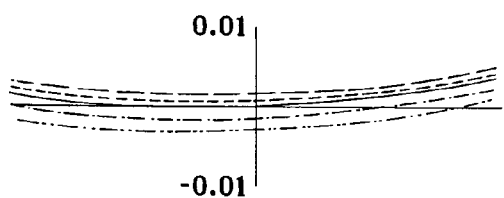
FIG. 31(m)
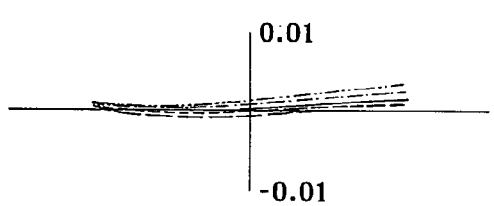
FIG. 31(n)
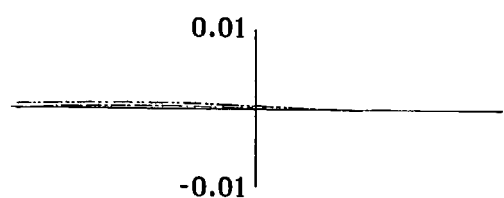
FIG. 31(k)
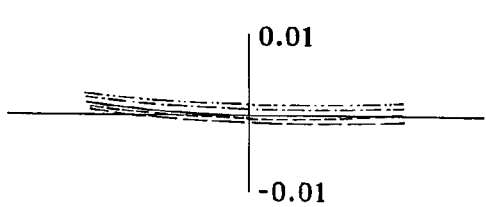
FIG. 31(l)

FIG. 55(a)
FIG. 55(b)
FIG. 55(c)
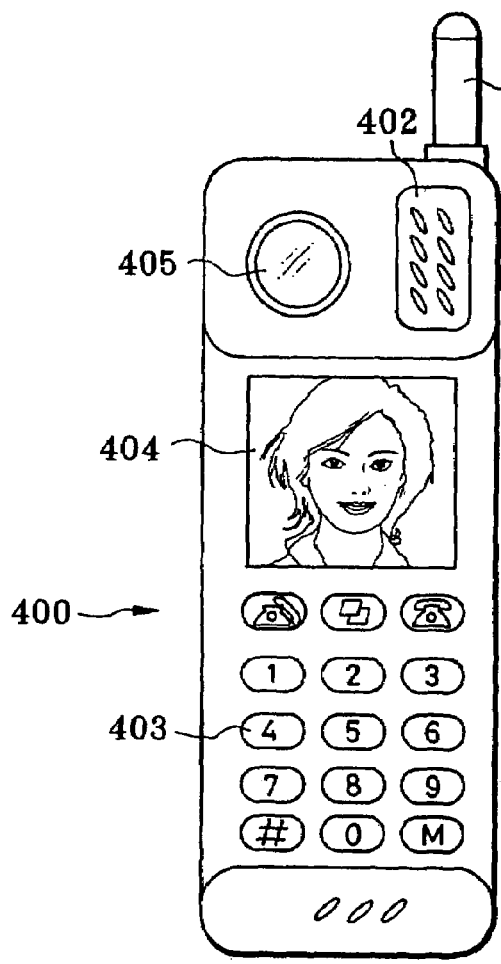
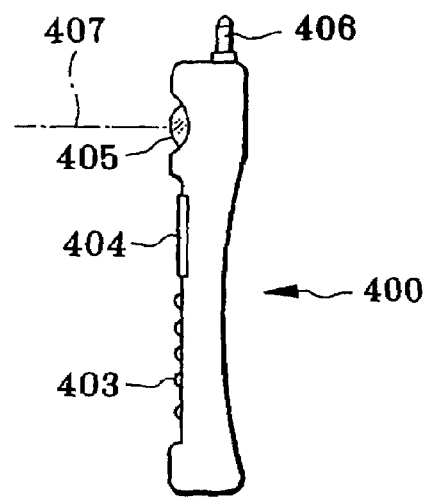
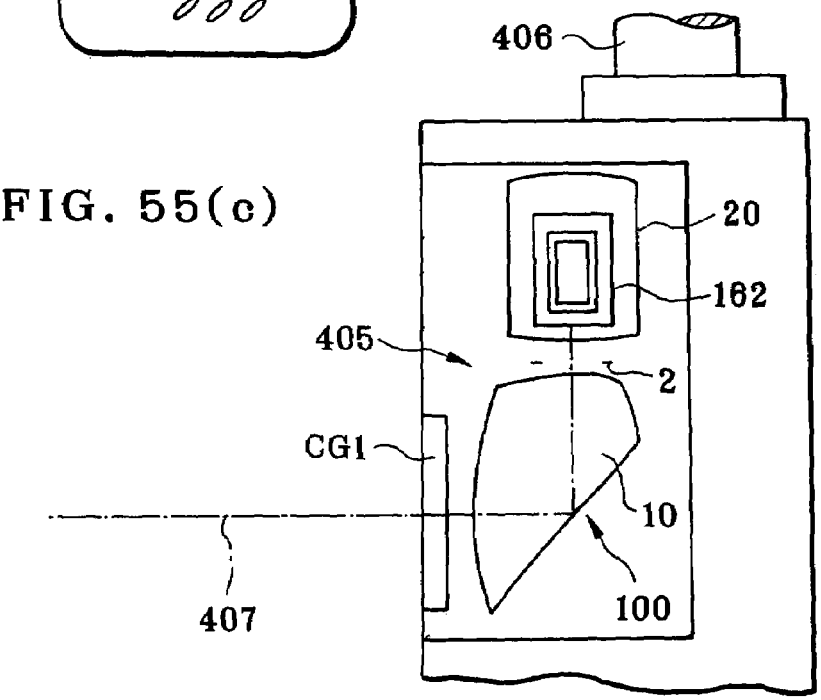

OPTICAL SYSTEM, AND ELECTRONIC EQUIPMENT THAT INCORPORATES THE SAME

This application claims benefit of Japanese Application No. 2004-137202 filed in Japan on May 6, 2004 and Nos. 2004-168492, 168493 and 168494 filed in Japan on Jun. 7, 2004, the contents of which are herein incorporated by this reference.

BACKGROUND OF THE INVENTION

The present invention relates generally to an optical system and electronic equipment that incorporates the same, and more particularly to a compact optical system and electronic equipment that uses such an optical system. The "electronic equipment" used herein, for instance, includes digital cameras, video cameras, digital video units, personal computers, mobile computers, cellular phones, and personal digital assistants.

Some optical systems with an image pickup optical unit comprising free-form surface prisms have already been proposed in the art.

In a typical optical system of this type, an axial light ray is defined by a light ray that propagates from the center of an object to the center of an image through the center of a stop, and reference planes are set for reflecting surfaces located obliquely to the optical axis of the optical system. Each reference plane is a plane defined by an axial chief ray incident on a certain reflecting surface and an axial chief ray reflected thereat. The reference plane exits for each reflecting surface.

One example is an optical system made up of two prisms that are provided separately or as a one piece, wherein all reference planes lie in one plane. In another optical system, thickness reductions are achieved by allowing light incident on prisms to be reflected three-dimensionally. However, all reference planes likewise lie in one plane. This optical system works as an image relay optical system.

In yet another optical system, too, light is reflected three-dimensionally. This optical system also works as an image relay optical system.

SUMMARY OF THE INVENTION

An optical system of the invention comprises:
a stop,
an object-side reflecting surface located on an object side of the optical system with respect to said stop,
an image-side reflecting surface located on an image side of the optical system with respect to said stop, and
an image pickup device, wherein:
said object-side reflecting surface and said image-side reflecting surface are each located obliquely to an optical axis of the optical system,
said object-side reflecting surface and said image-side reflecting surface are located such that a reference plane for said object-side reflecting surface and a reference plane for said image-side reflecting surface cross at any angle wherein when an axial chief ray is defined by a light ray propagating from a center of an object to a center of an image through a center of the stop, the reference plane for each reflecting surface is given by a plane defined by an entrance-side axial chief ray and a reflection-side axial chief ray regarding each reflecting surface, and
said object-side reflecting surface and said image-side reflecting surface have a rotationally asymmetric aspheric shape.

Another optical system of the invention comprises:
a stop,
at least two reflecting surfaces located obliquely to an optical axis of the optical system,
a rotationally asymmetric aspheric refracting surface, and
an image pickup device, wherein:
each of said at least two reflecting surfaces has a rotationally asymmetric aspheric shape,
one of said at least two reflecting surfaces and another reflecting surface are located such that a reference plane for said one reflecting surface and a reference plane for said another reflecting surface cross at any angle wherein when an axial chief ray is defined by a light ray propagating from a center of an object to a center of an image through a center of the stop, the reference plane for each reflecting surface is given by a plane defined by an entrance-side axial chief ray and a reflection-side axial chief ray regarding each reflecting surface, and
all reflecting surfaces having said rotationally asymmetric aspheric shape satisfy condition (1):

$$-5 < Rry/Rrx < 5 \tag{1}$$

where Rry is a radius of curvature of each reflecting surface in a line-of-intersection direction, and Rrx is a radius of curvature of each reflecting surface in a direction vertical to the line-of-intersection direction with the proviso that a line of intersection for each of said at least two reflecting surfaces is defined by a line of intersection of each reflecting surface with the reference plane.

Yet another optical system of the invention comprises:
a stop,
at least two reflecting surfaces located obliquely to an optical axis of the optical system,
a rotationally asymmetric aspheric refracting surface, and
an image pickup device, wherein:
said at least two reflecting surfaces have a rotationally asymmetric aspheric shape,
one of said at least two reflecting surfaces and another reflecting surface are located such that a reference plane for said one reflecting surface and a reference plane for said another reflecting surface cross at any angle wherein when an axial chief ray is defined by a light ray propagating from a center of an object to a center of an image through a center of the stop, the reference plane for each reflecting surface is given by a plane defined by an entrance-side axial chief ray and a reflection-side axial chief ray regarding each reflecting surface, and
an object-side reflecting surface of said reflecting surfaces, located nearest to an object side of the optical system, has a rotationally asymmetric aspheric shape, and
said object-side reflecting surface satisfies condition (2):

$$-0.5 < 1/(Rr1x \cdot P1y) < 0.5 \tag{2}$$

where Rr1x is a radius of curvature of said object-side reflecting surface in a direction vertical to a line-of-intersection direction regarding said object-side reflecting surface, and P1y is a power of the optical system in said line-of-intersection direction regarding said object-side reflecting surface with the proviso that a line of intersection regarding said object-side reflecting surface is defined by a line of intersection of said object-side reflecting surface with the reference plane.

A further optical system of the invention comprises:

a stop, at least two reflecting surfaces located obliquely to an optical axis of the optical system, rotationally asymmetric aspheric refracting surfaces, and an image pickup device, wherein:

said at least two reflecting surfaces have a rotationally asymmetric aspheric shape, one of said at least two reflecting surfaces and another reflecting surface are located such that a reference plane for said one reflecting surface and a reference plane for said another reflecting surface cross at any angle wherein when an axial chief ray is defined by a light ray propagating from a center of an object to a center of an image through a center of the stop, the reference plane for each reflecting surface is given by a plane defined by an entrance-side axial chief ray and a reflection-side axial chief ray regarding each reflecting surface, and an object-side refracting surface of said rotationally asymmetric aspheric refracting surfaces, located nearest to an object side of the optical system, satisfies condition (3):

$$-3 < 1/(Rt1y \cdot P2y) < 0 \quad (3)$$

where Rt1y is a radius of curvature of said object-side refracting surface in a line-of-intersection direction regarding said object-side refracting surface, and P2y is a power of the optical system in said line-of-intersection direction regarding said object-side refracting surface with the proviso that a line of intersection regarding said object-side refracting surface is defined by a line of intersection of said object-side refracting surface with a reference plane for a reflecting surface of said reflecting surfaces, located nearest to the object side of the optical system.

Still other objects and advantages of the invention will in part be obvious and will in part be apparent from the specification.

The invention accordingly comprises the features of construction, combinations of elements, and arrangement of parts which will be exemplified in the construction hereinafter set forth, and the scope of the invention will be indicated in the claims.

BRIEF DESCRIPTION OF THE DRAWINGS

FIG. 1 is illustrative of a light beam incident on a decentered aspheric reflecting surface as well as the meridional direction and the sagittal direction.

FIG. 2(a) is a Y-Z sectional view illustrative of the arrangement of, and an optical path through, the optical system according to Example 1 of the invention, as taken along its optical axis, and FIG. 2(b) is a sectional view as taken on line A–A' of FIG. 2(a).

FIGS. 3(a) and 3(b) are similar to FIGS. 2(a) and 2(b), showing the arrangement of, and an optical path through, the optical system according to Example 2 of the invention.

FIGS. 4(a) and 4(b) are similar to FIGS. 2(a) and 2(b), showing the arrangement of, and an optical path through, the optical system according to Example 3 of the invention.

FIGS. 6(a) and 6(b) are similar to FIGS. 2(a) and 2(b), showing the arrangement of, and an optical path through, the optical system according to Example 5 of the invention.

FIGS. 9(a) and 9(b) are similar to FIGS. 2(a) and 2(b), showing the arrangement of, and an optical path through, the optical system according to Example 8 of the invention.

FIGS. 10(a) and 10(b) are similar to FIGS. 2(a) and 2(b), showing the arrangement of, and an optical path through, the optical system according to Example 9 of the invention.

FIG. 31 is the rest of a transverse aberration diagram for the optical system according to Example 9 upon focusing on an object at infinity.

FIGS. 55(a) and 55(b) are a front view and a side view, respectively, of a cellular phone in which the optical system of the invention is built as an objective optical system, and FIG. 55(c) is a sectional view of a taking optical system therein.

DESCRIPTION OF THE PREFERRED EMBODIMENTS

Figure 5B:
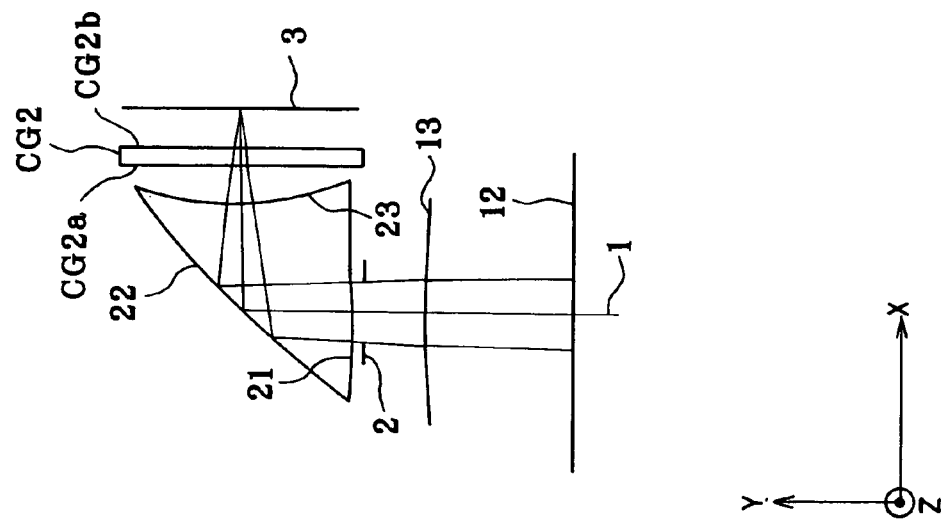
FIGS. 5(a) and 5(b) are similar to FIGS. 2(a) and 2(b), showing the arrangement of, and an optical path through, the optical system according to Example 4 of the invention.

Preferred embodiments of the optical system are now explained.

The optical system explained here is an image pickup optical system having positive power. Through this optical system, an image of a given object is formed on an image pickup device.

In this optical system, a reference plane for at least one object-side reflecting surface and a reference plane for at least one image-side reflecting surface do not lie in the same plane. In other words, the reflecting surfaces are located such that two reference planes cross each other at any angle. Such an arrangement is herein called three-dimensional decentration. As previously stated, the light ray that propagates from the center of the object to the center of the image through the center of the stop is referred to as the axial chief ray, and the plane defined by the axial chief ray incident on a reflecting surface and the axial chief ray reflected at the reflecting surface is called the reference plane.

In the optical system according to the first preferable embodiment of the invention, at least one reflecting surface is located before an aperture stop and at least one reflecting surface is located after the aperture stop. Each reflecting surface has a rotationally asymmetric aspheric shape.

As a reflecting optical system with reflecting surfaces located before and after a stop is constructed according to such a three-dimensional decentration arrangement, it enables the size of the optical system to become small. As there is an increased flexibility in the shape of the optical system, for instance, it is possible to flexibly meet demands for thickness reductions in particular. It is noted that the reflecting surfaces have a rotationally asymmetric aspheric shape.

This is now explained with reference to FIG. 1. FIG. 1 is a schematically perspective view of a reflecting surface R that is inclined to one optical axis (axial chief ray) and comprises a rotationally asymmetric aspheric surface. Here assume that a reference plane is defined by a plane including the center light ray (axial chief ray) of incident light rays and the center light ray of reflected light rays; the meridional direction is defined by a direction in which the reference plane crosses the aspheric reflecting surface R; and the sagittal direction is defined by a direction that is orthogonal to the reference plane at a point on which the axial chief ray is incident. In FIG. 1, the aspheric reflecting surface R is inclined (decentered) to the axial chief ray. For this reason, the sagittal focal length is longer than when there is no decentration (the power become weaker). Conversely, the meridional focal length is shorter than when there is no decentration (the power becomes stronger). For this reason, when it is intended to make the converging or diverging action just equal to the focal length in the absence of decentration, it is required to shorten the focal length in the sagittal direction. This is not preferable not only for correction of aberrations, but also for fabrication of the aspheric reflecting surface R, because of increases in the degree of difficulty in fabrication, and the cost of fabrication.

According to the first optical system of the invention, therefore, the object-side reflecting surface (hereinafter called the first reflecting surface) and the image-side reflecting surface (the second reflecting surface) are positioned such that the reference planes for them cross each other at any angle. For instance, if both the reflecting surfaces are positioned such that the reference planes cross at right angles, the sagittal direction at the first reflecting surface then becomes the meridional direction at the second reflecting surface. Thus, even when the first reflecting surface runs short of power in the sagittal direction, it can be made up for by the second reflecting surface. In other words, it is not required to unreasonably reduce the radius of curvature of the first reflecting surface in the sagittal direction for the purpose of obtaining the desired focal length. With the meridional direction at the second reflecting surface, on the other hand, stronger power is obtainable only by tilting of that surface. This means that adjustment to and correction of a relatively large radius of curvature are only needed, and so aberrations are minimized with the result that satisfactory correction of aberrations is achievable at low costs.

As described above, when the first and second reflecting surfaces are positioned such that the reference planes for them cross at any angle, they are each inevitably decentered in a three-dimensional arrangement. In this case, rotationally asymmetric aberrations result from three-dimensional decentration. However, those aberrations can never be corrected only by a rotationally symmetric optical system. It is here noted that the best surface shape for correction of rotationally asymmetric aberrations is a rotationally asymmetric aspheric shape. Preferably in the first optical system, therefore, at least one object-side reflecting surface and at least one image-side reflecting surface should have such a rotationally asymmetric aspheric shape.

The second optical system according to another preferable embodiment of the invention at least comprises an aperture stop, at least two reflecting surfaces inclined to its optical axis, at least one rotationally asymmetric aspheric refracting surface, and an image pickup device.

Further, at least either one of the two reflecting surfaces has a rotationally asymmetric aspheric shape, and a reference plane for one reflecting surface crosses a reference plane for another reflecting surface at any angle.

Such a catadioptric optical system, too, is reduced in size by relying on such a three-dimensional arrangement as described above. Further, as there is an increased degree of flexibility in the shape of the optical system, it is possible to flexibly meet demands such as that for thickness reductions.

In the second optical system, too, the two reflecting surfaces are inevitably decentered in a three-dimensional arrangement if the reference planes for them are set in such a way as to cross each other at any angle. In this case, too, rotationally asymmetric aberrations result from three-dimensional decentration. In the second optical system, therefore, at least two such reflecting surfaces have a rotationally asymmetric aspheric shape.

Typically, a free-form surface could be used as the rotationally asymmetric aspheric surface. The free-form surface is defined by the following formula, wherein its Z-axis becomes the axis of the free-form surface.

$$Z = cr^2 / [1 + \sqrt{1 - (1+k)c^2 r^2}] + \sum_{j=2}^{66} C_j X^m Y^n \quad (a)$$

Here the first term of formula (a) is a spherical term and the second term is a free-form surface term.

In the spherical term:
c is the curvature of the apex,
k is the conic or conical coefficient, and $r = \sqrt{(X^2+Y^2)}$.

The free-form surface term is $$\sum_{j=2}^{66} C_j X^m Y^n = C_2 X + C_3 Y + C_4 X^2 + C_5 XY + C_6 Y^2 + C_7 X^3 +$$
$$C_8 X^2 Y + C_9 XY^2 + C_{10} Y^3 + C_{11} X^4 + C_{12} X^3 Y + C_{13} X^2 Y^2 +$$
$$C_{14} XY^3 + C_{15} Y^4 + C_{16} X^5 + C_{17} X^4 Y + C_{18} X^3 Y^2 + C_{19} X^2 Y^3 +$$
$$C_{20} XY^4 + C_{21} Y^5 + C_{22} X^6 + C_{23} X^5 Y + C_{24} X^4 Y^2 + C_{25} X^3 Y^3 +$$
$$C_{26} X^2 Y^4 + C_{27} XY^5 + C_{28} Y^6 + C_{29} X^7 + C_{30} X^6 Y + C_{31} X^5 Y^2 +$$
$$C_{32} X^4 Y^3 + C_{33} X^3 Y^4 + C_{34} X^2 Y^5 + C_{35} XY^6 + C_{36} Y^7 \ldots$$

Here $C_j$ (j is an integer of 2 or greater) is a coefficient.

In general, the aforesaid free-form surface has no symmetric surface at both the X-Z plane and the Y-Z plane. However, by reducing all the odd-numbered terms for X to zero, that free-form surface can have only one symmetric surface parallel with the Y-Z plane. Likewise, by reducing all the odd-numbered terms for Y to zero, the free-form surface can have only one symmetric surface parallel with the X-Z plane.

Among other free-form surface defining formulae, there is Zernike polynomial given by the following formula (b). The shape of this surface is defined by the following formula. The axis of Zernike polynomial is given by the Z-axis of the defining formula (b). The rotationally asymmetric surface is defined by polar coordinates for the height of the Z-axis with respect to the X-Y plane provided that R is the distance from the Z-axis within the X-Y plane and A is the azimuth angle around the Z axis, as expressed by the angle of rotation measured from the X-axis.

$$x = R \times \cos(A) \quad (b)$$
$$y = R \times \sin(A)$$
$$Z = D_2 + D_3 R\cos(A) + D_4 R\sin(A) + D_5 R^2 \cos(2A) +$$
$$D_6 (R^2 - 1) + D_7 R^2 \sin(2A) + D_8 R^3 \cos(3A) +$$
$$D_9 (3R^3 - 2R)\cos(A) + D_{10}(3R^3 - 2R)\sin(A) +$$
$$D_{11} R^3 \sin(3A) + D_{12} R^4 \cos(4A) + D_{13}(4R^4 - 3R^2)\cos(2A) +$$
$$D_{14}(6R^4 - 6R^2 + 1) + D_{15}(4R^4 - 3R^2)\sin(2A) +$$
$$D_{16} R^4 \sin(4A) + D_{17} R^5 \cos(5A) + D_{18}(5R^5 - 4R^3)\cos(3A) +$$
$$D_{19}(10R^5 - 12R^3 + 3R)\cos(A) + D_{20}(10R^5 - 12R^3 + 3R)\sin(A) +$$
$$D_{21}(5R^5 - 4R^3)\sin(3A) + D_{22} R^5 \sin(5A) + D_{23} R^6 \cos(6A) +$$
$$D_{24}(6R^6 - 5R^4)\cos(4A) + D_{25}(15R^6 - 20R^4 + 6R^2)\cos(2A) +$$
$$D_{26}(20R^6 - 30R^4 + 12R^2 - 1) + D_{27}(15R^6 - 20R^4 + 6R^2)\sin(2A) +$$
$$D_{28}(6R^6 - 5R^4)\sin(4A) + D_{29} R^6 \sin(6A) + \ldots$$

Here $D_m$ (m is an integer of 2 or greater) is a coefficient. It is noted that when this free-form surface is designed in the form of an optical system symmetric in the X-axis direction, $D_4, D_5, D_6, D_{10}, D_{11}, D_{12}, D_{13}, D_{14}, D_{20}, D_{21}, D_{22} \ldots$ are used.

The aforesaid defining formulae are given for the purpose of illustrating surfaces of rotationally asymmetric curved shape, and so it is understood that the same effects are obtainable even with any other defining formula.

Given below is yet another free-form surface defining formula (c).

$$Z = \Sigma \Sigma C_{nm} XY$$

Considering k=7 (the seventh term) as an example, the free-form surface upon expanded is represented as below.

$$\begin{aligned}Z =\ & C_2 + C_3 Y + C_4|X| + C_5 Y^2 + C_6 Y|X| + C_7 X^2 + C_8 Y^3 + C_9 Y^2|X| + \\ & C_{10} YX^2 + C_{11}|X^3| + C_{12} Y^4 + C_{13} Y^3|X| + C_{14} Y^2 X^2 + C_{15} Y|X^3| + \\ & C_{16} X^4 + C_{17} Y^5 + C_{18} Y^4|X| + C_{19} Y^3 X^2 + C_{20} Y^2|X^3| + C_{21} YX^4 + \\ & C_{22}|X^5| + C_{23} Y^6 + C_{24} Y^5|X| + C_{25} Y^4 X^2 + C_{26} Y^3|X^3| + \\ & C_{27} Y^2 X^4 + C_{28} Y|X^5| + C_{29} X^6 + C_{30} Y^7 + C_{31} Y^6|X| + C_{32} Y^5 X^2 + \\ & C_{33} Y^4|X^3| + C_{34} Y^3 X^4 + C_{35} Y^2|X^5| + C_{36} YX^6 + C_{37}|X^7|\end{aligned} \quad (c)$$

An anamorphic surface, and a toric surface could also be used for the rotationally asymmetric surface.

In the first optical system, the reflecting surfaces are positioned before and after the aperture stop; the first optical system is symmetric with respect to the stop. An arrangement symmetric with respect to the stop is preferable for correction of aberrations. Especially when rotationally asymmetric aspheric reflecting surfaces are decentered in such a three-dimensional arrangement as mentioned above, it is preferable to locate those reflecting surfaces with the stop sandwiched between them. To prevent any interference between the reflecting surfaces and the stop, the first reflecting surface, and the second reflecting surface must be spaced away from the stop. Here, the first reflecting surface, because of being located away from the stop, is preferably used for correction of coma and distortion. As previously described, however, it is difficult to diminish the radius of curvature of the first reflecting surface in the sagittal direction, because aberrations then fluctuate (or become worse). Conversely, as the radius of curvature of the first reflecting surface in the sagittal direction is increased to avert aberration fluctuations, it renders any desired correction of aberrations impossible.

Because the second reflecting surface is also located away from the stop, however, aberrations could be corrected in the meridional direction of the second reflecting surface. In view of correction of aberrations, this has much the same effect as is the case where aberrations are corrected in the sagittal direction of the first reflecting surface. Thus, if the rotationally asymmetric aspheric surfaces are three-dimensionally decentered with symmetry with respect to the stop, satisfactory correction of aberrations is achievable at low costs. Much the same effect is also obtainable by use of a relay optical system. However, this is not preferable because of an increase in the total length of the optical system.

The second optical system, too, is inclined to its optical axis, and comprises rotationally asymmetric aspheric reflecting surfaces. In this case, any attempt to obtain the same converging and diverging actions between the meridional direction and the sagittal direction is not preferable for correction of aberrations, because the radius of curvature is smaller in the sagittal direction than in the meridional direction, as explained with reference to FIG. 1. This is also not preferable for fabrication of the aspheric reflecting surfaces because of increases in the degree of difficulty in fabrication, and the cost of fabrication. In the second optical system of the invention, the respective surfaces are positioned such that the reference planes for them cross each other at any angle, as described above. For instance, if both the reflecting surfaces are positioned such that the reference planes for them cross at right angles, the sagittal direction of one reflecting surface then becomes the meridional direction of another reflecting surface. Thus, even when one reflecting surface runs short of power in the sagittal direction, it can be made up for by another reflecting surface. In other words, it is not required to unreasonably reduce the radius of curvature of one reflecting surface in the sagittal direction for the purpose of obtaining the desired focal length. With the meridional direction of another reflecting surface, on the other hand, stronger power is obtainable only by tilting of that surface. This means that adjustment to and correction of a relatively large radius of curvature are then needed, and so aberrations are minimized with the result that satisfactory correction of aberrations is achievable at low costs. Some preferable embodiments of the second optical system are now explained.

In the first preferable embodiment, such three-dimensional decentration is combined with rotationally asymmetric aspheric reflecting surfaces with satisfaction of condition (1) given below. If, in such an optical system, the sagittal radius of curvature of each reflecting surface is increased, aberrations can then be well corrected. Besides that, the degree of difficulty in fabrication can be eased up, leading to low costs.

When the same converging and diverging actions as in the meridional direction are obtained while the rotationally asymmetric aspheric reflecting surfaces are inclined to the optical axis, the radius of curvature becomes smaller in the sagittal direction than in the meridional direction. This is not preferable not only for correction of aberrations but also for fabrication, because there is an increased degree of difficulty in fabrication, leading to added-up costs. In the second preferable embodiment, therefore, three-dimensional decentration is utilized and condition (2) given below is satisfied. This allows the object-side reflecting surface located nearest to the object side of the optical system to have a large sagittal radius of curvature, making satisfactory correction of aberrations possible. Here the satisfaction of condition (2) without making use of three-dimensional decentration does not stand to reason, because some sagittal power must be obtained at a reflecting surface other than the object-side reflecting surface nearest to the object side. This is not preferable for correction of aberrations as well as for fabrication, because of an increased degree of difficulty in fabrication, leading to added-up costs.

As the rotationally asymmetric aspheric reflecting surfaces are used in combination with three-dimensional decentration as described above, it permits one (the first) reflecting surface to have the converging action regarding the meridional direction of that first reflecting surface. It also allows another (the second) reflecting surface to have the converging action regarding the sagittal direction of the first reflecting surface. Thus, satisfactory correction of aberrations is achievable at low costs. However, it is noted that because the first reflecting surface is distant from the second reflecting surface, the principal points and focal length of the optical system differ between the meridional direction and the sagittal direction of the first reflecting surface with the result that there is an adverse influence such as image distortion. In the third preferable embodiment, therefore, it is preferable to satisfy condition (3) given below. As the condition (3) is satisfied, it allows the first reflecting surface to have negative power in the meridional direction. In turn, this enables the rear principal point of the whole optical system to be positioned on the image side of the optical system in the meridional direction of the first reflecting surface. As a result, the difference in the principal point positions and focal length of the whole optical system can be minimized between the meridional direction and the sagittal direction of the first reflecting surface.

Each condition is now explained. Each condition is satisfied in each of the preferred embodiments of the second optical system. However, it is acceptable for the first optical system to satisfy each condition. Thus, each condition is explained with reference to the first optical system. For this reason, the following explanation will often overlap what has already been explained.

First of all, condition (1) is explained. In the optical system, the lines of intersection of the reflecting surfaces with the reference planes for them are defined as the lines of intersection with the respective reflecting surfaces. Here, all the rotationally asymmetric aspheric reflecting surfaces among the reflecting surfaces should preferably satisfy the following condition.

$$-5 < Rry/Rrx < 5 \tag{1}$$

where Rry is the radius of curvature of each reflecting surface in the line-of-intersection direction, and Rrx is the radius of curvature of each reflecting surface in a vertical direction to the line-of-intersection direction.

When it is intended to obtain much the same converging and diverging actions as in the meridional direction while the rotationally asymmetric aspheric reflecting surfaces are inclined to the optical axis of the optical system, it is required to make the radius of curvature smaller in the sagittal direction than in the meridional direction. This is not preferable not only for correction of aberrations but also for fabrication, because of an increased degree of difficulty in fabrication, leading to added-up costs. Therefore, if three-dimensional decentration is utilized with the satisfaction of condition (1), the sagittal radius of curvature of the first reflecting surface can then be increased, resulting in better correction of aberrations. Besides that, the degree of difficulty in fabrication can be eased up to achieve further cost reductions.

As the upper limit of 5 to condition (1) is exceeded or Rrx becomes too small, it is not preferable not only for correction of aberrations but also for fabrication, because of an increased degree of difficulty in fabrication, leading to added-up costs. Here the satisfaction of condition (1) without making use of three-dimensional decentration does not stand to reason, because some sagittal power must be obtained at a reflecting surface other than the first (object-side) reflecting surface. In this case, the sagittal radius of curvature must be decreased and, hence, sagittal power must be stronger. This is not preferable for correction of aberrations as well as for fabrication, because of an increased degree of difficulty in fabrication, leading to added-up costs. As the lower limit of −5 to condition (1) is not reached or Rrx becomes too small, it is not preferable for correction of aberrations as well as for fabrication, because of an increased degree of difficulty in fabrication, leading to added-up costs. Further, the reflecting surfaces have a saddle shape, resulting in a much more increased degree of difficulty in fabrication, leading to further cost rises.

More preferably, the following condition (1-2) should be satisfied, because the degree of difficulty in fabrication can be more eased up, leading to further cost reductions.

$$-2 < Rry/Rrx < 2 \tag{1-2}$$

where the upper and lower limits to condition (1-2) have the same meanings as in condition (1).

Even more preferably, the following condition (1-3) should be satisfied, because the degree of difficulty in fabrication can be much more eased up, leading to yet further cost reductions.

$$-0.5 < Rry/Rrx < 0.5 \tag{1-3}$$

where the upper and lower limits to condition (1-3) have the same meanings as in condition (1).

Condition (2) is now explained. Here the lines of intersection of the reflecting surfaces with the reference planes for them are defined as the lines of intersection with the respective reflecting surfaces. Then, it is preferable that the reflecting surface located nearest to the object side of the optical system (the object-side reflecting surface) has a rotationally asymmetric aspheric shape and satisfies the following condition.

$$-0.5 < 1/(Rr1x \cdot P1y) < 0.5 \tag{2}$$

where Rr1x is the radius of curvature of the reflecting surface located nearest to the object side of the optical system in a vertical direction to the line-of-intersection direction therewith (the line-of-intersection direction with the object-side reflecting surface), and P1y is the power of the whole optical system in the line-of-intersection direction with the reflecting surface located nearest to the object side (the line-of-intersection direction with the object-side reflecting surface).

When it is intended to obtain the same converging and diverging actions as in the meridional direction while the rotationally asymmetric aspheric reflecting surfaces are inclined to the optical axis, the radius of curvature becomes smaller in the sagittal direction than in the meridional direction. This is not preferable not only for correction of aberrations but also for fabrication, because there is an increased degree of difficulty in fabrication, leading to added-up costs. Therefore, three-dimensional decentration is utilized and condition (2) is satisfied. This allows the object-side reflecting surface located nearest to the object side of the optical system to have a large sagittal radius of curvature, making satisfactory correction of aberrations possible. Here the satisfaction of condition (2) without making use of three-dimensional decentration does not stand to reason, because some sagittal power must be obtained at a reflecting surface other than the object-side reflecting surface nearest to the object side. In this case, the sagittal radius of curvature must be decreased at other reflecting surface or refracting surface. This is not preferable for correction of aberrations as well as for fabrication, because of an increased degree of difficulty in fabrication, leading to added-up costs.

As the lower limit of −0.5 to condition (2) is not reached or Rr1x becomes too small, it is not preferable not only for correction of aberrations but also for fabrication, because of an increased degree of difficulty in fabrication, leading to added-up costs. When a positive radius curvature is used as Rr1y (the radius of curvature of the reflecting surface located nearest to the object side (the object-side reflecting surface)) to obtain a generally positive power, that reflecting surface has a saddle shape, resulting in a more increased degree of difficulty in fabrication, leading to further cost rises. As the upper limit of 0.5 to condition (2) is exceeded or Rr1x becomes too small, it is not preferable for correction of aberrations as well as for fabrication, because of a much more increased degree of difficulty in fabrication, leading to added-up costs.

More preferably, the following condition (2-2) should be satisfied, because the degree of difficulty in fabrication can be more eased up, leading to further cost reductions.

$$0<1/(Rr1x \cdot P1y)<0.3 \quad (2\text{-}2)$$

where the upper and lower limits to condition (2-2) have the same meanings as in condition (2).

Even more preferably, the following condition (2-3) should be satisfied, because the degree of difficulty in fabrication can be much more eased up, leading to yet further cost reductions.

$$0<1/(Rr1x \cdot P1y)<0.1 \quad (2\text{-}3)$$

where the upper and lower limits to condition (2-3) have the same meanings as in condition (2).

Condition (3) is now explained. Here the lines of intersection of the reflecting surfaces with reference planes for them are defined as the lines of intersection with the respective reflecting surfaces; the object-side refracting surface is defined by a refracting surface nearest to the object side among rotationally asymmetric aspheric refracting surfaces; and the line of intersection of the object-side refracting surface with the reference plane for the reflecting surface nearest to the object side (among the reflecting surfaces). It is then preferable for the object-side refracting surface to satisfy the following condition.

$$-3<1/(Rt1y \cdot P2y)<0 \quad (3)$$

where Rt1y is the radius of curvature of the object-side refracting surface in the line-of-intersection direction with the object-side refracting surface, and P2y is the power of the whole optical system in the line-of-intersection direction with the object-side refracting surface.

With, as described above, (1) the location before and after the stop of at least one reflecting surface having a rotationally asymmetric aspheric shape, (2) the application of a three-dimensional decentration arrangement and (3) the utilization of the second reflecting surface for the sagittal converging action of the first reflecting surface, it is possible to achieve satisfactory correction of aberrations at low costs. However, it is noted that because the first reflecting surface is distant from the second reflecting surface, the principal points and focal length of the optical system differ between the meridional direction and the sagittal direction of the first reflecting surface with the result that there is an adverse influence such as image distortion. Therefore, it is preferable to satisfy condition (3). As the condition (3) is satisfied, it allows the first reflecting surface to have negative power in the meridional direction. In turn, this enables the rear principal point of the whole optical system to be positioned on the image side of the optical system in the meridional direction of the first reflecting surface. As a result, the difference in the principal point positions and focal length of the whole optical system can be minimized between the meridional direction and the sagittal direction of the first reflecting surface.

As the lower limit of −3 to condition (3) is not reached, it is not preferable for correction of aberrations, because the absolute value of 1/Rt1y becomes too larger than that of P2y. It is also not preferable because of an increased degree of difficulty in fabrication. As the upper limit of 0 is exceeded, the negative power of the object-side refracting surface in the sagittal direction of the first reflecting surface becomes too small, and so the rear principal point position in that direction can never be set nearer to the image side. As a result, the difference in the principal point positions and focal length of the optical system between the meridional direction and the sagittal direction of the first reflecting surface cannot be minimized, giving rise to noticeable influences on image distortion, etc.

More preferably, the following condition (3-2) should be satisfied. By the satisfaction of this condition, the difference in the principal point positions and focal length of the optical system between the meridional direction and the sagittal direction of the first reflecting surface can be minimized so that influences on image distortion or the like can be reduced. As a result, satisfactory image quality can be obtained at low costs.

$$-1<1/(Rt1y \cdot P2y)<0 \quad (3\text{-}2)$$

The upper and lower limits to condition (3-2) have the same meanings as in condition (3).

Even more preferably, the following condition (3-3) should be satisfied. By the satisfaction of this condition, the difference in the principal point positions and focal length of the optical system between the meridional direction and the sagittal direction of the first reflecting surface can be minimized so that influences on image distortion or the like can be much more reduced. As a result, ever higher image quality can be obtained at lower costs. The lower limit to condition (3-3) has the same meanings as in condition (3). As long as the upper limit is below −0.1, influences on image distortion or the like can be much more reduced.

$$-0.5<1/(Rt1y \cdot P2y)<-0.1 \quad (3\text{-}3)$$

Each condition has been explained with reference to the first optical system of the invention. However, it is understood that one embodiment of the second optical system may satisfy conditions in another embodiment. For instance, the first embodiment of the second optical system that satisfies condition (1) could satisfy condition (2) as well.

Further, the second optical system could comprise the arrangement of the first optical system as well.

That is, it is preferable that one reflecting surface is located on the object side with respect to the stop and another reflecting surface is located on the image side with respect to the stop.

Thus, the symmetric location of the reflecting surfaces having a rotationally asymmetric curved surface shape with respect to the aperture stop is preferable for correction of aberrations. In particular, it is preferable to combine three-dimensional decentration with rotationally asymmetric aspheric reflecting surfaces. Consider here the case where one reflecting surface is the object-side reflecting surface and another is the image-side reflecting surface. For instance, when the object-side reflecting surface is located away from the stop, it is preferable for correction of the so-called coma, distortion, etc. However, as the sagittal radius of curvature of the object-side reflecting surface becomes relatively large, any desired correction of aberrations is not achievable, as previously described. In this case, if the image-side reflecting surface is likewise located away from the stop and aberrations are corrected in the meridional direction of the image-side reflecting surface, much the same correction effect as is the case with correction of aberrations at the object-side reflecting surface is achievable. Thus, satisfactory correction of aberrations can be made at low costs by a combination of rotationally asymmetric aspheric reflecting surfaces, three-dimensional decentration and symmetry with respect to a stop. It is here noted that although similar effects are obtainable by making up a conjugate surface by use of a relay optical system, this is not preferable because of a longer optical path.

In the embodiments of the optical system of the invention (the first and second optical systems), all the reflecting surfaces and refracting surfaces should have a rotationally asymmetric aspheric shape.

If all the reflecting surfaces and refracting surfaces that form an optical system are allowed to have a rotationally asymmetric aspheric shape, rotationally asymmetric aberrations can then be more favorably corrected with fewer surfaces. As a result, it is possible to achieve a more compact, more slimmed-down optical system.

It is preferable that at least one optical element located on the object side with respect to the stop should have at least one reflecting surface and at least two refracting surfaces.

It is preferable that at least one optical element located on the image side with respect to the stop should have at least one reflecting surface and at least two refracting surfaces.

A reflecting surface, because of being higher in the sensitivity to decentration errors than a refracting surface, requires higher precision for assembly and control. However, a prism that is a sort of reflecting optical element has relatively fixed surfaces, and so it can be by itself controlled for decentration. In other words, higher assembly precision and more control steps than required are not necessary for prisms. Further, the prism has an entrance surface and an exit surface which are refracting surfaces as well as reflecting surfaces, and so it is higher in the degree of flexibility in aberration control than a mirror having only a reflecting surface. Especially, the prism has a substantial portion of the desired power allocated to the reflecting surfaces, so that the power of the entrance and exit surfaces that are the refracting surfaces can be decreased. This enables chromatic aberrations to be kept very low while the degree of flexibility in aberration correction can be kept higher than that of the mirror. With the prism that is filled therein with a transparent medium higher in refractive index than air, a longer optical path can be taken as compared with air. Therefore, an optical system can be made more compact and thinner than an arrangement where mirrors are located in air.

Preferably, the optical system of the invention is characterized in that focusing is carried out by movement of at least one optical element.

Preferably, the optical system of the invention is characterized in that focusing is carried out by movement of at least an image pickup device.

Preferably, the optical system of the invention is characterized in that the stop is located substantially vertically to the image pickup plane of the image pickup device.

Preferably, the optical system of the invention is characterized in that the normal vector of the image pickup plane of the image pickup device is substantially vertical to the vector of incident light rays on the optical system.

Preferably, the reflecting surfaces are located such that a light beam reflected on the line of intersection of the object-side reflecting surface located nearest to the object side with the reference plane for it forms an image substantially in the short-side direction of the image pickup device, and a light beam reflected on the line of intersection of the image-side reflecting surface located nearest to the image side with the reference plane for it forms an image substantially in the long-side direction of the image pickup device The object-side reflecting surface nearest to the object side is located such that a light beam incident in the meridional direction forms an image substantially in the short-side direction of the image pickup device. This enables the length of the optical path from the entrance surface of the optical system to the reflecting surface nearest to the object side to be shortened with the result that the thickness of the optical system in the incident light ray direction can be reduced. The image-side reflecting surface located nearest to the image side is located such that a light beam reflected in the meridional direction forms an image substantially in the long-side direction of the image pickup device. This allows the reflecting surfaces nearest to the object and image sides to be located such that the reference planes for the reflecting surfaces nearest to the object and image sides cross substantially vertically. As a result, the normal vector of the image plane is substantially vertical to the direction of incidence of light rays on the optical system, i.e., the thickness direction of the optical system. Therefore, it is possible to prevent an increase in the thickness of the optical system under the influence of the image pickup device itself, and this is preferable for thickness reductions.

Preferably, the total number of reflections satisfies the following condition.

$$2 \leq R_{a11} \leq 4 \qquad (4)$$

where $R_{a11}$ is the total number of reflections.

Three-dimensional decentration requires a plurality of reflections. However, as the number of reflections increases, it causes several defects such as:

(1) the size of the optical system to become large,
(2) surface precision errors, decentration precision errors, etc. at the respective reflecting surfaces to be built up and transferred, placing severe restrictions on each individual precision and so giving rise to added-up costs; and
(3) light quantity losses to become large.

As total reflection is used to eliminate problem (3), it causes the angle of incidence of light on the reflecting surfaces to become large, or problem (2) to stand out a lot more; this is not preferable. If condition (4) is satisfied, there can then be a reasonable tradeoff between compactness and low cost as well as limited light quantity loss. As the lower limit of 2 is not reached, it renders three-dimensional decentration impossible while compactness is kept intact. Exceeding the upper limit of 4 is not preferable because the aforesaid problems stand out due to too many reflections.

More preferably, the following condition (4-2) should be satisfied. By the satisfaction of this condition, there can be a more favorable tradeoff between low cost and limited light quantity loss.

$$2 \leq R_{a11} \leq 3 \qquad (4\text{-}2)$$

Exceeding the upper limit of 3 to condition (4-2) counts against a wide angle-of-view arrangement, because the optical path length becomes long.

Even more preferably, the following condition (4-3) should be satisfied. By the satisfaction of this condition, the optical path length is so shortened that a condition, the optical path length is so shortened that a wide angle-of-view arrangement is achievable while high image quality is kept intact.

$$R_{a11} = 2 \qquad (4\text{-}3)$$

Preferably, a light shield member is interposed between the reflecting surfaces.

Preferably, the light shield member is formed as a one piece with the stop.

In such a decentered optical system with a plurality of reflecting surfaces as described above, there are light rays incident from angles other than the normal angle of incidence. Some light beams may enter the image pickup plane upon reflection at the reflecting and refracting surfaces that form the optical system. The light arriving at the image pickup plane becomes ghost light and noise light. Therefore, it is preferable to locate the light shield member between the reflecting surfaces. This enables ghost light and noise light to be cut off. It is particularly preferable to locate the light shield member at an aperture position at which the normal light beam diameter becomes smallest. In this case, the stop and the light shield member could be formed as a one piece.

Preferably, the optical system has at least one lens.

Preferably, at least one lens is located on the image side with respect to all the reflecting surfaces.

Preferably, focusing is carried out by movement of at least one lens.

Preferably at the time of taking, at least one lens is mounted on the object side with respect to all the reflecting surfaces.

Preferably, the zooming effect is obtained by mounting of the lens.

For such a three-dimensionally decentered optical system as described above, it is not essential to use lenses. However, if one or more rotationally symmetric lenses are positioned at any positions, they may then be used for focusing, wide-converter, and tele-converter purposes. For the focusing purpose in particular, a lens movable along the optical axis of the optical system is provided nearest to its image side. For the wide-converter and tele-converter purposes, a lens is detachably provided nearest to the object side of the optical system.

Preferably, an organic-inorganic composite material is used as an optical material for at least one optical element that forms a part of the optical system.

As the organic-inorganic composite material is used as the optical material for the optical element, it allows various optical properties (refractive index, chromatic dispersion) to turn up (or be obtained) depending on the types and quantitative ratios of the organic and inorganic ingredients present. Thus, if the organic and inorganic ingredients are blended together at any ratio, various optical properties are then obtainable, so that various aberrations can be well corrected with fewer elements yet in a low-cost and small-size arrangement.

Preferably, the organic-inorganic composite material comprises nano-particles of zirconia.

Preferably, the organic-inorganic composite material comprises nano-particles of zirconia and alumina.

Preferably, the organic-inorganic composite material comprises nano-particles of a niobium oxide.

Preferably, the organic-inorganic composite material comprises nano-particles of a hydrolysate of a zirconium alkoxide and alumina.

The nano-particles in these materials are exemplary inorganic ingredients. By dispersing a given amount of such nano-particles in organic ingredient plastics, it is possible to obtain various optical properties (refractive index, chromatic dispersion).

The electronic equipment of the invention preferably comprises each of the optical systems described so far and an electronic image pickup device located on the image side thereof.

Each optical system is a compact, slimmed-down, low-cost one. Therefore, if such an optical system is incorporated in the electronic equipment as an image pickup optical system, it is then possible to reduce the size, thickness and cost of the electronic equipment. The electronic equipment, for instance, includes digital cameras, video cameras, digital video units, personal computers, mobile computers, cellular phones, personal digital assistants, and electronic endoscopes.

Preferably, the electronic equipment comprises means for electrically correcting the shape of an image formed through the optical system.

When it is intended to make correction for distortion by the optical system, there is an increase in the number of optical elements and, hence, an increase in the size of the optical system. Therefore, portions of distortion left undercorrected at the optical system are electrically corrected. This is preferable because the optical system can be made more compact.

That correction is preferably carried out using a different parameter for each wavelength area.

When it is intended to make correction for chromatic aberration of magnification by the optical system, there is an increase in the number of optical elements and, hence, an increase in the size of the optical system. Therefore, portions of chromatic aberration of magnification left undercorrected at the optical system are electrically corrected. This is preferable because the optical system can be made more compact.

Preferably in the electronic equipment comprising each of the optical systems of the invention and the image pickup device located on the image side thereof, the lens(s) is preferably received when not in use.

When the lens(s) is of the detachable type, the lens(s) is receivable in the electronic equipment. This enables the lens(s) to be used as desired during carrying, and prevents the lens(s) from being lost.

Specific examples of the (image pickup) optical system according to the invention are now explained with reference to the accompanying drawings.

The construction parameters of each example will be set forth later. For instance, as shown in the Y-Z sectional view of FIG. 2(a) and the X-Y sectional view of FIG. 2(b), an axial chief ray 1 is defined by a light ray vertically incident on the first surface of the optical system located nearest to the object side (in FIG. 2, the first surface CG1a of a cover glass CG1), passing the center of a stop 2 in the optical system and arriving at the center of an image plane 3, as viewed in normal ray tracing. A position at which the first surface of the optical system located nearest to the object side (in FIG. 2, the first surface CG1a of the cover glass CG1) crosses the axial chief ray 1 is defined as the origin of a decentered optical element in the decentered optical system. A direction along the axial chief ray 1 is defined as the Z-axis direction, and a direction from an object toward the first surface is defined as the Z-axis positive direction. A plane at which the optical axis (axial chief ray) 1 is bent on the object side with respect to the stop 2 is defined as the Y-Z plane, and a direction orthogonal to the Y-Z plane through the origin is defined as the X-axis direction. A direction coming in the paper of FIG. 2(a) is defined as the X-axis positive direction, and the axis forming a right hand system with the X- and Y-axes is defined as the Y-axis.

In each of Examples 1 to 10 comprising two optical elements having a free-form surface, given below, only one symmetric plane of each rotationally asymmetric free-form surface of the object-side optical element is defined as the Y-Z plane, and only one symmetric plain of each rotationally asymmetric free-form surface of the image-side optical element is defined as a plane that passes through the center of the stop 1 and is parallel with the X-Y plane.

Given for a decentered surface are the amount of decentration of the apex of that surface from the center of the origin of the optical system (X, Y and Z standing for the amounts of shift in the X, Y and Z-axis directions) and the angles ($\alpha$, $\beta$, $\gamma$(°)) of tilt of the center axis (the Z axis in the following formula (a) for a free-form surface) with respect to the X axis, the Y axis, and the Z axis, respectively. It is here noted that the positive α and β mean counterclockwise rotation with respect to the positive directions of the respective axes, and the positive γ means clockwise rotation with respect to the positive direction of the Z axis. Regarding how to perform rotation α, β and γ around the center axis of the surface, it is noted that the center axis of the surface and its XYZ orthogonal coordinates are rotated counterclockwise around the X-axis by α, the center axis of the rotated surface is rotated counterclockwise around a new coordinate system by β, the once rotated coordinate system is rotated counterclockwise around the Y-axis by β, and the center axis of the twice rotated surface is rotated clockwise around the Z-axis of a new coordinate system by γ.

It is noted that when, of the optical function surfaces (reflecting surfaces, refracting surfaces) that form the optical system of each example, a specific surface and the subsequent surface form together a co-axial optical system, there is given a surface spacing. Besides that, the refractive index and Abbe constant of the medium are given as usual.

FIGS. 2(a) and 2(b) are sectional views as taken along the optical axis (axial chief ray) 1, showing the arrangement of, and the optical path through, the optical system according to Example 1 of the invention. Specifically, FIG. 2(a) is a Y-Z sectional view as taken along the optical axis (axial chief ray) 1 that runs from the center of the object to the center of the stop 2; however, the reflecting surface 23 (to be described later) and the subsequent surfaces are not found on the section and so not shown. FIG. 2(b) is a sectional view as taken along the optical axis (axial chief ray) 1 that runs from the center of the stop 2 to the center of the image plane 3; it is an A–A' sectional view of FIG. 2(a). In this sectional view, the surfaces before the entrance surface 11 (to be described later) are not found on the section and so not shown.

Transverse aberration diagrams for the optical system according to this example are given as FIGS. 12 and 13. In FIG. 12, (a) is Y-direction transverse aberration of a chief ray traveling at an X-direction angle of view of zero and a Y-direction angle of view of zero; (b) is Z-direction transverse aberration of a chief ray traveling at an X-direction angle of view of zero and a Y-direction angle of view of zero; (c) is Y-direction transverse aberration of a chief ray traveling at an X-direction angle of view of zero and a Y-negative direction maximum angle of view; (d) is Z-direction transverse aberration of a chief ray traveling at an X-direction angle of view of zero and a Y-negative direction maximum angle of view; (e) is Y-direction transverse aberration of a chief ray traveling at an X-positive direction maximum angle of view and a Y-negative direction maximum angle of view; (f) is Z-direction transverse aberration of a chief ray traveling at an X-positive direction maximum angle of view and a Y-negative direction maximum angle of view; (g) is Y-direction transverse aberration of a chief ray traveling at an X-positive direction maximum angle of view and a Y-direction angle of view of zero; (h) is Z-direction transverse aberration of a chief ray traveling at an X-positive direction maximum angle of view and a Y-direction angle of view of zero; (i) is Y-direction transverse aberration of a chief ray traveling at an X-positive direction maximum angle of view and a Y-positive direction maximum angle of view; and (j) is Z-direction transverse aberration of a chief ray traveling at an X-positive direction maximum angle of view and a Y-positive direction maximum angle of view. In FIG. 13, (k) is Y-direction transverse aberration of a chief ray traveling at an X-direction angle of view of zero and a Y-positive direction maximum angle of view; (l) is Z-direction transverse aberration of a chief ray traveling at an X-direction angle of view of zero and a Y-positive direction maximum angle of view; (m) is Y-direction transverse aberration of a chief ray traveling at an X-negative direction maximum angle of view and a Y-positive direction maximum angle of view; (n) is Z-direction transverse aberration of a chief ray traveling at an X-negative direction maximum angle of view and a Y-positive direction maximum angle of view; (o) is Y-direction transverse aberration of a chief ray traveling at an X-direction angle of view of zero and a Y-negative direction maximum angle of view; (p) is Z-direction transverse aberration of a chief ray traveling at an X-direction angle of view of zero and a Y-negative direction maximum angle of view; (q) is Y-direction transverse aberration of a chief ray traveling at an X-negative direction maximum angle of view and a Y-negative direction maximum angle of view; and (r) is Y-direction transverse aberration of a chief ray traveling at an X-negative direction maximum angle of view and a Y-negative direction maximum angle of view. It is here noted that the Y- and Z-directions are given on the basis of the origin of the optical system.

Example 1 is directed to an optical system composed of, in order from its object side, a cover glass CG1, a front optical element 10, an aperture stop 2, a rear optical element 20, and a cover glass CG2. In FIGS. 2(a) and 2(b), reference numeral 3 indicates an image plane (image pickup plane).

The cover glasses CG1 and CG2 are each in a plane-parallel plate form.

The optical element 10 has an entrance surface 11, a reflecting surface 12 and an exit surface 13 as optical function surfaces. The optical element 10 is a decentered prism. Incident on the optical element 10 from the entrance surface 11, an axial chief ray 1 is internally reflected at the reflecting surface 12, and refracted through the exit surface 14, leaving the optical element 10.

The optical element 20 has an entrance surface 21, a reflecting surface 22, a reflecting surface 23 and an exit surface 24 as optical function surfaces. The optical element 20, too, is a decentered prism. Incident on the optical element 20 from the entrance surface 21, an axial chief ray 1 is internally reflected at the reflecting surface 22 and then at the reflecting surface 23. Subsequently, the axial chief ray 1 is refracted through the exit surface 24, leaving the optical element 20. Within the optical element 20, the axial chief ray 1 traveling from the entrance surface 21 toward the reflecting surface 22 crosses the axial chief ray 1 going from the reflecting surface 23 toward the exit surface 24. In other words, the entrance surface 21, reflecting surfaces 22, 23, and exit surface 24 are positioned such that the axial chief ray 1 crosses over itself. As viewed in the positive direction of the Z axis, the axial chief ray 1 travels while it rotates counterclockwise within the optical element 20.

The entrance surface 11, reflecting surface 12 and exit surface 13 of the optical element 10, and the entrance surface 21, reflecting surfaces 22, 23 and exit surface 24 of the optical element 20 are all in free-form surface forms, and these surfaces have rotationally asymmetric power. The entrance surface 11, reflecting surface 12 and exit surface 13 of the optical element 10 are decentered in the Y-Z plane whereas the entrance surface 21, reflecting surfaces 22, 23 and exit surface 24 of the optical element 20 are decentered in the X-Y plane.

In the optical system of Example 1, the axial chief ray 1 emanating from the center of a distant object travels through the cover glass CG1, the optical element 10, the center of the aperture stop 2, the optical element 20 and the cover glass CG2, and arrives at the center of the image plane 3 to form an object image.

In Example 1, there are provided means for prevention of ghost light or noise light. Specifically, a black coating material or other light shield material is applied over, for instance, a surface portion of the exit surface 13 of the optical element 10 except for its effective surface area. Alternatively, a light-absorbing material may be applied on the outside of the aperture stop 2 as a one piece for the purpose of preventing ghost light or noise light.

Each of the optical function surfaces 11–13 and 21–24 in Example 1 is a free-form surface defined by the aforesaid formula (a), where the Z axis is the axis of the free-form surface. The power and focal length of a decentered optical system, for instance, are defined in FIG. 5 of U.S. Pat. No. 6,124,989 (JP(A) 2000-66105). It is here noted that the shape of the free-form surface as well as the power and focal length of the decentered prism, as described above, hold true for the following examples.

Numerical data on Example 1 will be enumerated later. In the data, "FFS" and "RE" stand for a free-form surface and a reflecting surface, respectively, and the refractive index and Abbe constant are given on a d-line basis. The same holds true for the following examples.

It is noted that the amounts of decentration in the following numerical data are all given on the basis of the first surface (in FIG. 2, the origin set at the first surface CG1a of the cover glass CG1). The same holds true for the following examples.

In Example 1, a different correction parameter is used for each wavelength area to make electrical correction for an image. This enables asymmetric image distortion and chromatic blurring to be effectively corrected with the result that preferable image shape and image quality can be obtained.

FIGS. 3(*a*) and 3(*b*) are similar to FIGS. 2(*a*) and (*b*), showing an arrangement of, and an optical path through, the optical system according to Example 2 of the invention.

Transverse aberration diagrams for the optical system of Example 2, similar to FIGS. 12 and 13, are given in FIGS. 14 and 15.

Any detailed explanation of the construction of the optical system is omitted, because it is the same as in Example 1. Numerical data on this example will be enumerated later.

FIGS. 4(*a*) and 4(*b*) are similar to FIGS. 2(*a*) and (*b*), showing an arrangement of, and an optical path through, the optical system according to Example 3 of the invention.

Transverse aberration diagrams for the optical system of Example 3, similar to FIGS. 12 and 13, are given in FIGS. 16 and 17.

Any detailed explanation of the construction of the optical system is omitted, because it is the same as in Example 1. Numerical data on this example will be enumerated later.

Figure 5A:
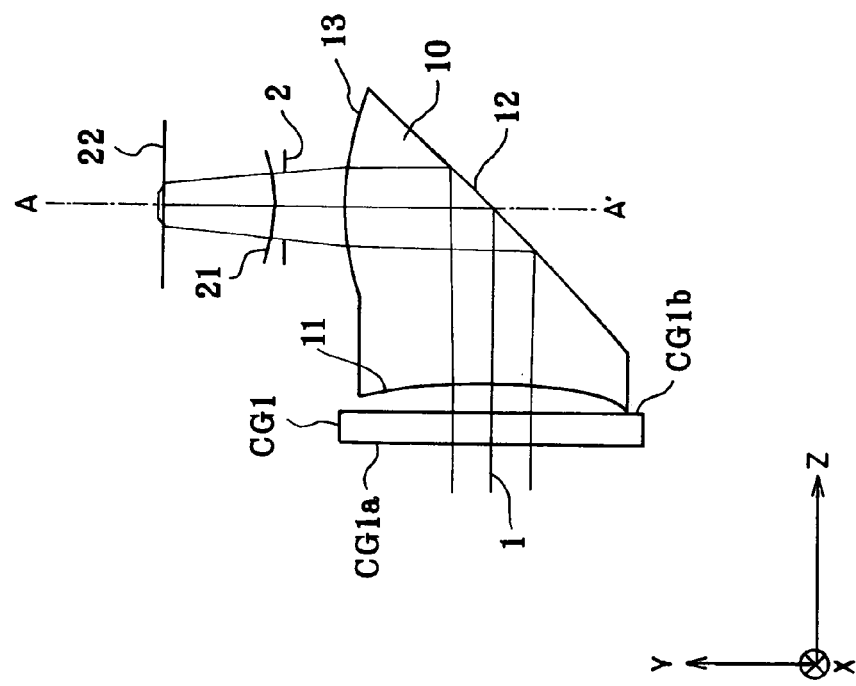

FIGS. 5(*a*) and 5(*b*) are similar to FIGS. 2(*a*) and (*b*), showing an arrangement of, and an optical path through, the optical system according to Example 4 of the invention.

Transverse aberration diagrams for the optical system of Example 4, similar to FIGS. 12 and 13, are given in FIGS. 18 and 19.

More specifically, Example 4 is directed to an optical system composed of, in order from its object side, a cover glass CG1, an optical element 10 that is a front group, an aperture stop 2, an optical element 20 that is a rear group, and a cover glass CG2. In FIGS. 5(*a*) and 5(*b*), reference numeral 3 indicates an image plane (image pickup plane).

The cover glasses CG1 and CG2 are each in a plane-parallel plate form.

The optical element 10 has an entrance surface 11, a reflecting surface 12 and an exit surface 13 as optical function surfaces. The optical element 10 is a decentered prism. Incident on the optical element 10 from the entrance surface 11, an axial chief ray 1 is internally reflected at the reflecting surface 12, and refracted through the exit surface 14, leaving the optical element 10.

The optical element 20 has an entrance surface 21, a reflecting surface 22, and an exit surface 23 as optical function surfaces. The optical element 20, too, is a decentered prism. Incident on the optical element 20 from the entrance surface 21, an axial chief ray 1 is internally reflected at the reflecting surface 22 and refracted through the exit surface 23, leaving the optical element 20.

The entrance surface 11, reflecting surface 12 and exit surface 13 of the optical element 10, and the entrance surface 21, reflecting surfaces 22 and exit surface 23 of the optical element 20 are all in free-form surface forms, and these surfaces have rotationally asymmetric power. The entrance surface 11, reflecting surface 12 and exit surface 13 of the optical element 10 are decentered in the Y-Z plane whereas the entrance surface 21, reflecting surfaces 22 and exit surface 23 of the optical element 20 are decentered in the X-Y plane.

In the optical element of Example 4, the axial chief ray 1 emanating from the center of a distant object travels through the cover glass CG1, the optical element 10, the center of the aperture stop 2, the optical element 20 and the cover glass CG2, and arrives at the center of the image plane 3 to form an object image.

In Example 4, a different correction parameter is used for each wavelength area to make electrical correction for an image. This enables asymmetric image distortion and chromatic blurring to be effectively corrected with the result that preferable image shape and image quality can be obtained.

Numerical data on this example will be enumerated later.

FIGS. 6(*a*) and 6(*b*) are similar to FIGS. 2(*a*) and (*b*), showing an arrangement of, and an optical path through, the optical system according to Example 5 of the invention.

Transverse aberration diagrams for the optical system of Example 5, similar to FIGS. 12 and 13, are given in FIGS. 20 and 21.

Any detailed explanation of the construction of the optical system is omitted, because it is the same as in Example 4. Numerical data on this example will be enumerated later.

Figure 7B:
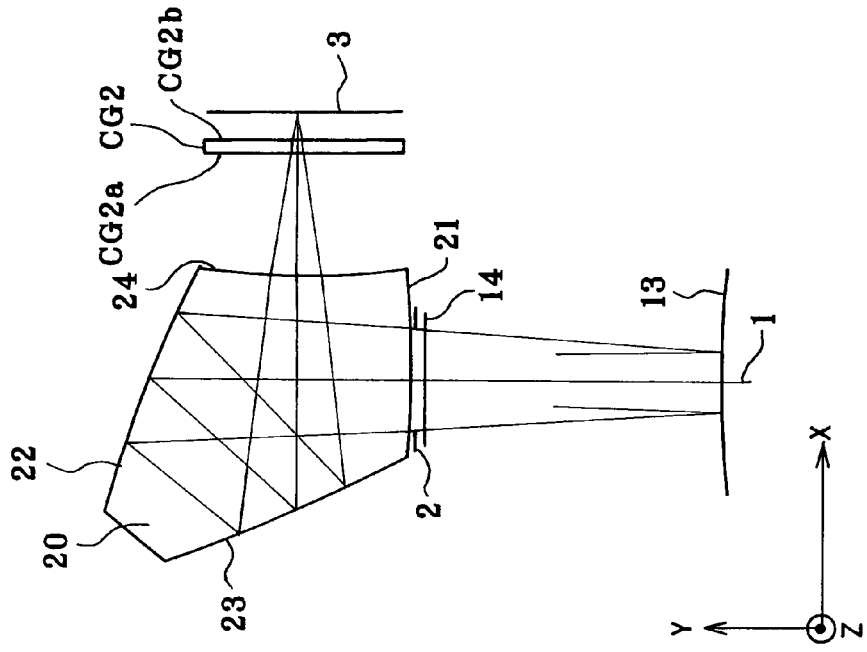
FIGS. 7(a) and 7(b) are similar to FIGS. 2(a) and 2(b), showing the arrangement of, and an optical path through, the optical system according to Example 6 of the invention.
Figure 7A:
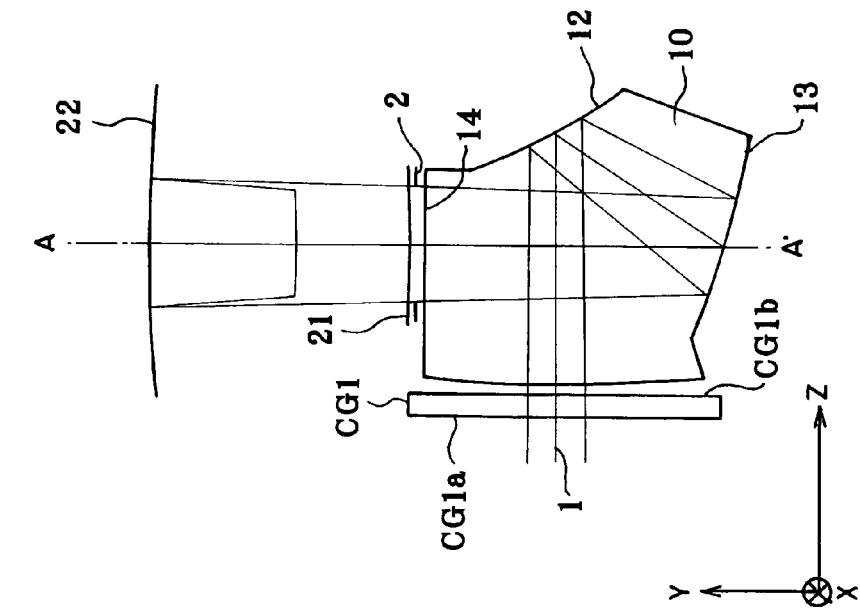

FIGS. 7(*a*) and 7(*b*) are similar to FIGS. 2(*a*) and (*b*), showing an arrangement of, and an optical path through, the optical system according to Example 6 of the invention.

Transverse aberration diagrams for the optical system of Example 6, similar to FIGS. 12 and 13, are given in FIGS. 22 and 23.

Example 6 is directed to an optical system composed of, in order from its object side, a cover glass CG1, an optical element 10 that is a front group, an aperture stop 2, an optical element 20 that is a rear group, and a cover glass CG2. In FIGS. 7(*a*) and 7(*b*), reference numeral 3 indicates an image plane (image pickup plane).

The cover glasses CG1 and CG2 are each in a plane-parallel plate form.

The optical element 10 has an entrance surface 11, a reflecting surface 12, a reflecting surface 13 and an exit surface 14 as optical function surfaces. The optical element 10 is a decentered prism. Incident on the optical element 10 from the entrance surface 11, an axial chief ray 1 is internally reflected at the reflecting surface 12 and then at the reflecting surface 13. Subsequently, the axial chief ray 1 is refracted through the exit surface 14, leaving the optical element 10.

Within the optical element 10, the axial chief ray 1 traveling from the entrance surface 11 toward the reflecting surface 12 crosses the axial chief ray 1 going from the reflecting surface 13 toward the exit surface 14. In other words, the entrance surface 11, reflecting surfaces 12, 13, and exit surface 14 are positioned such that the axial chief ray 1 crosses over itself. As viewed in the positive direction of the X axis, the axial chief ray 1 travels while it rotates counterclockwise within the optical element 10.

The optical element 20 has an entrance surface 21, a reflecting surface 22, a reflecting surface 23 and an exit surface 24 as optical function surfaces. The optical element 20, too, is a decentered prism. Incident on the optical element 20 from the entrance surface 21, an axial chief ray 1 is internally reflected at the reflecting surface 22 and then at the reflecting surface 23, leaving the optical element 20 upon refraction through the exit surface 24. Within the optical element 20, the axial chief ray 1 traveling from the entrance surface 21 toward the reflecting surface 22 crosses the axial chief ray 1 going from the reflecting surface 23 toward the exit surface 24. In other words, the entrance surface 21, reflecting surfaces 22, 23, and exit surface 24 are positioned such that the axial chief ray 1 crosses over itself. As viewed in the positive direction of the Z axis, the axial chief ray 1 travels while it rotates counterclockwise within the optical element 20.

The entrance surface 11, reflecting surfaces 12, 13 and exit surface 14 of the optical element 10, and the entrance surface 21, reflecting surfaces 22, 23 and exit surface 24 of the optical element 20 are all in free-form surface forms, and these surfaces have rotationally asymmetric power. The entrance surface 11, reflecting surfaces 12, 13 and exit surface 14 of the optical element 10 are decentered in the Y-Z plane whereas the entrance surface 21, reflecting surfaces 22, 23 and exit surface 24 of the optical element 20 are decentered in the X-Y plane.

In the optical element of Example 6, the axial chief ray 1 emanating from the center of a distant object travels through the cover glass CG1, the optical element 10, the center of the aperture stop 2, the optical element 20 and the cover glass CG2, and arrives at the center of the image plane 3 to form an object image.

In Example 6, a different correction parameter is used for each wavelength area to make electrical correction for an image. This enables asymmetric image distortion and chromatic blurring to be effectively corrected with the result that preferable image shape and image quality can be obtained.

Numerical data on this example will be enumerated later.

Figure 8B:
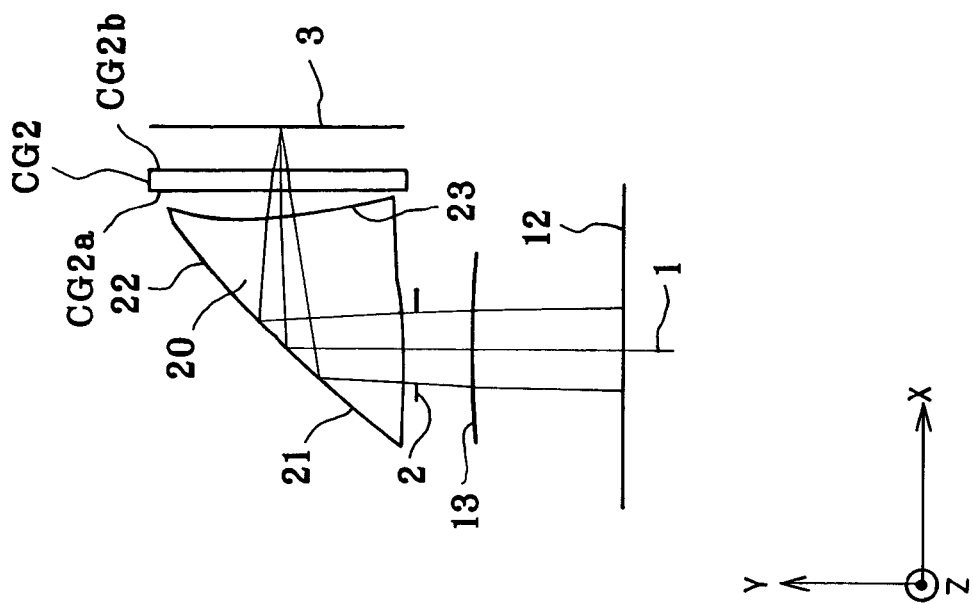
FIGS. 8(a) and 8(b) are similar to FIGS. 2(a) and 2(b), showing the arrangement of, and an optical path through, the optical system according to Example 7 of the invention.
Figure 8A:
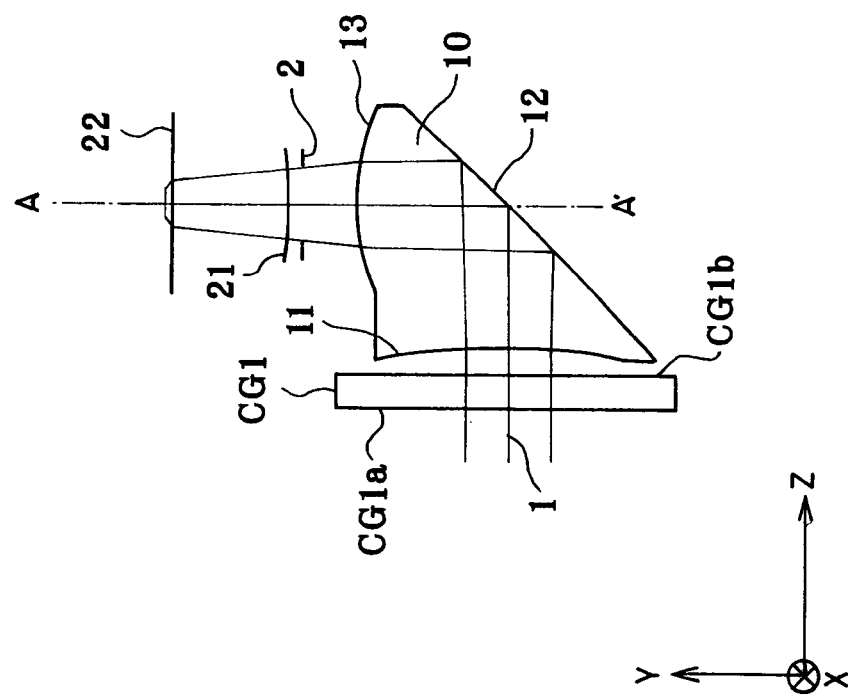

FIGS. 8(a) and 8(b) are similar to FIGS. 2(a) and (b), showing an arrangement of, and an optical path through, the optical system according to Example 7 of the invention.

Transverse aberration diagrams for the optical system of Example 7, similar to FIGS. 12 and 13, are given in FIGS. 24 and 25.

Any detailed explanation of the construction of the optical system is omitted, because it is the same as in Example 4. Numerical data on this example will be enumerated later. It is noted that the X-direction (sagittal) curvature of the reflecting surface 12 of the optical element 10 in Example 7 is zero, and the coefficient indicative of that surface has no term with respect to X.

FIGS. 9(a) and 9(b) are similar to FIGS. 2(a) and (b), showing an arrangement of, and an optical path through, the optical system according to Example 8 of the invention.

Transverse aberration diagrams for the optical system of Example 8 upon focusing at infinity, similar to FIGS. 12 and 13, are given as FIGS. 26 and 27, and transverse aberration diagrams upon focusing on the nearest object, similar to FIGS. 12 and 13, are given as FIGS. 28 and 29.

Any detailed explanation of the construction of the optical system is omitted because it is the same as in Example 1. With the optical system of this example, focusing is carried out by movement of the optical element 10 in a direction shown by an arrow in FIG. 9(a). Focusing on the nearest object is carried out by downward movement of the optical element 10 in a direction shown by an arrow in FIG. 9(a). Numerical data on this example will be given later.

FIGS. 10(a) and 10(b) are similar to FIGS. 2(a) and (b), showing an arrangement of, and an optical path through, the optical system according to Example 9 of the invention.

Transverse aberration diagrams for the optical system of Example 9 upon focusing at infinity, similar to FIGS. 12 and 13, are given as FIGS. 30 and 31, and transverse aberration diagrams upon focusing on the nearest object, similar to FIGS. 12 and 13, are given as FIGS. 32 and 33.

Any detailed explanation of the construction of the optical system is omitted because it is the same as in Example 1. With the optical system of this example, focusing is carried out by movement of the optical element 10 in a direction shown by an arrow in FIG. 10(b). Focusing on the nearest object is carried out by upward movement of the optical element 10 in a direction shown by an arrow in FIG. 10(b). Numerical data on this example will be given later.

Figure 11B:
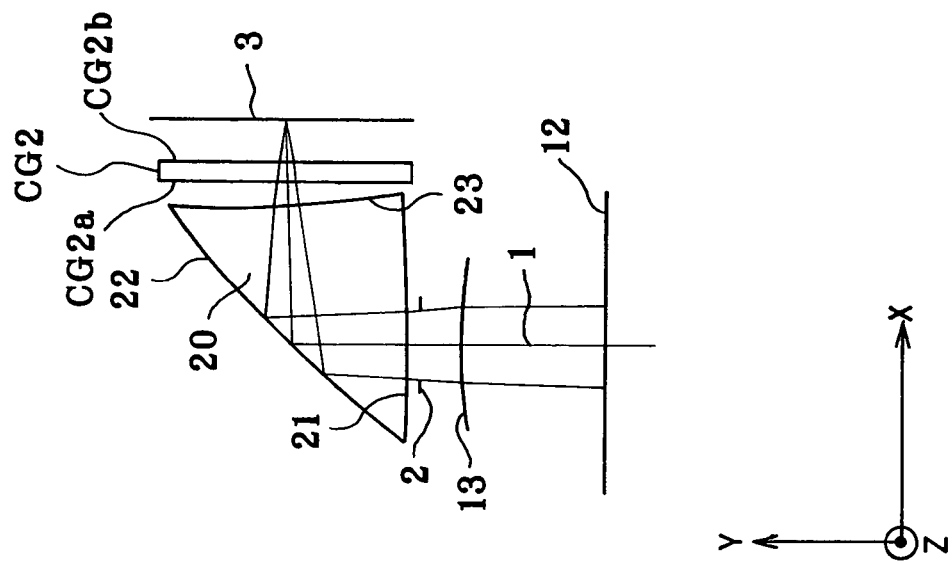
FIGS. 11(a) and 11(b) are similar to FIGS. 2(a) and 2(b), showing the arrangement of, and an optical path through, the optical system according to Example 10 of the invention.
Figure 11A:
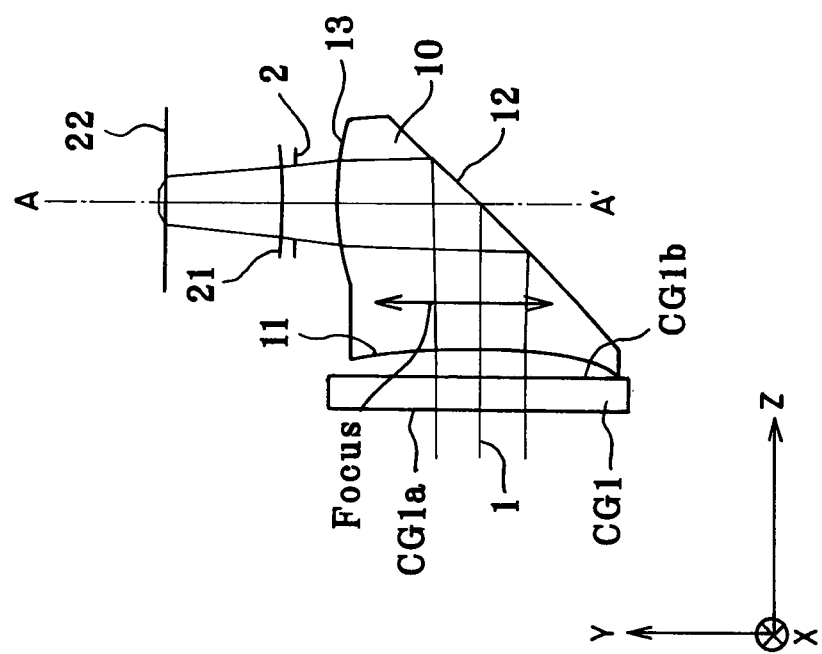
Figure 12I:
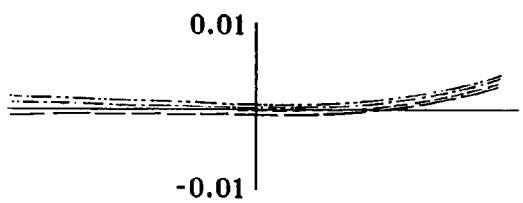
FIG. 12 is a part of a transverse aberration diagram for the optical system according to Example 1.
Figure 12J:
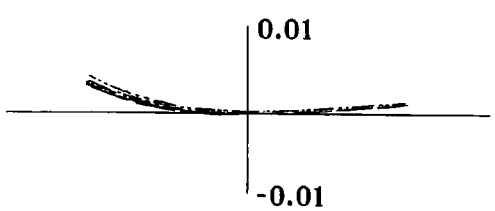
Figure 12G:
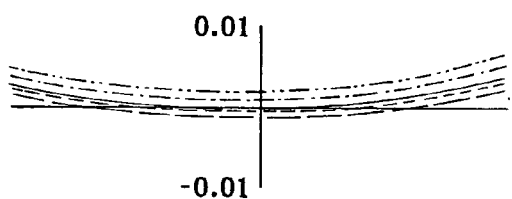
Figure 12H:
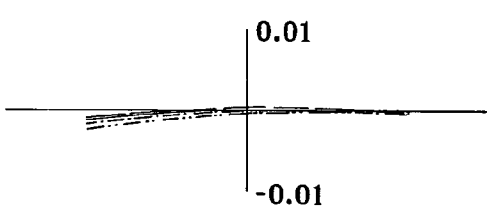
Figure 12E:
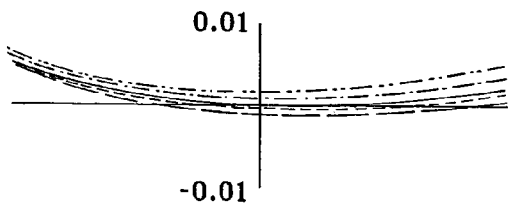
Figure 12F:
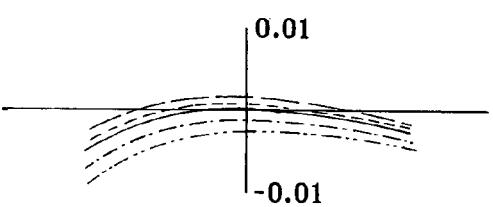
Figure 12C:
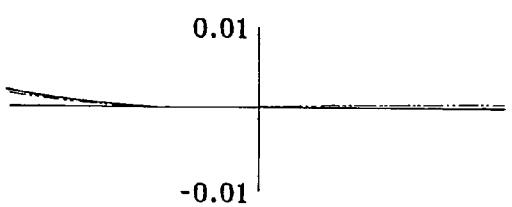
Figure 12D:
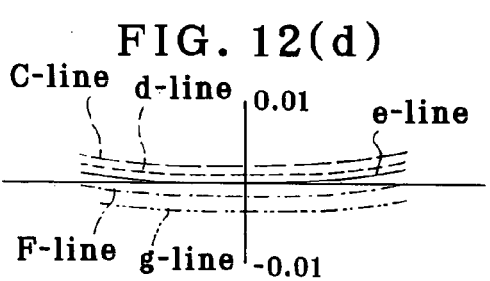
Figure 12A:
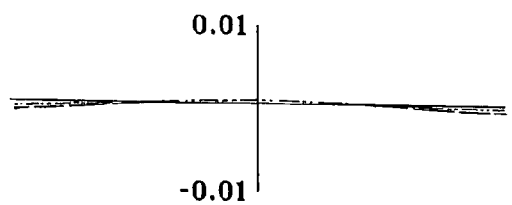
Figure 12B:
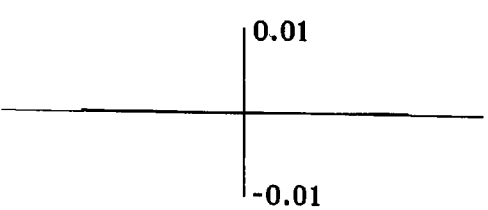
Figure 13Q:
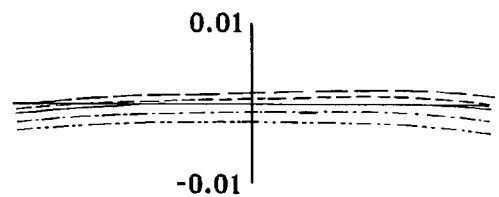
FIG. 13 is the rest of a transverse aberration diagram for the optical system according to Example 1.
Figure 13R:
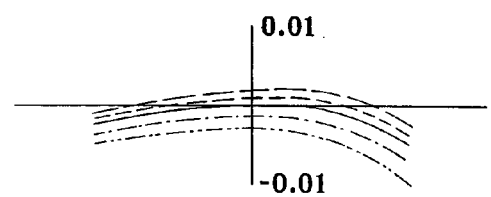
Figure 13O:
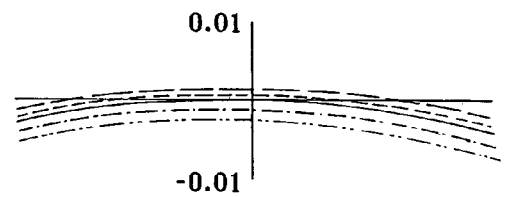
Figure 13P:
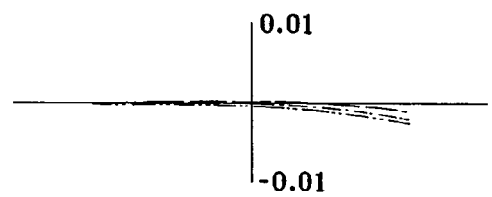
Figure 13M:
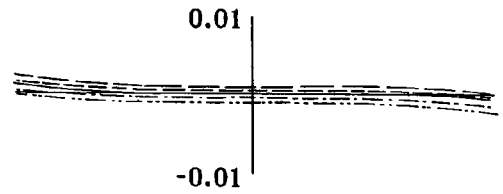
Figure 13N:
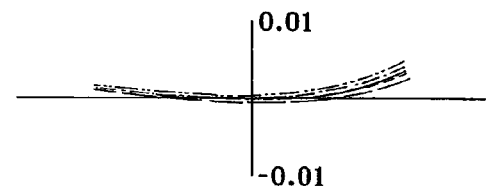
Figure 13K:
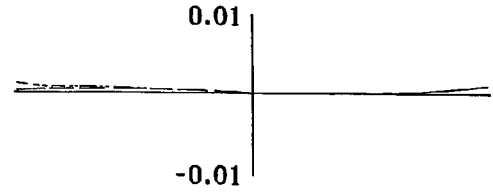
Figure 13L:
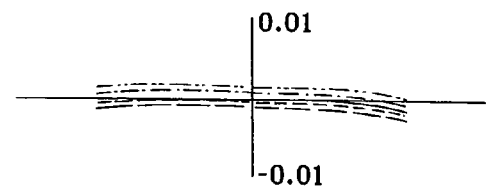
Figure 14I:
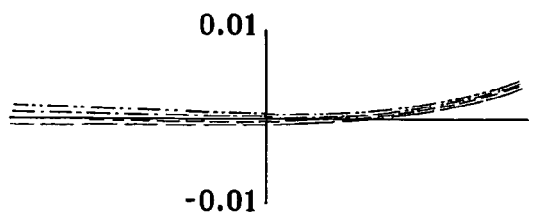
FIG. 14 is a part of a transverse aberration diagram for the optical system according to Example 2.
Figure 14J:
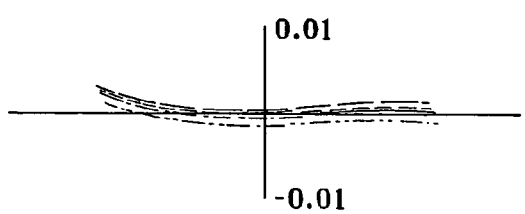
Figure 14G:
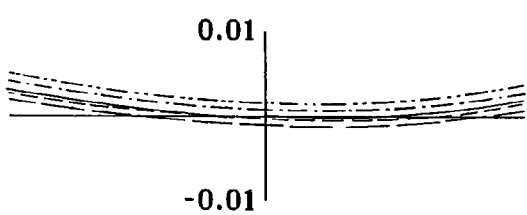
Figure 14H:
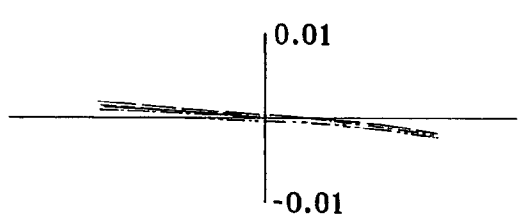
Figure 14E:
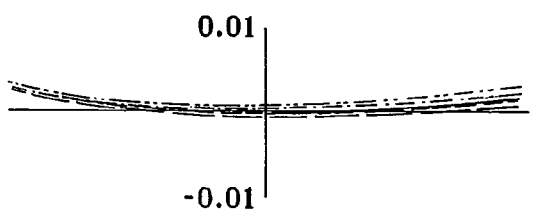
Figure 14F:
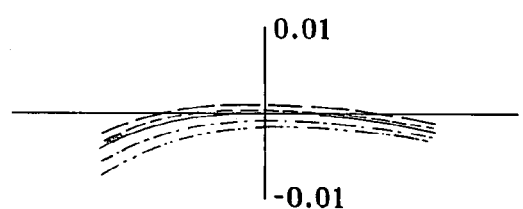
Figure 14C:
Figure 14D:
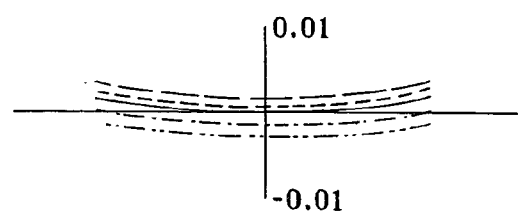
Figure 14A:
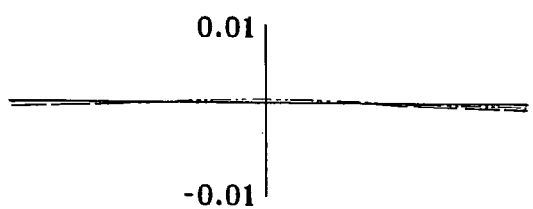
Figure 14B:
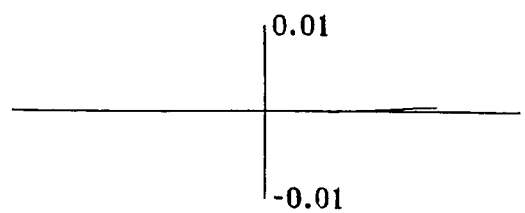
Figure 15Q:
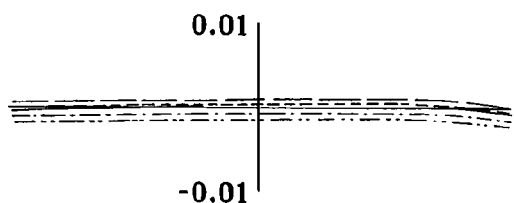
FIG. 15 is the rest of a transverse aberration diagram for the optical system according to Example 2.
Figure 15R:
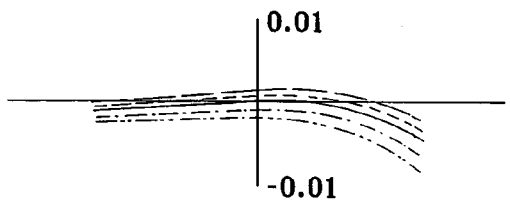
Figure 15O:
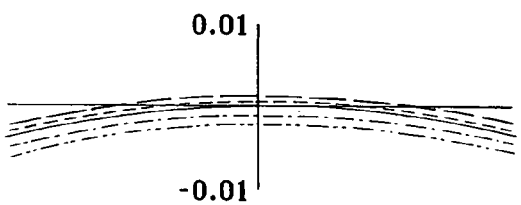
Figure 15P:
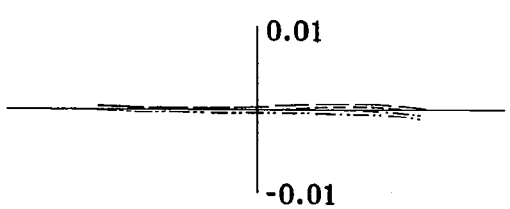
Figure 15M:
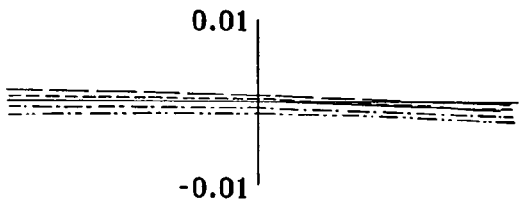
Figure 15N:
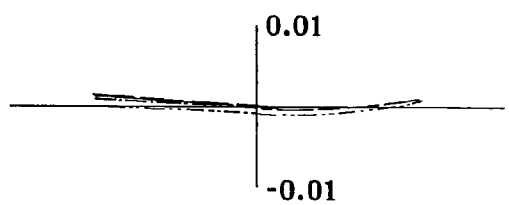
Figure 15K:
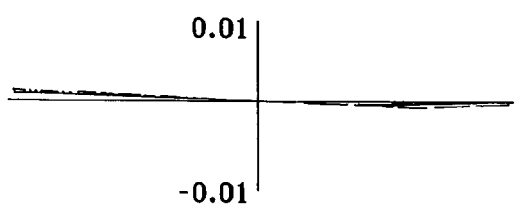
Figure 15L:
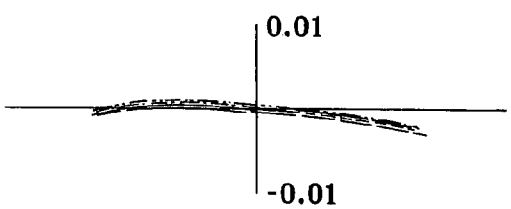
Figure 16I:
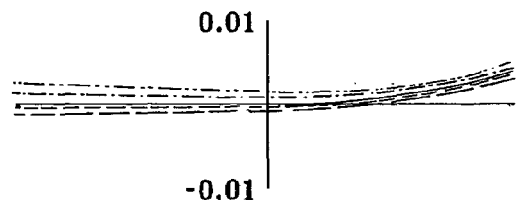
FIG. 16 is a part of a transverse aberration diagram for the optical system according to Example 3.
Figure 16J:
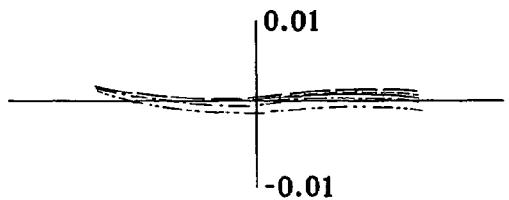
Figure 16G:
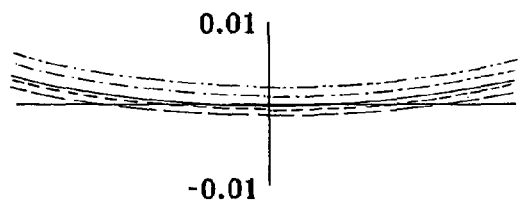
Figure 16H:
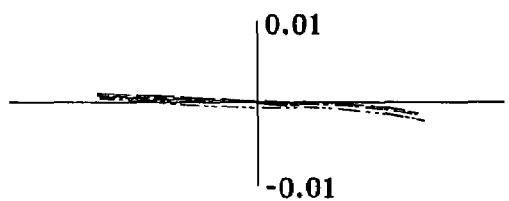
Figure 16E:
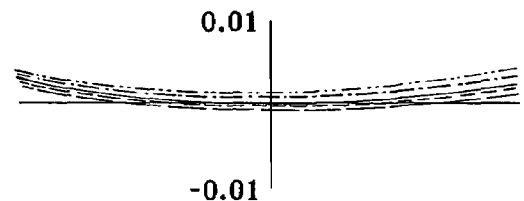
Figure 16F:
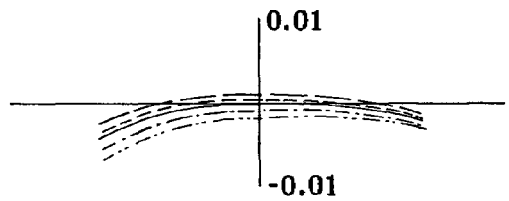
Figure 16C:
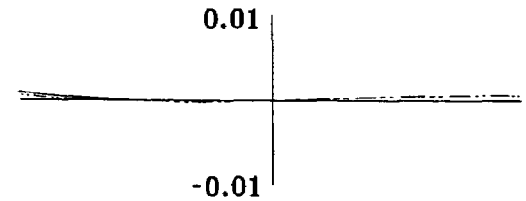
Figure 16D:
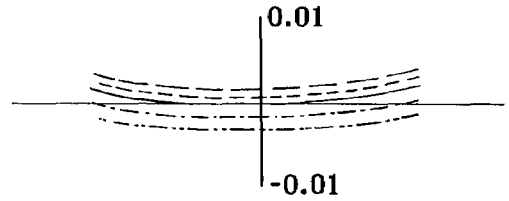
Figure 16A:
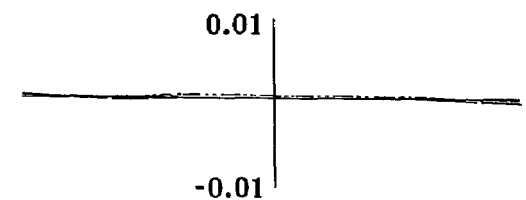
Figure 16B:
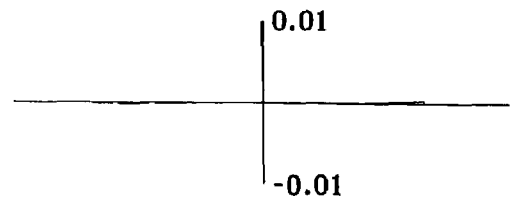
Figure 17Q:
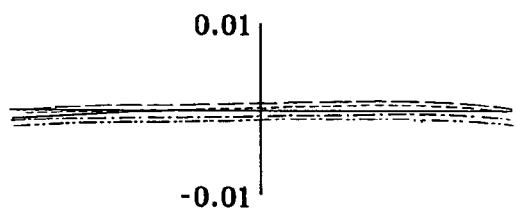
FIG. 17 is the rest of a transverse aberration diagram for the optical system according to Example 3.
Figure 17R:
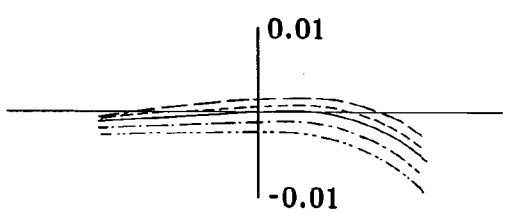
Figure 17O:
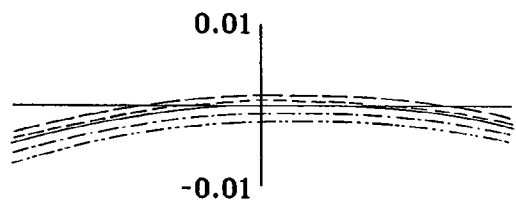
Figure 17P:
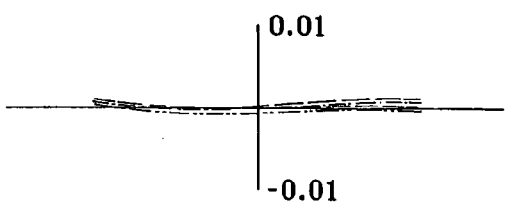
Figure 17M:
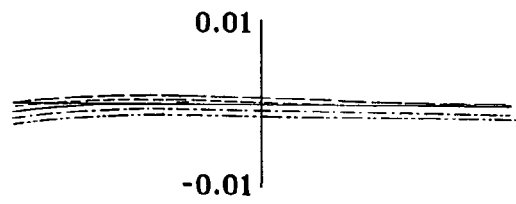
Figure 17N:
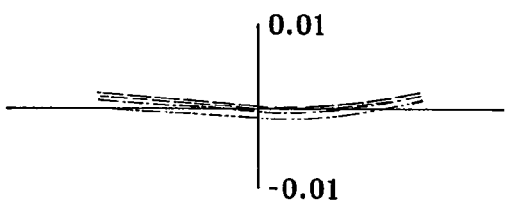
Figure 17K:
Figure 17L:
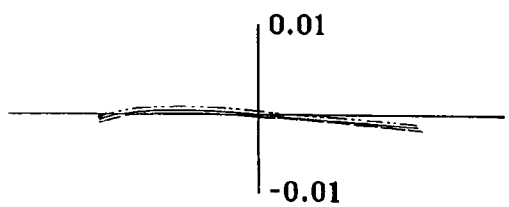
Figure 18I:
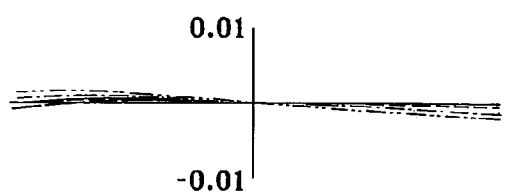
FIG. 18 is a part of a transverse aberration diagram for the optical system according to Example 4.
Figure 18J:
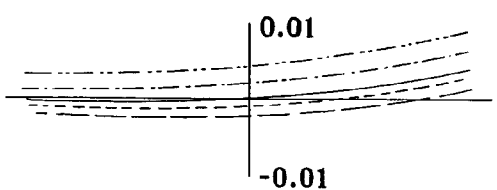
Figure 18G:
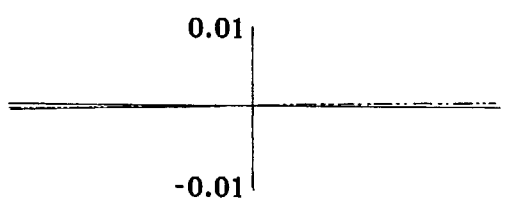
Figure 18H:
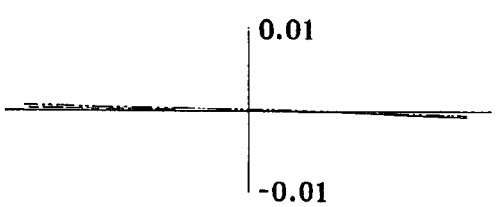
Figure 18E:
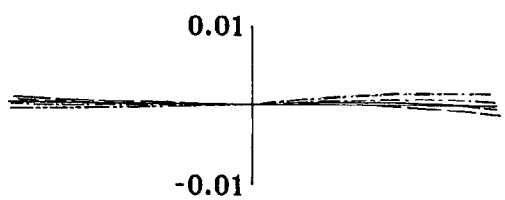
Figure 18F:
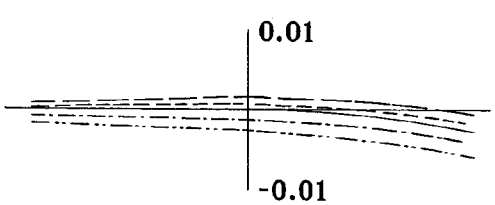
Figure 18C:
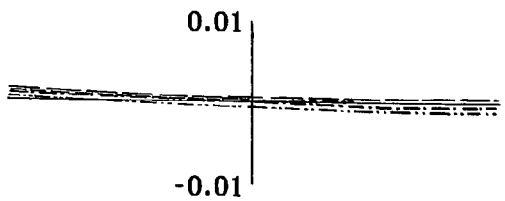
Figure 18D:
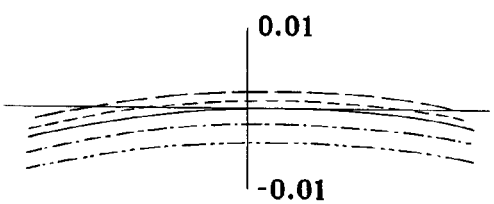
Figure 18A:
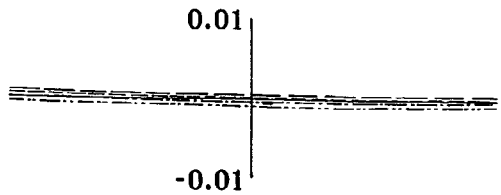
Figure 18B:
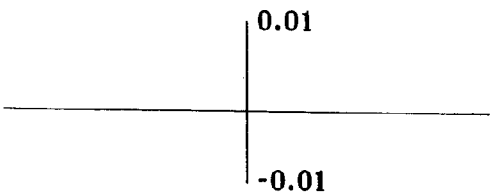
Figure 19Q:
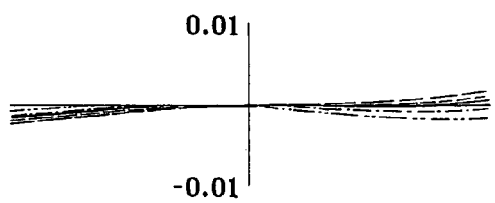
FIG. 19 is the rest of a transverse aberration diagram for the optical system according to Example 4.
Figure 19R:
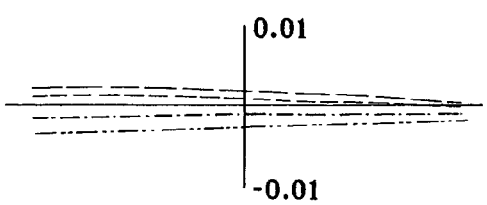
Figure 19O:
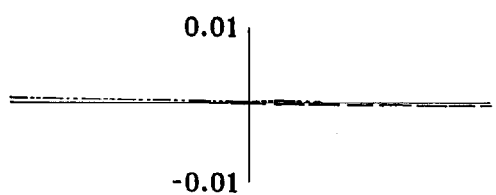
Figure 19P:
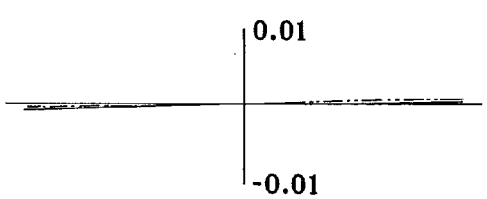
Figure 19M:
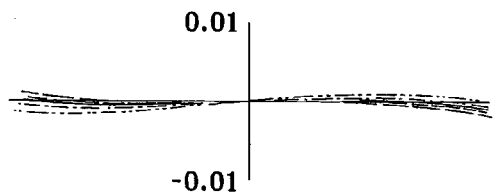
Figure 19N:
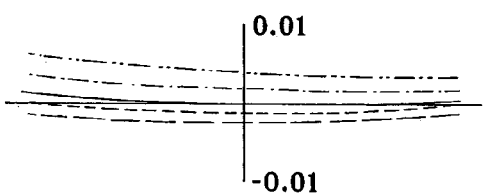
Figure 19K:
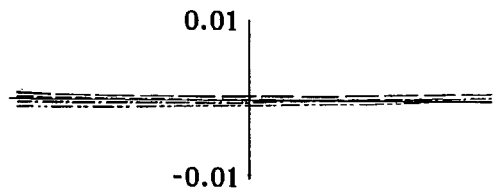
Figure 19L:
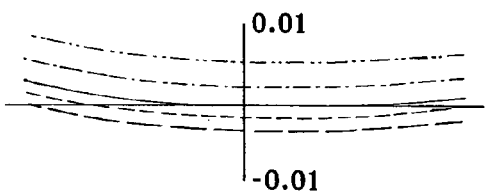
Figure 20I:
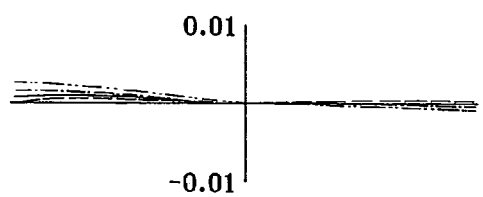
FIG. 20 is a part of a transverse aberration diagram for the optical system according to Example 5.
Figure 20J:
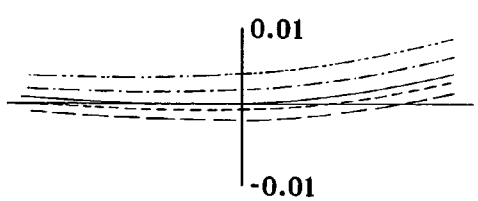
Figure 20G:
Figure 20H:
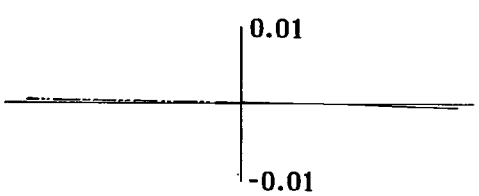
Figure 20E:
Figure 20F:
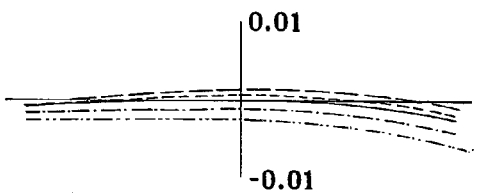
Figure 20C:
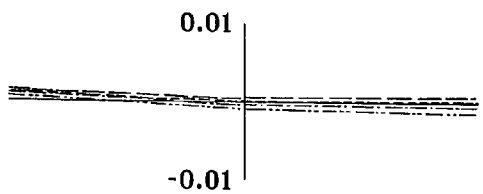
Figure 20D:
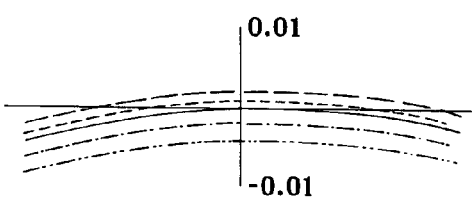
Figure 20A:
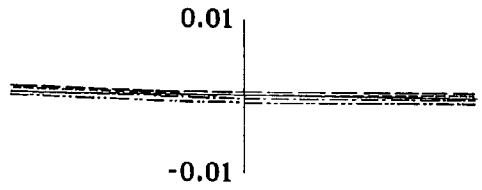
Figure 20B:
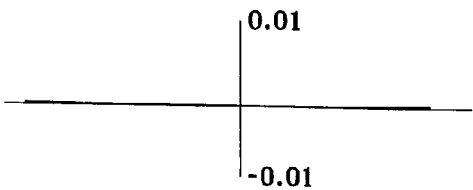
Figure 21Q:
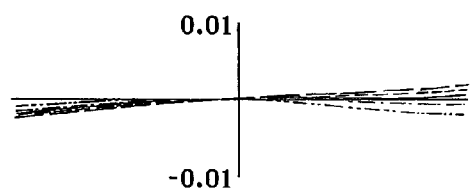
FIG. 21 is the rest of a transverse aberration diagram for the optical system according to Example 5.
Figure 21R:
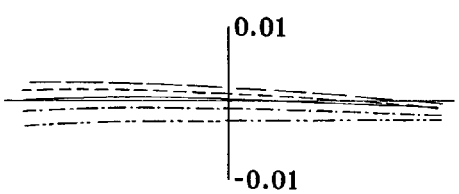
Figure 21O:
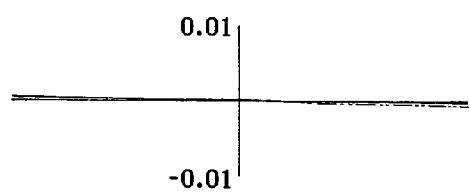
Figure 21P:
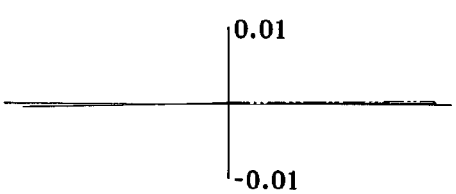
Figure 21M:
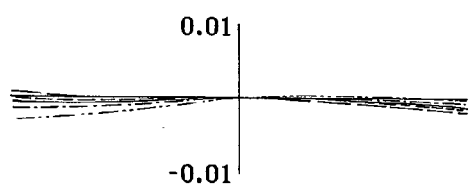
Figure 21N:
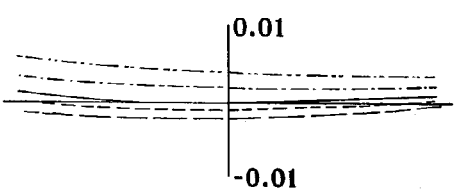
Figure 21K:
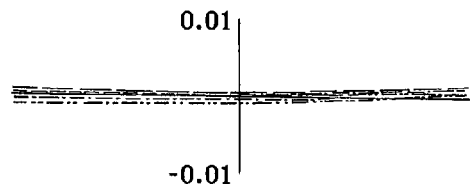
Figure 21L:
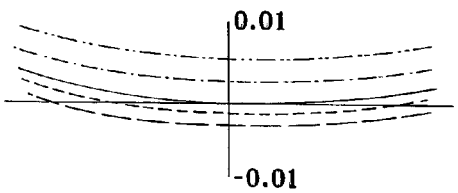
Figure 22I:
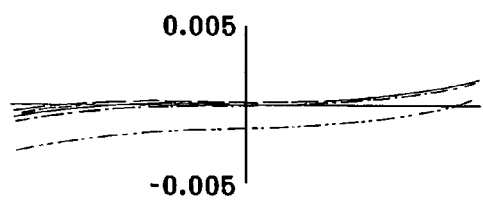
FIG. 22 is a part of a transverse aberration diagram for the optical system according to Example 6.
Figure 22J:
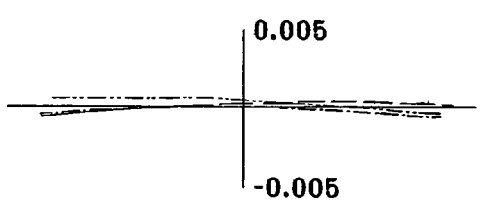
Figure 22G:
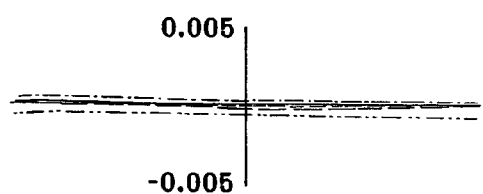
Figure 22H:
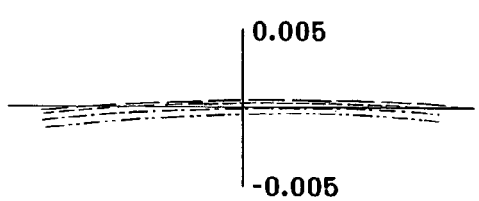
Figure 22E:
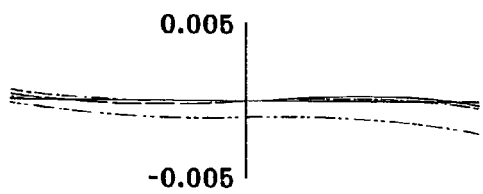
Figure 22F:
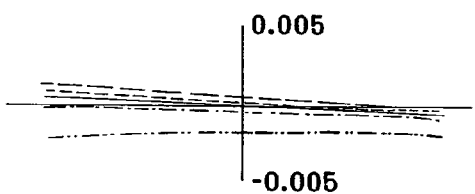
Figure 22C:
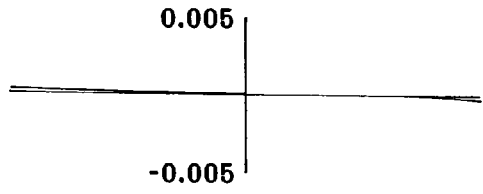
Figure 22D:
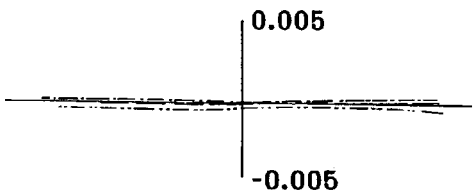
Figure 22A:
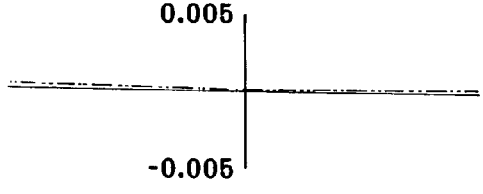
Figure 22B:
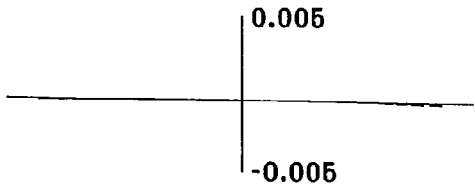
Figure 23Q:
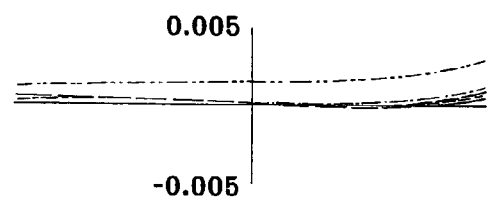
FIG. 23 is the rest of a transverse aberration diagram for the optical system according to Example 6.
Figure 23R:
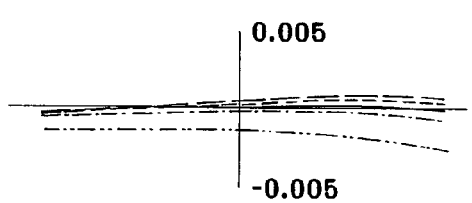
Figure 23O:
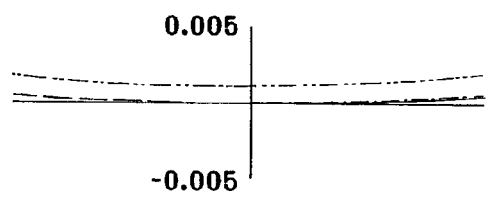
Figure 23P:
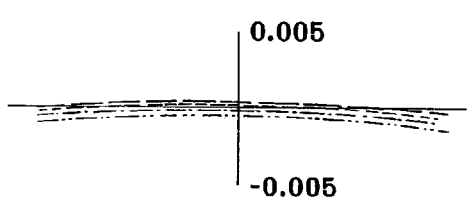
Figure 23M:
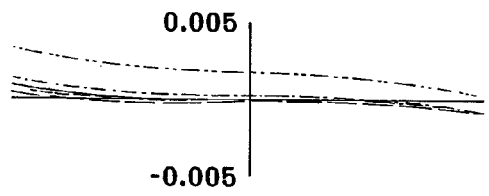
Figure 23N:
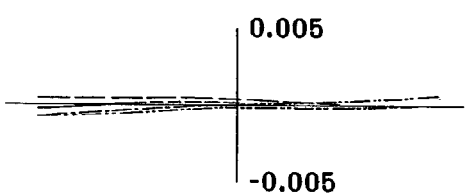
Figure 23K:
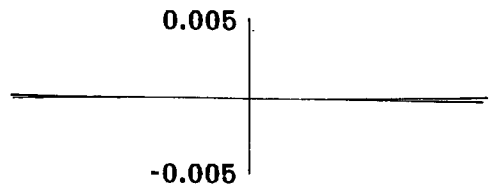
Figure 23L:
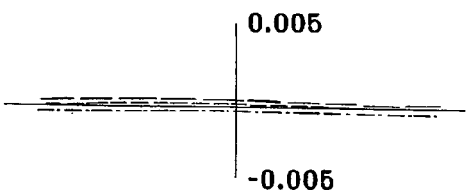
Figure 24I:
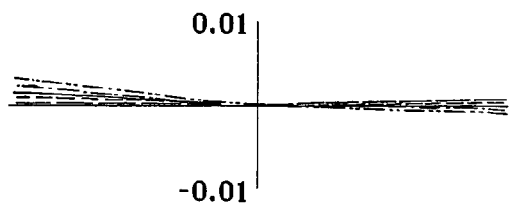
FIG. 24 is a part of a transverse aberration diagram for the optical system according to Example 7.
Figure 24J:
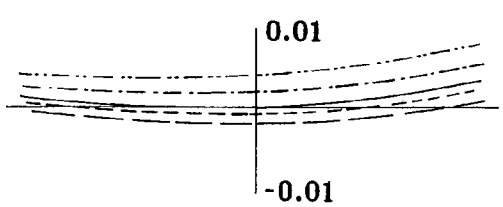
Figure 24G:
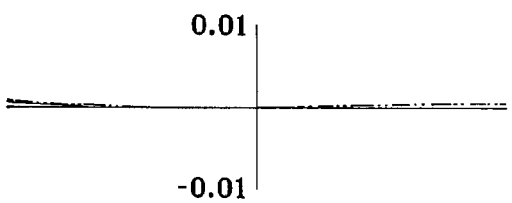
Figure 24H:
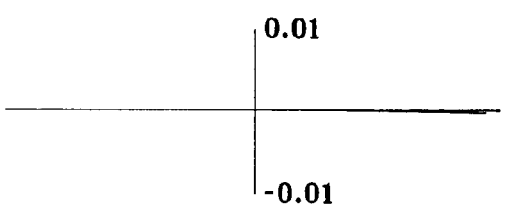
Figure 24E:
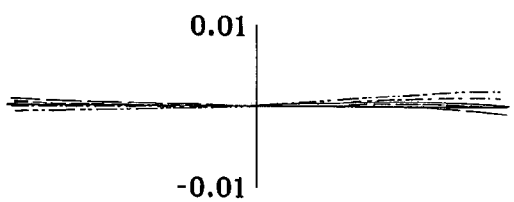
Figure 24F:
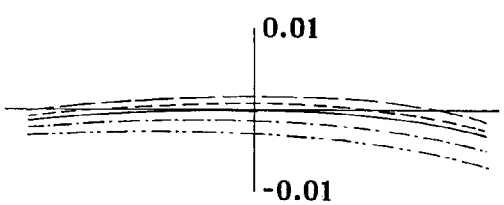
Figure 24C:
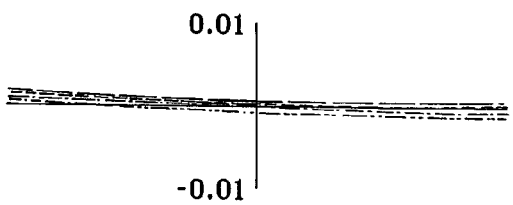
Figure 24D:
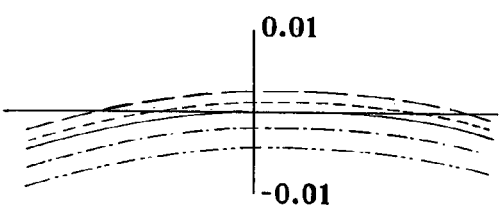
Figure 24A:
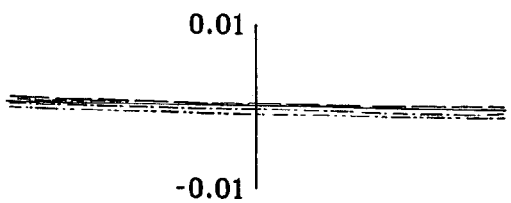
Figure 24B:
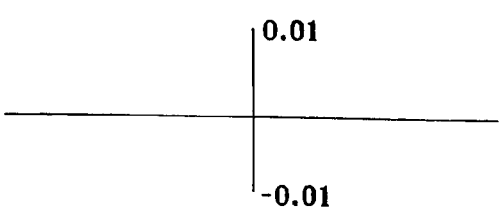
Figure 25Q:
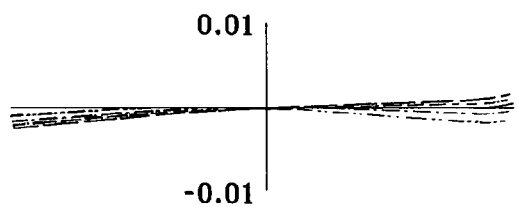
FIG. 25 is the rest of a transverse aberration diagram for the optical system according to Example 7.
Figure 25R:
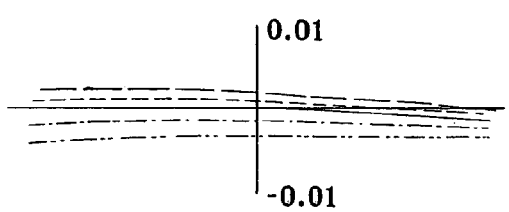
Figure 25O:
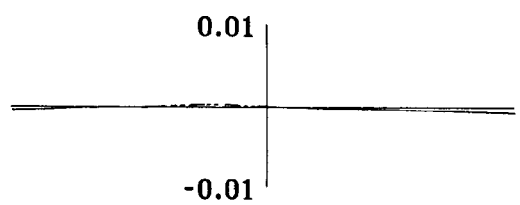
Figure 25P:
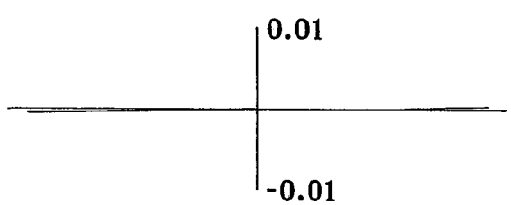
Figure 25M:
Figure 25N:
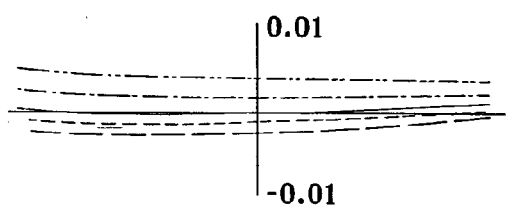
Figure 25K:
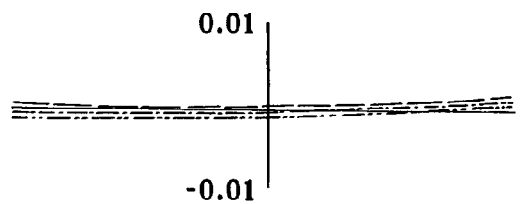
Figure 25L:
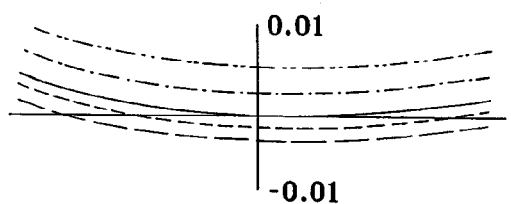
Figure 26I:
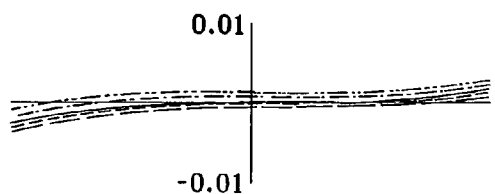
FIG. 26 is a part of a transverse aberration diagram for the optical system according to Example 8 upon focusing an object at infinity.
Figure 26J:
Figure 26G:
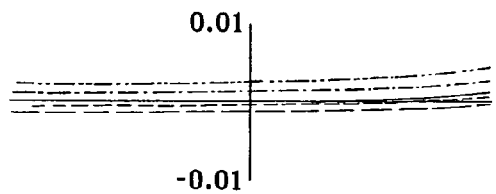
Figure 26H:
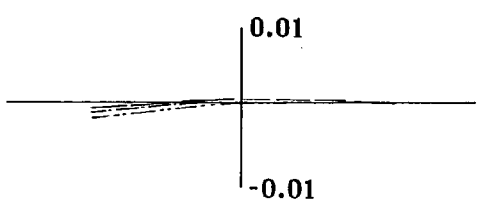
Figure 26E:
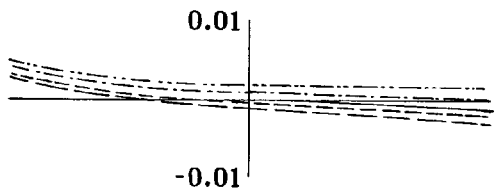
Figure 26F:
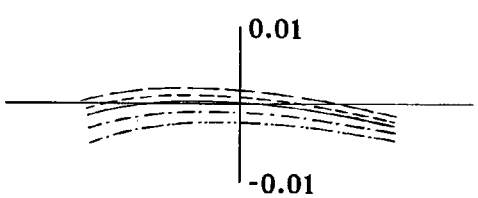
Figure 26C:
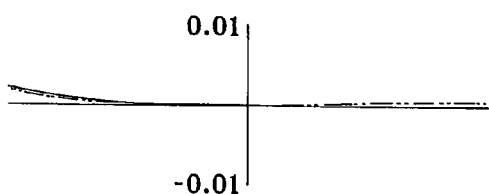
Figure 26D:
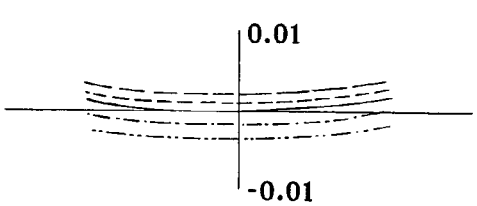
Figure 26A:
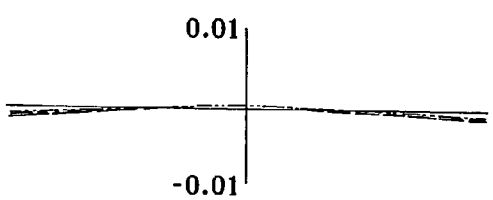
Figure 26B:
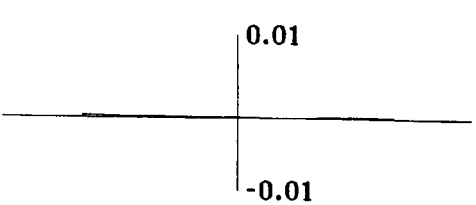
Figure 27Q:
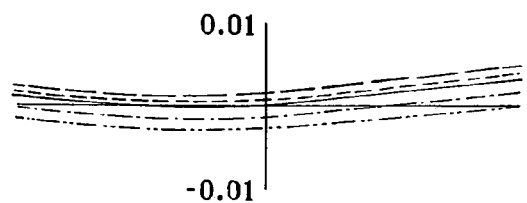
FIG. 27 is the rest of a transverse aberration diagram for the optical system according to Example 8 upon focusing on an object at infinity.
Figure 27R:
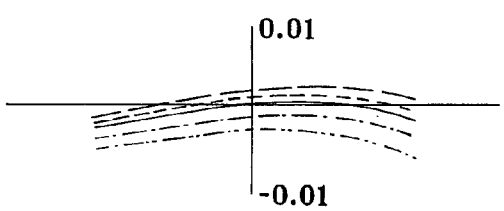
Figure 27O:
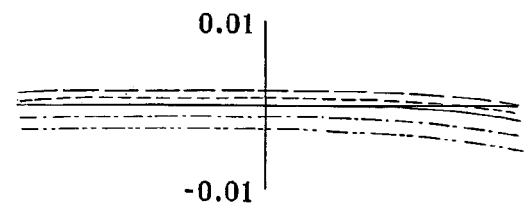
Figure 27P:
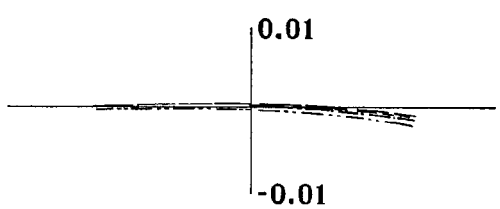
Figure 27M:
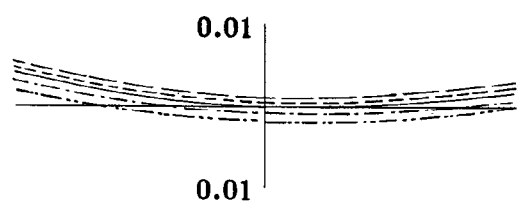
Figure 27N:
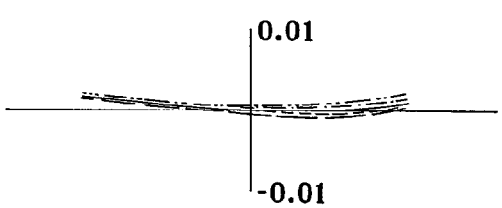
Figure 27K:
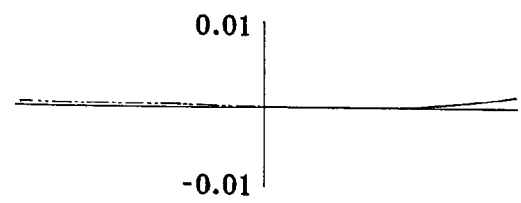
Figure 27L:
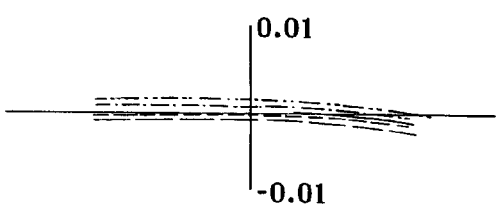
Figure 28I:
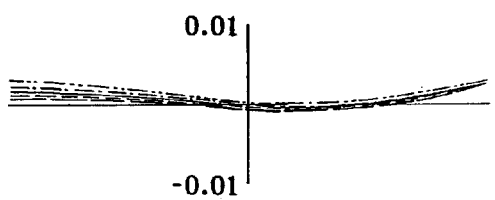
FIG. 28 is a part of a transverse aberration diagram for the optical system according to Example 8 upon focusing on an object at the nearest distance.
Figure 28J:
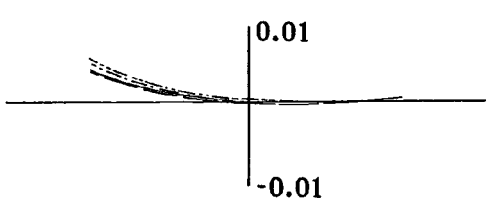
Figure 28G:
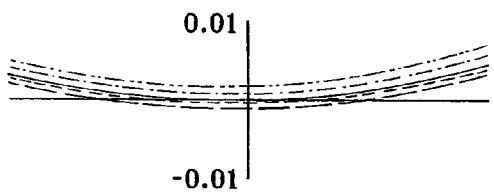
Figure 28H:
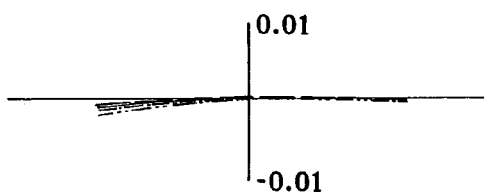
Figure 28E:
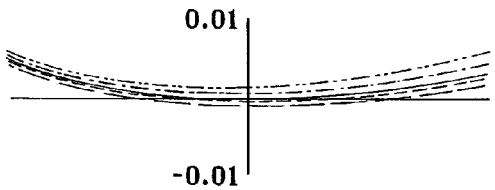
Figure 28F:
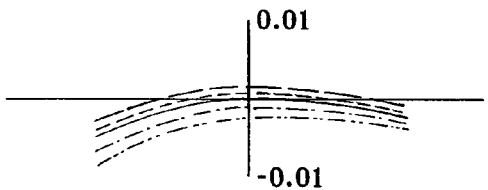
Figure 28C:
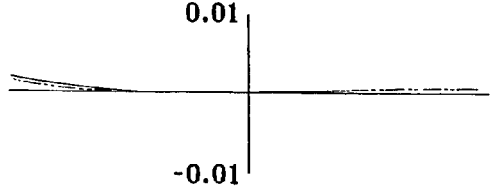
Figure 28D:
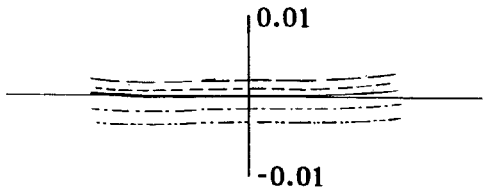
Figure 28A:
Figure 28B:
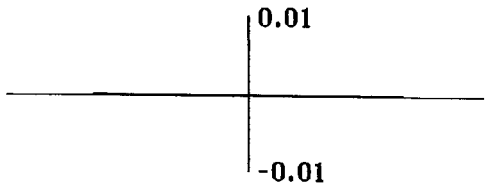
Figure 29Q:
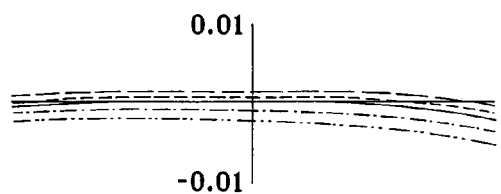
FIG. 29 is the rest of a transverse aberration diagram for the optical system according to Example 8 upon focusing on an object at the nearest distance.
Figure 29R:
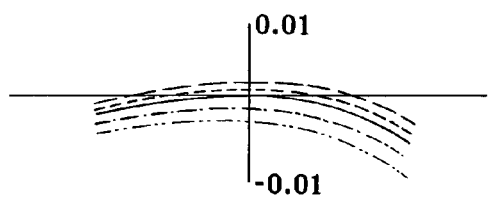
Figure 29O:
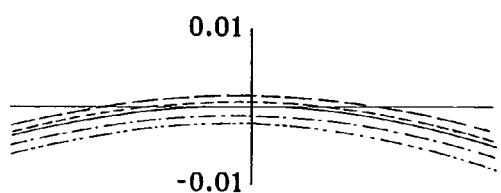
Figure 29P:
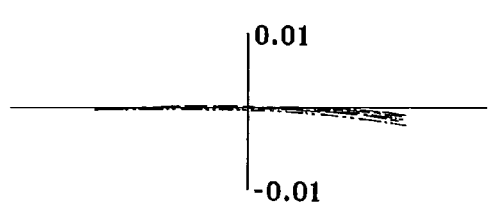
Figure 29M:
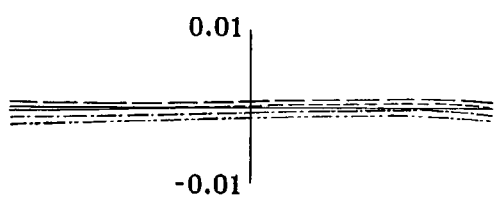
Figure 29N:
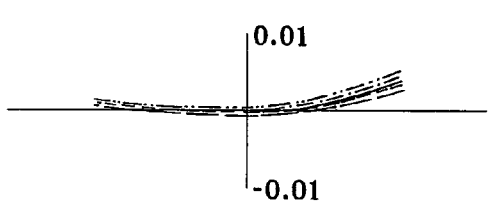
Figure 29K:
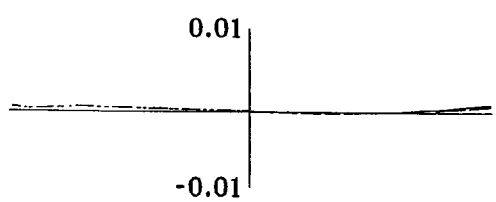
Figure 29L:
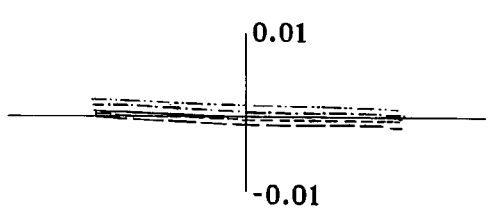
Figure 30I:
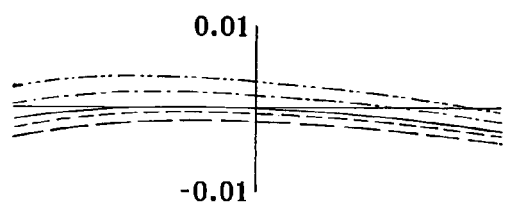
FIG. 30 is a part of a transverse aberration diagram for the optical system according to Example 9 upon focusing an object at infinity.
Figure 30J:
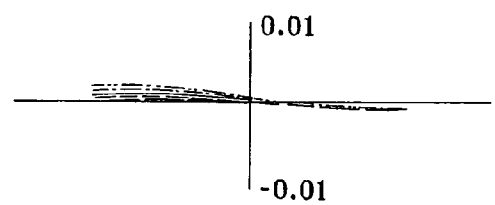
Figure 30G:
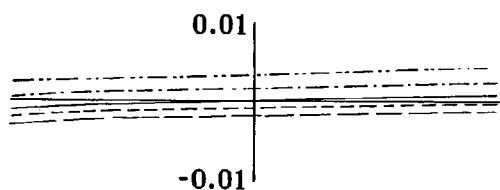
Figure 30H:
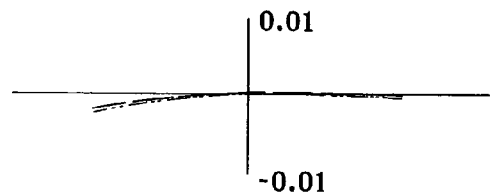
Figure 30E:
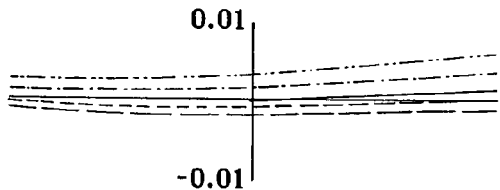
Figure 30F:
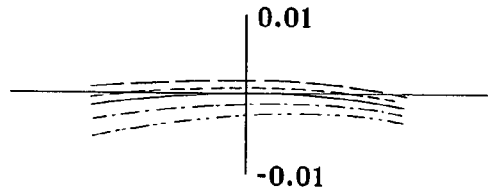
Figure 30C:
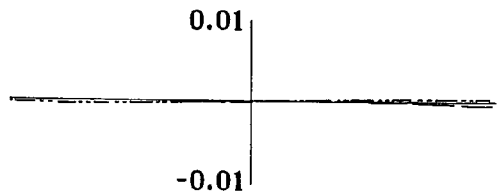
Figure 30D:
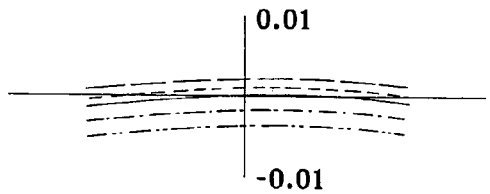
Figure 30A:
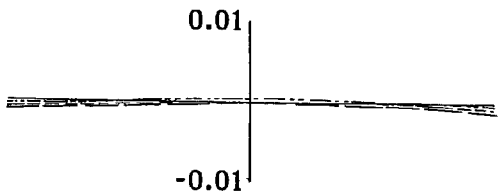
Figure 30B:
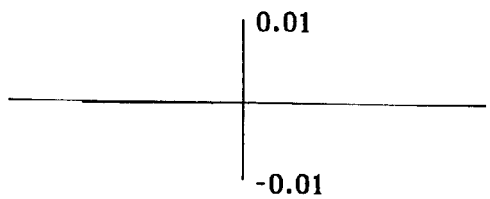
Figure 32I:
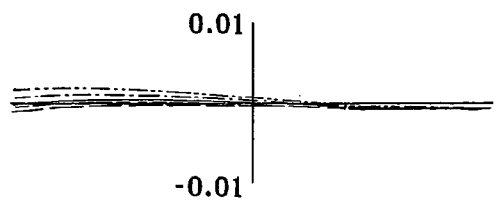
FIG. 32 is a part of a transverse aberration diagram for the optical system according to Example 9 upon focusing on an object at the nearest distance.
Figure 32J:
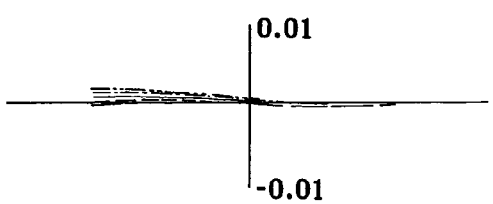
Figure 32G:
Figure 32H:
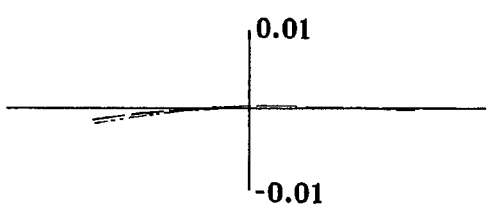
Figure 32E:
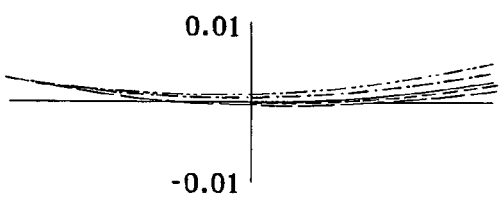
Figure 32F:
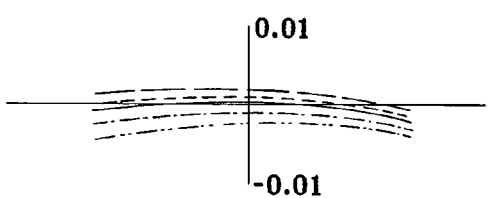
Figure 32C:
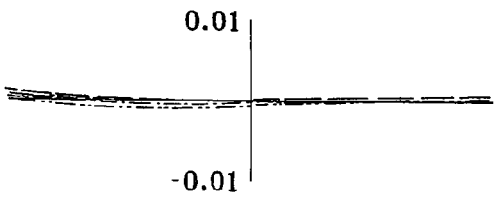
Figure 32D:
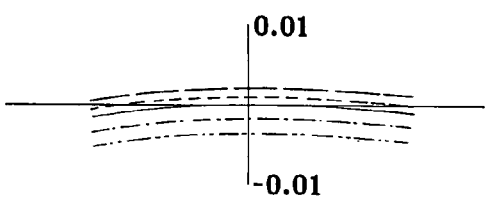
Figure 32A:
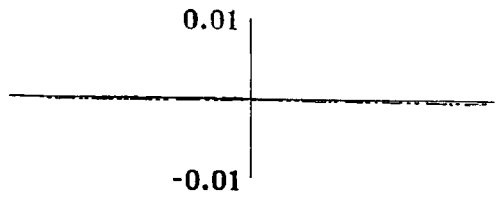
Figure 32B:
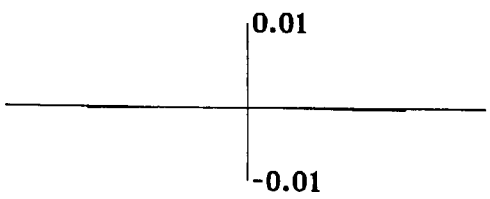
Figure 33Q:
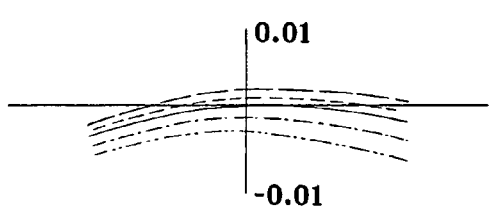
FIG. 33 is the rest of a transverse aberration diagram for the optical system according to Example 9 upon focusing on an object at the nearest distance.
Figure 33R:
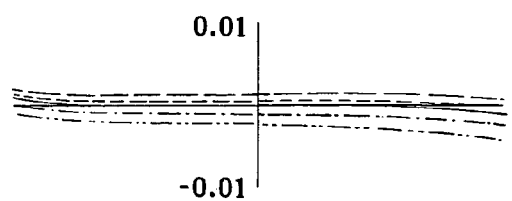
Figure 33O:
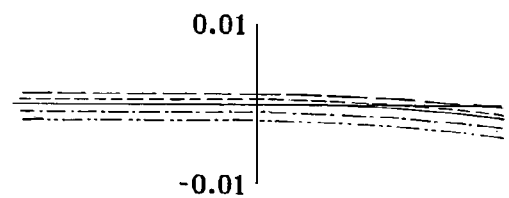
Figure 33P:
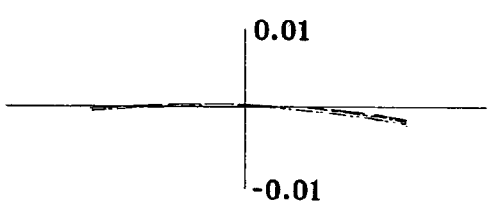
Figure 33M:
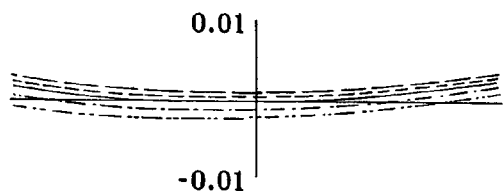
Figure 33N:
Figure 33K:
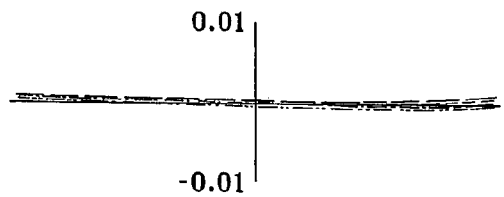
Figure 33L:
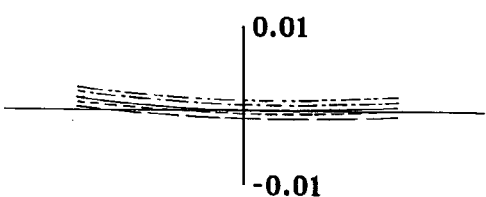
Figure 34I:
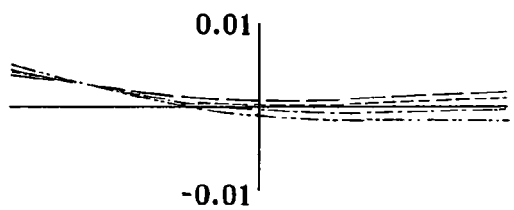
FIG. 34 is a part of a transverse aberration diagram for the optical system according to Example 10 upon focusing an object at infinity.
Figure 34J:
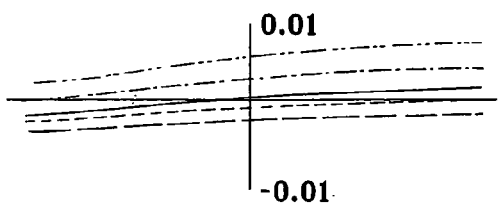
Figure 34G:
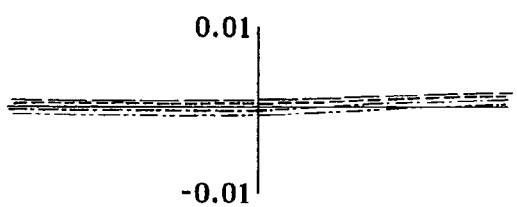
Figure 34H:
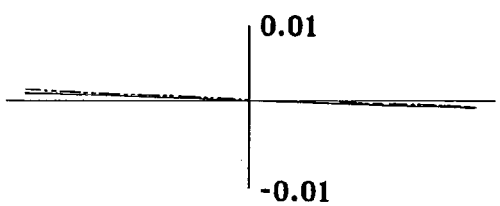
Figure 34E:
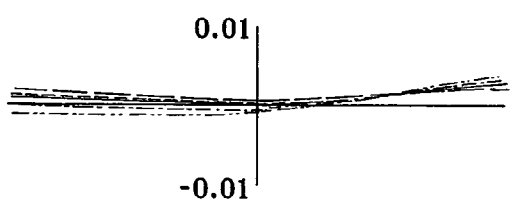
Figure 34F:
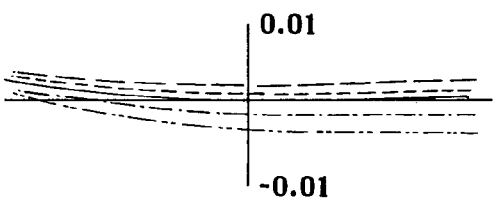
Figure 34C:
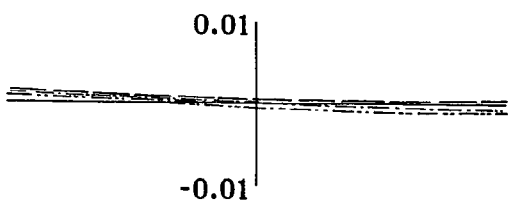
Figure 34D:
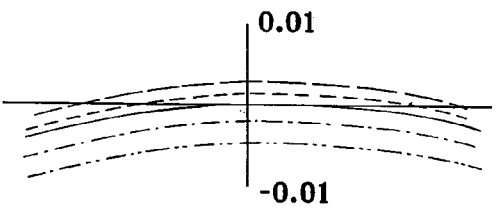
Figure 34A:
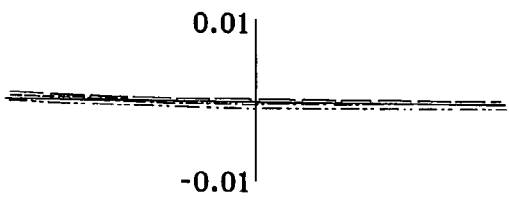
Figure 34B:
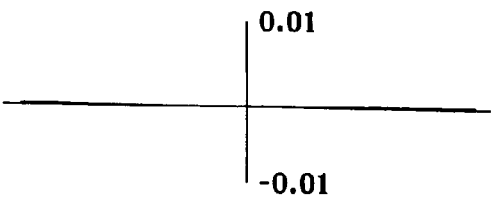
Figure 35Q:
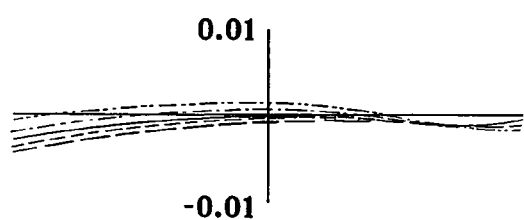
FIG. 35 is the rest of a transverse aberration diagram for the optical system according to Example 10 upon focusing on an object at infinity.
Figure 35R:
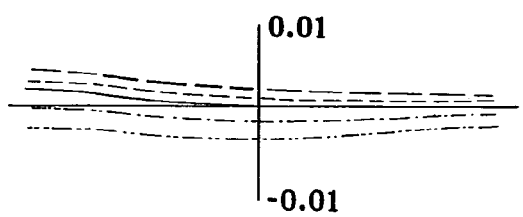
Figure 35O:
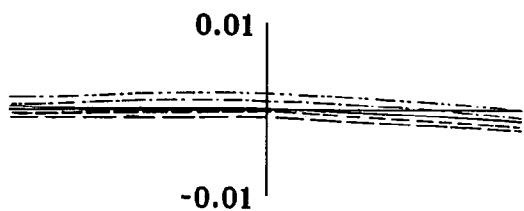
Figure 35P:
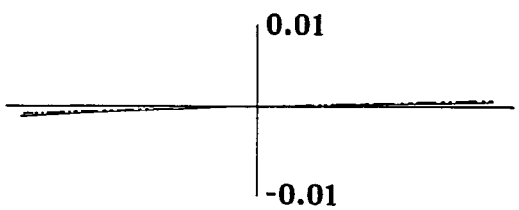
Figure 35M:
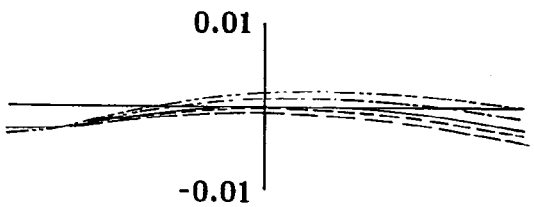
Figure 35N:
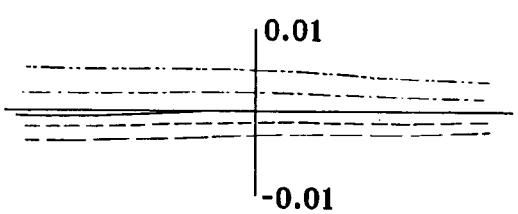
Figure 35K:
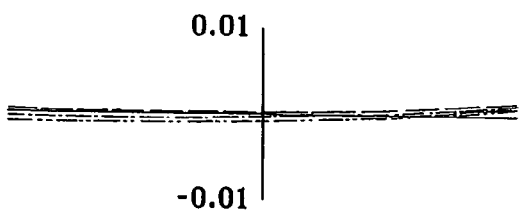
Figure 35L:
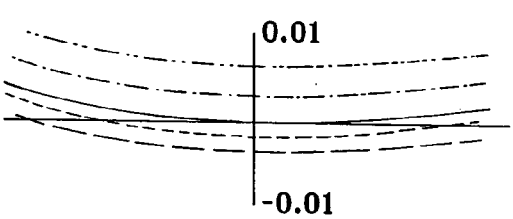
Figure 36I:
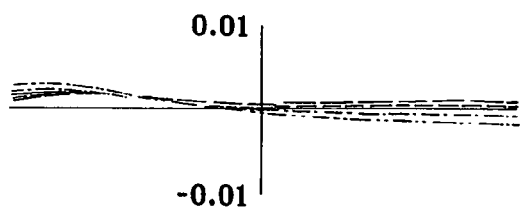
FIG. 36 is a part of a transverse aberration diagram for the optical system according to Example 10 upon focusing on an object at the nearest distance.
Figure 36J:
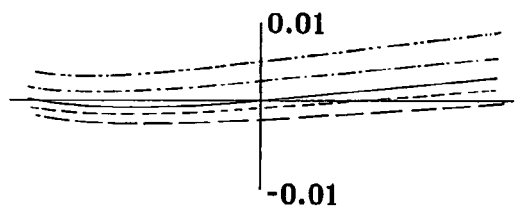
Figure 36G:
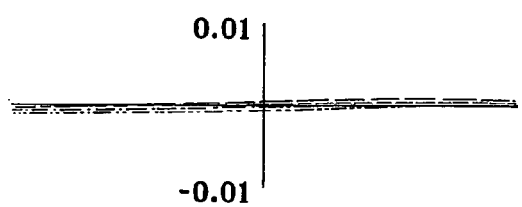
Figure 36H:
Figure 36E:
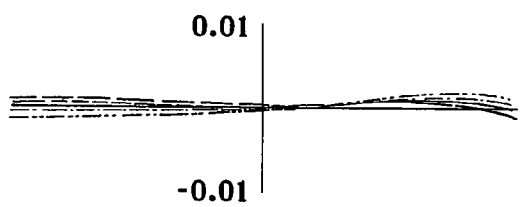
Figure 36F:
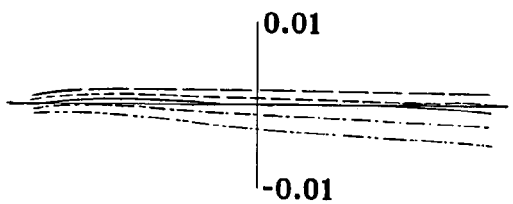
Figure 36C:
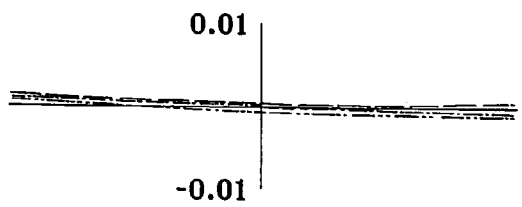
Figure 36D:
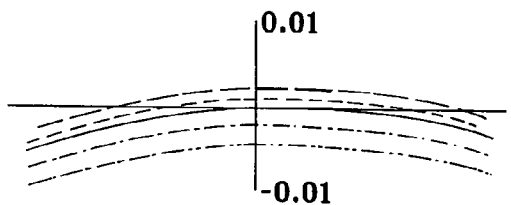
Figure 36A:
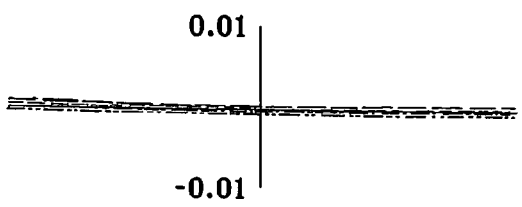
Figure 36B:
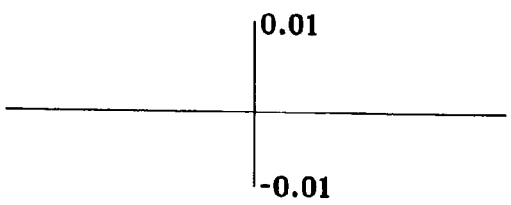
Figure 37Q:
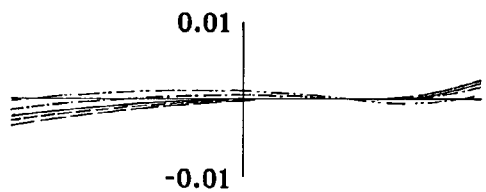
FIG. 37 is the rest of a transverse aberration diagram for the optical system according to Example 10 upon focusing on an object at the nearest distance.
Figure 37R:
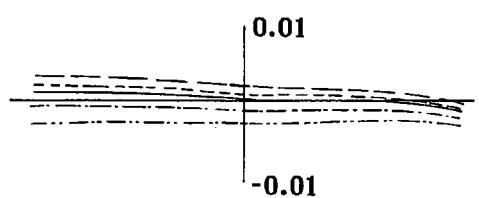
Figure 37O:
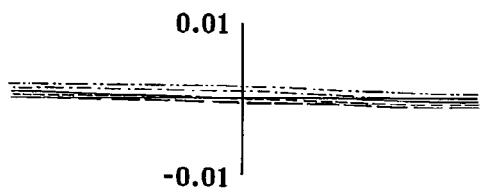
Figure 37P:
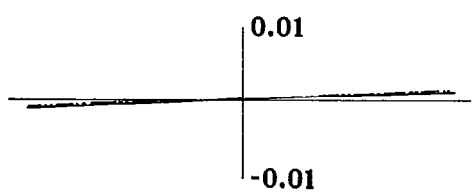
Figure 37M:
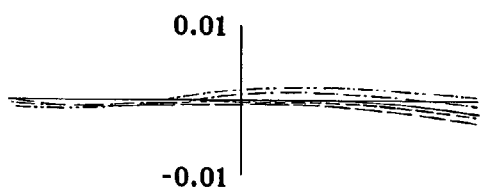
Figure 37N:
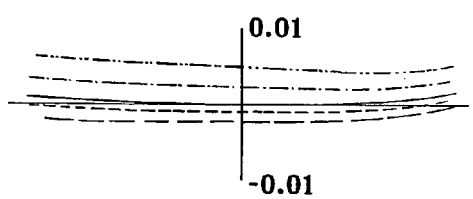
Figure 37K:
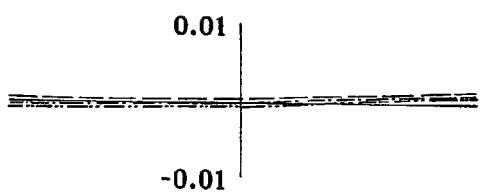
Figure 37L:
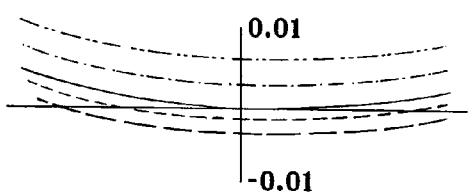

FIGS. 11(a) and 11(b) are similar to FIGS. 2(a) and (b), showing an arrangement of, and an optical path through, the optical system according to Example 10 of the invention.

Transverse aberration diagrams for the optical system of Example 10 upon focusing at infinity, similar to FIGS. 12 and 13, are given as FIGS. 34 and 35, and transverse aberration diagrams upon focusing on the nearest object, similar to FIGS. 12 and 13, are given as FIGS. 36 and 37.

Any detailed explanation of the construction of the optical system is omitted because it is the same as in Example 4. With the optical system of this example, focusing is carried out by movement of the optical element 10 in a direction shown by an arrow in FIG. 11(a). Focusing on the nearest object is carried out by downward movement of the optical element 10 in a direction shown by an arrow in FIG. 11(b). Numerical data on this example will be given later.

Enumerated below are the numerical data on Examples 1–10.

EXAMPLE 1

| Diameter of entrance pupil: | 1.27 mm |
| --- | --- |
| Half entrance angle of view[X]: | 26.6° |
| Half entrance angle of view[Y]: | 20.6° |
| Focal length[X]: | 4.1 mm |
| Focal length[Y]: | 3.7 mm |

| Surface No. | Radius of curvature | Surface separation | Displacement and tilt | Refractive index | Abbe's No. |
| --- | --- | --- | --- | --- | --- |
| Object plane | ∞ | ∞ | | | |
| 1 | ∞ | | (1) | 1.4950 | 65.0 |
| 2 | ∞ | | (2) | | |
| 3 | FFS[1] | | (3) | 1.5842 | 30.5 |
| 4 | FFS[2](RE) | | (4) | 1.5842 | 30.5 |
| 5 | FFS[3] | | (5) | | |
| 6 | ∞(Stop) | | (6) | | |
| 7 | FFS[4] | | (7) | 1.5256 | 56.4 |
| 8 | FFS[5](RE) | | (8) | 1.5256 | 56.4 |
| 9 | FFS[6](RE) | | (9) | 1.5256 | 56.4 |

-continued

| | | | | | |
|---|---|---|---|---|---|
| 10 | FFS[7] | | (10) | | |
| 11 | ∞ | | (11) | 1.5163 | 64.1 |
| 12 | ∞ | | (12) | | |
| Image plane | ∞ | | (13) | | |

FFS[1]

| | | | | | |
|---|---|---|---|---|---|
| $C_4$ | $1.9752 \times 10^{-2}$ | $C_6$ | $6.0861 \times 10^{-2}$ | $C_8$ | $-2.1810 \times 10^{-3}$ |
| $C_{10}$ | $-3.5006 \times 10^{-3}$ | $C_{11}$ | $5.1509 \times 10^{-4}$ | $C_{13}$ | $6.6310 \times 10^{-4}$ |
| $C_{15}$ | $1.5687 \times 10^{-4}$ | | | | |

FFS[2]

| | | | | | |
|---|---|---|---|---|---|
| $C_4$ | $1.7422 \times 10^{-4}$ | $C_6$ | $2.7161 \times 10^{-2}$ | $C_8$ | $-7.9263 \times 10^{-4}$ |
| $C_{10}$ | $1.0776 \times 10^{-3}$ | $C_{11}$ | $-4.0118 \times 10^{-5}$ | $C_{13}$ | $-2.0162 \times 10^{-4}$ |
| $C_{15}$ | $-2.7664 \times 10^{-5}$ | | | | |

FFS[3]

| | | | | | |
|---|---|---|---|---|---|
| $C_4$ | $3.4298 \times 10^{-3}$ | $C_6$ | $8.5707 \times 10^{-3}$ | $C_8$ | $-1.2238 \times 10^{-3}$ |
| $C_{10}$ | $7.7644 \times 10^{-3}$ | $C_{11}$ | $9.7427 \times 10^{-3}$ | $C_{13}$ | $-2.1673 \times 10^{-2}$ |
| $C_{15}$ | $-1.4252 \times 10^{-3}$ | | | | |

FFS[4]

| | | | | | |
|---|---|---|---|---|---|
| $C_4$ | $-3.7853 \times 10^{-2}$ | $C_6$ | $2.4726 \times 10^{-1}$ | $C_8$ | $-2.8027 \times 10^{-3}$ |
| $C_{10}$ | $3.6268 \times 10^{-3}$ | $C_{11}$ | $-7.9097 \times 10^{-4}$ | $C_{13}$ | $-2.3035 \times 10^{-2}$ |
| $C_{15}$ | $1.8123 \times 10^{-2}$ | | | | |

FFS[5]

| | | | | | |
|---|---|---|---|---|---|
| $C_4$ | $2.0890 \times 10^{-2}$ | $C_6$ | $3.0672 \times 10^{-2}$ | $C_8$ | $-7.8752 \times 10^{-4}$ |
| $C_{10}$ | $1.4443 \times 10^{-5}$ | $C_{11}$ | $-2.6216 \times 10^{-5}$ | $C_{13}$ | $3.5995 \times 10^{-5}$ |
| $C_{15}$ | $1.6708 \times 10^{-5}$ | | | | |

FFS[6]

| | | | | | |
|---|---|---|---|---|---|
| $C_4$ | $-1.7671 \times 10^{-2}$ | $C_6$ | $-1.2102 \times 10^{-2}$ | $C_8$ | $-1.6531 \times 10^{-3}$ |
| $C_{10}$ | $-8.4736 \times 10^{-4}$ | $C_{11}$ | $-1.6626 \times 10^{-5}$ | $C_{13}$ | $-8.7406 \times 10^{-5}$ |
| $C_{15}$ | $-4.4735 \times 10^{-5}$ | | | | |

FFS[7]

| | | | | | |
|---|---|---|---|---|---|
| $C_4$ | $2.4963 \times 10^{-2}$ | $C_6$ | $-1.0095 \times 10^{-1}$ | $C_8$ | $-8.1546 \times 10^{-3}$ |
| $C_{10}$ | $-5.5282 \times 10^{-3}$ | $C_{11}$ | $-3.0733 \times 10^{-3}$ | $C_{13}$ | $-5.8691 \times 10^{-3}$ |
| $C_{15}$ | $1.9688 \times 10^{-3}$ | | | | |

Displacement and tilt(1)

| X | 0.00 | Y | 0.00 | Z | 0.00 |
|---|---|---|---|---|---|
| α | 0.00 | β | 0.00 | γ | 0.00 |

Displacement and tilt(2)

| X | 0.00 | Y | 0.00 | Z | 0.50 |
|---|---|---|---|---|---|
| α | 0.00 | β | 0.00 | γ | 0.00 |

Displacement and tilt(3)

| X | 0.00 | Y | 0.00 | Z | 0.70 |
|---|---|---|---|---|---|
| α | 0.00 | β | 0.00 | γ | 0.00 |

Displacement and tilt(4)

| X | 0.00 | Y | 0.00 | Z | 2.69 |
|---|---|---|---|---|---|
| α | -45.00 | β | 0.00 | γ | 0.00 |

Displacement and tilt(5)

| X | 0.00 | Y | 3.80 | Z | 2.69 |
|---|---|---|---|---|---|
| α | -90.00 | β | 0.00 | γ | 0.00 |

Displacement and tilt(6)

| X | 0.00 | Y | 4.28 | Z | 2.69 |
|---|---|---|---|---|---|
| α | -90.00 | β | 0.00 | γ | 0.00 |

Displacement and tilt(7)

| X | 0.00 | Y | 4.50 | Z | 2.69 |
|---|---|---|---|---|---|
| α | -90.00 | β | 0.00 | γ | -90.00 |

Displacement and tilt(8)

| X | 0.00 | Y | 11.61 | Z | 2.69 |
|---|---|---|---|---|---|
| α | -90.00 | β | 18.33 | γ | -90.00 |

-continued

Displacement and tilt(9)

| X | -2.78 | Y | 7.87 | Z | 2.69 |
|---|---|---|---|---|---|
| α | -90.00 | β | 63.77 | γ | -90.00 |

Displacement and tilt(10)

| X | 3.09 | Y | 7.78 | Z | 2.69 |
|---|---|---|---|---|---|
| α | 90.00 | β | 88.00 | γ | 90.00 |

Displacement and tilt(11)

| X | 3.61 | Y | 7.78 | Z | 2.69 |
|---|---|---|---|---|---|
| α | 0.00 | β | -90.00 | γ | 0.00 |

Displacement and tilt(12)

| X | 3.91 | Y | 7.78 | Z | 2.69 |
|---|---|---|---|---|---|
| α | 0.00 | β | -90.00 | γ | 0.00 |

Displacement and tilt(13)

| X | 4.53 | Y | 7.78 | Z | 2.69 |
|---|---|---|---|---|---|
| α | 0.00 | β | -90.00 | γ | 0.00 |

EXAMPLE 2

| | |
|---|---|
| Diameter of entrance pupil: | 1.27 mm |
| Half entrance angle of view[X]: | 26.6° |
| Half entrance angle of view[Y]: | 20.6° |
| Focal length[X]: | 4.1 mm |
| Focal length[Y]: | 3.6 mm |

| Surface No. | Radius of curvature | Surface separation | Displacement and tilt | Refractive index | Abbe's No. |
|---|---|---|---|---|---|
| Object plane | ∞ | ∞ | | | |
| 1 | ∞ | | (1) | 1.4950 | 65.0 |
| 2 | ∞ | | (2) | | |
| 3 | FFS[1] | | (3) | 1.5842 | 30.5 |
| 4 | FFS[2] (RE) | | (4) | 1.5842 | 30.5 |
| 5 | FFS[3] | | (5) | | |
| 6 | ∞(Stop) | | (6) | | |
| 7 | FFS[4] | | (7) | 1.5256 | 56.4 |
| 8 | FFS[5] (RE) | | (8) | 1.5256 | 56.4 |
| 9 | FFS[6] (RE) | | (9) | 1.5256 | 56.4 |
| 10 | FFS[7] | | (10) | | |
| 11 | ∞ | | (11) | 1.5163 | 64.1 |
| 12 | ∞ | | (12) | | |
| Image plane | ∞ | | (13) | | |

FFS[1]

| | | | | | |
|---|---|---|---|---|---|
| $C_4$ | $2.1366 \times 10^{-2}$ | $C_6$ | $6.9035 \times 10^{-2}$ | $C_8$ | $3.0084 \times 10^{-4}$ |
| $C_{10}$ | $-4.6241 \times 10^{-3}$ | $C_{11}$ | $4.4574 \times 10^{-4}$ | $C_{13}$ | $7.3373 \times 10^{-4}$ |
| $C_{15}$ | $4.2539 \times 10^{-4}$ | | | | |

FFS[2]

| | | | | | |
|---|---|---|---|---|---|
| $C_4$ | $9.2833 \times 10^{-4}$ | $C_6$ | $2.8526 \times 10^{-2}$ | $C_8$ | $-1.0384 \times 10^{-3}$ |
| $C_{10}$ | $8.2126 \times 10^{-4}$ | $C_{11}$ | $2.7293 \times 10^{-5}$ | $C_{13}$ | $-1.6379 \times 10^{-4}$ |
| $C_{15}$ | $-8.3839 \times 10^{-5}$ | | | | |

FFS[3]

| | | | | | |
|---|---|---|---|---|---|
| $C_4$ | $-9.2434 \times 10^{-3}$ | $C_6$ | $-4.5319 \times 10^{-3}$ | $C_8$ | $-9.8337 \times 10^{-3}$ |
| $C_{10}$ | $7.2874 \times 10^{-3}$ | $C_{11}$ | $9.0652 \times 10^{-3}$ | $C_{13}$ | $-1.8192 \times 10^{-2}$ |
| $C_{15}$ | $-1.7790 \times 10^{-3}$ | | | | |

FFS[4]

| | | | | | |
|---|---|---|---|---|---|
| $C_4$ | $-4.5834 \times 10^{-2}$ | $C_6$ | $2.2522 \times 10^{-1}$ | $C_7$ | $-9.8797 \times 10^{-4}$ |
| $C_8$ | $-2.3361 \times 10^{-3}$ | $C_9$ | $9.2701 \times 10^{-4}$ | $C_{10}$ | $2.4411 \times 10^{-3}$ |
| $C_{11}$ | $-5.9122 \times 10^{-4}$ | $C_{12}$ | $1.7361 \times 10^{-4}$ | $C_{13}$ | $-1.8242 \times 10^{-3}$ |
| $C_{14}$ | $1.2584 \times 10^{-5}$ | $C_{15}$ | $1.6159 \times 10^{-2}$ | | |

-continued

FFS[5]

| | | | | | |
|---|---|---|---|---|---|
| $C_4$ | $2.0528 \times 10^{-2}$ | $C_6$ | $2.9875 \times 10^{-2}$ | $C_7$ | $-4.2166 \times 10^{-5}$ |
| $C_8$ | $-6.9711 \times 10^{-4}$ | $C_9$ | $-9.8063 \times 10^{-5}$ | $C_{10}$ | $-5.9507 \times 10^{-5}$ |
| $C_{11}$ | $-1.8875 \times 10^{-5}$ | $C_{12}$ | $6.7699 \times 10^{-6}$ | $C_{13}$ | $5.2455 \times 10^{-5}$ |
| $C_{14}$ | $-1.9258 \times 10^{-5}$ | $C_{15}$ | $2.3219 \times 10^{-5}$ | | |

FFS[6]

| | | | | | |
|---|---|---|---|---|---|
| $C_4$ | $-1.7756 \times 10^{-2}$ | $C_6$ | $-1.2013 \times 10^{-2}$ | $C_7$ | $4.8486 \times 10^{-6}$ |
| $C_8$ | $-1.5375 \times 10^{-3}$ | $C_9$ | $9.5416 \times 10^{-5}$ | $C_{10}$ | $-9.3881 \times 10^{-4}$ |
| $C_{11}$ | $-8.9675 \times 10^{-6}$ | $C_{12}$ | $1.2098 \times 10^{-5}$ | $C_{13}$ | $-7.3535 \times 10^{-5}$ |
| $C_{14}$ | $-1.2286 \times 10^{-5}$ | $C_{15}$ | $-4.8407 \times 10^{-5}$ | | |

FFS[7]

| | | | | | |
|---|---|---|---|---|---|
| $C_4$ | $3.7412 \times 10^{-2}$ | $C_6$ | $-8.6455 \times 10^{-2}$ | $C_7$ | $1.0895 \times 10^{-3}$ |
| $C_8$ | $-1.0188 \times 10^{-2}$ | $C_9$ | $7.2058 \times 10^{-3}$ | $C_{10}$ | $-6.2964 \times 10^{-3}$ |
| $C_{11}$ | $-4.8071 \times 10^{-3}$ | $C_{12}$ | $1.1183 \times 10^{-3}$ | $C_{13}$ | $-8.2850 \times 10^{-3}$ |
| $C_{14}$ | $6.4640 \times 10^{-4}$ | $C_{15}$ | $-8.6390 \times 10^{-4}$ | | |

Displacement and tilt(1)

| X | 0.00 | Y | 0.00 | Z | 0.00 |
|---|---|---|---|---|---|
| α | 0.00 | β | 0.00 | γ | 0.00 |

Displacement and tilt(2)

| X | 0.00 | Y | 0.00 | Z | 0.50 |
|---|---|---|---|---|---|
| α | 0.00 | β | 0.00 | γ | 0.00 |

Displacement and tilt(3)

| X | 0.00 | Y | 0.00 | Z | 0.70 |
|---|---|---|---|---|---|
| α | 0.00 | β | 0.00 | γ | 0.00 |

Displacement and tilt(4)

| X | 0.00 | Y | 0.00 | Z | 2.71 |
|---|---|---|---|---|---|
| α | −45.00 | β | 0.00 | γ | 0.00 |

Displacement and tilt(5)

| X | 0.00 | Y | 4.15 | Z | 2.71 |
|---|---|---|---|---|---|
| α | −90.00 | β | 0.00 | γ | 0.00 |

Displacement and tilt(6)

| X | 0.00 | Y | 4.69 | Z | 2.71 |
|---|---|---|---|---|---|
| α | −90.00 | β | 0.00 | γ | 0.00 |

Displacement and tilt(7)

| X | 0.00 | Y | 4.91 | Z | 2.71 |
|---|---|---|---|---|---|
| α | −90.00 | β | 0.00 | γ | −90.00 |

Displacement and tilt(8)

| X | 0.00 | Y | 12.16 | Z | 2.71 |
|---|---|---|---|---|---|
| α | −90.00 | β | 18.52 | γ | −90.00 |

Displacement and tilt(9)

| X | −2.86 | Y | 8.37 | Z | 2.71 |
|---|---|---|---|---|---|
| α | −90.00 | β | 63.96 | γ | −90.00 |

Displacement and tilt(10)

| X | 3.17 | Y | 8.28 | Z | 2.71 |
|---|---|---|---|---|---|
| α | 90.00 | β | 87.96 | γ | 90.00 |

Displacement and tilt(11)

| X | 3.67 | Y | 8.27 | Z | 2.71 |
|---|---|---|---|---|---|
| α | 0.00 | β | −90.00 | γ | 0.00 |

Displacement and tilt(12)

| X | 3.97 | Y | 8.27 | Z | 2.71 |
|---|---|---|---|---|---|
| α | 0.00 | β | −90.00 | γ | 0.00 |

Displacement and tilt(13)

| X | 4.59 | Y | 8.27 | Z | 2.71 |
|---|---|---|---|---|---|
| α | 0.00 | β | −90.00 | γ | 0.00 |

EXAMPLE 3

| | |
|---|---|
| Diameter of entrance pupil: | 1.27 mm |
| Half entrance angle of view[X]: | 26.6° |
| Half entrance angle of view[Y]: | 20.6° |
| Focal length[X]: | 4.1 mm |
| Focal length[Y]: | 3.5 mm |

| Surface No. | Radius of curvature | Surface separation | Displacement and tilt | Refractive index | Abbe's No. |
|---|---|---|---|---|---|
| Object plane | ∞ | ∞ | | | |
| 1 | ∞ | | (1) | 1.4950 | 65.0 |
| 2 | ∞ | | (2) | | |
| 3 | FFS[1] | | (3) | 1.5842 | 30.5 |
| 4 | FFS[2] (RE) | | (4) | 1.5842 | 30.5 |
| 5 | FFS[3] | | (5) | | |
| 6 | ∞(Stop) | | (6) | | |
| 7 | FFS[4] | | (7) | 1.5256 | 56.4 |
| 8 | FFS[5] (RE) | | (8) | 1.5256 | 56.4 |
| 9 | FFS[6] (RE) | | (9) | 1.5256 | 56.4 |
| 10 | FFS[7] | | (10) | | |
| 11 | ∞ | | (11) | 1.5163 | 64.1 |
| 12 | ∞ | | (12) | | |
| Image plane | ∞ | | (13) | | |

FFS[1]

| | | | | | |
|---|---|---|---|---|---|
| $C_4$ | $2.1931 \times 10^{-2}$ | $C_6$ | $6.8717 \times 10^{-2}$ | $C_7$ | $3.4411 \times 10^{-4}$ |
| $C_8$ | $3.5676 \times 10^{-4}$ | $C_9$ | $-3.4811 \times 10^{-4}$ | $C_{10}$ | $-4.7333 \times 10^{-3}$ |
| $C_{11}$ | $5.0764 \times 10^{-4}$ | $C_{12}$ | $1.3485 \times 10^{-5}$ | $C_{13}$ | $7.0733 \times 10^{-4}$ |
| $C_{14}$ | $-1.0676 \times 10^{-4}$ | $C_{15}$ | $5.1878 \times 10^{-4}$ | | |

FFS[2]

| | | | | | |
|---|---|---|---|---|---|
| $C_4$ | $8.6611 \times 10^{-4}$ | $C_6$ | $2.8606 \times 10^{-2}$ | $C_7$ | $9.2301 \times 10^{-5}$ |
| $C_8$ | $-1.1912 \times 10^{-3}$ | $C_9$ | $-1.4301 \times 10^{-4}$ | $C_{10}$ | $7.7117 \times 10^{-4}$ |
| $C_{11}$ | $1.7891 \times 10^{-5}$ | $C_{12}$ | $-4.5229 \times 10^{-5}$ | $C_{13}$ | $-1.5975 \times 10^{-4}$ |
| $C_{14}$ | $-1.1805 \times 10^{-5}$ | $C_{15}$ | $-9.8078 \times 10^{-5}$ | | |

FFS[3]

| | | | | | |
|---|---|---|---|---|---|
| $C_4$ | $-1.1310 \times 10^{-2}$ | $C_6$ | $-5.8669 \times 10^{-3}$ | $C_7$ | $-1.4710 \times 10^{-3}$ |
| $C_8$ | $-1.0938 \times 10^{-2}$ | $C_9$ | $4.9805 \times 10^{-3}$ | $C_{10}$ | $6.8942 \times 10^{-3}$ |
| $C_{11}$ | $9.4849 \times 10^{-3}$ | $C_{12}$ | $-2.1540 \times 10^{-3}$ | $C_{13}$ | $-1.8442 \times 10^{-2}$ |
| $C_{14}$ | $3.1132 \times 10^{-4}$ | $C_{15}$ | $-2.3800 \times 10^{-3}$ | | |

FFS[4]

| | | | | | |
|---|---|---|---|---|---|
| $C_4$ | $-4.5627 \times 10^{-2}$ | $C_6$ | $2.2986 \times 10^{-1}$ | $C_7$ | $-9.9037 \times 10^{-4}$ |
| $C_8$ | $3.3507 \times 10^{-3}$ | $C_9$ | $8.7221 \times 10^{-4}$ | $C_{10}$ | $1.2509 \times 10^{-3}$ |
| $C_{11}$ | $-9.1674 \times 10^{-4}$ | $C_{12}$ | $-2.4042 \times 10^{-4}$ | $C_{13}$ | $-1.8760 \times 10^{-2}$ |
| $C_{14}$ | $2.4577 \times 10^{-3}$ | $C_{15}$ | $1.7002 \times 10^{-2}$ | | |

FFS[5]

| | | | | | |
|---|---|---|---|---|---|
| $C_4$ | $2.0922 \times 10^{-2}$ | $C_6$ | $3.0345 \times 10^{-2}$ | $C_7$ | $-7.3195 \times 10^{-5}$ |
| $C_8$ | $-6.8327 \times 10^{-4}$ | $C_9$ | $-8.8903 \times 10^{-5}$ | $C_{10}$ | $-3.9062 \times 10^{-5}$ |
| $C_{11}$ | $-4.6768 \times 10^{-6}$ | $C_{12}$ | $1.0935 \times 10^{-5}$ | $C_{13}$ | $5.7807 \times 10^{-5}$ |
| $C_{14}$ | $-1.4105 \times 10^{-5}$ | $C_{15}$ | $2.5929 \times 10^{-5}$ | | |

FFS[6]

| | | | | | |
|---|---|---|---|---|---|
| $C_4$ | $-1.7231 \times 10^{-2}$ | $C_6$ | $-1.1261 \times 10^{-2}$ | $C_7$ | $-2.8473 \times 10^{-5}$ |
| $C_8$ | $-1.6349 \times 10^{-3}$ | $C_9$ | $1.3061 \times 10^{-4}$ | $C_{10}$ | $-8.8022 \times 10^{-4}$ |
| $C_{11}$ | $1.4363 \times 10^{-5}$ | $C_{12}$ | $1.9348 \times 10^{-5}$ | $C_{13}$ | $-8.2933 \times 10^{-5}$ |
| $C_{14}$ | $-1.0730 \times 10^{-5}$ | $C_{15}$ | $-4.3906 \times 10^{-5}$ | | |

FFS[7]

| | | | | | |
|---|---|---|---|---|---|
| $C_4$ | $4.1312 \times 10^{-2}$ | $C_6$ | $-7.9781 \times 10^{-2}$ | $C_7$ | $1.6090 \times 10^{-3}$ |
| $C_8$ | $-8.4367 \times 10^{-3}$ | $C_9$ | $6.7578 \times 10^{-3}$ | $C_{10}$ | $-4.5789 \times 10^{-3}$ |
| $C_{11}$ | $-5.4262 \times 10^{-3}$ | $C_{12}$ | $-1.2258 \times 10^{-4}$ | $C_{13}$ | $-9.3727 \times 10^{-3}$ |
| $C_{14}$ | $1.3003 \times 10^{-3}$ | $C_{15}$ | $-2.2055 \times 10^{-4}$ | | |

Displacement and tilt(1)

| X | 0.00 | Y | 0.00 | Z | 0.00 |
|---|---|---|---|---|---|
| α | 0.00 | β | 0.00 | γ | 0.00 |

-continued

Displacement and tilt(2)

| | | | | | |
|---|---|---|---|---|---|
| X | 0.00 | Y | 0.00 | Z | 0.50 |
| α | 0.00 | β | 0.00 | γ | 0.00 |

Displacement and tilt(3)

| | | | | | |
|---|---|---|---|---|---|
| X | 0.00 | Y | 0.00 | Z | 0.70 |
| α | 0.00 | β | 0.00 | γ | 0.00 |

Displacement and tilt(4)

| | | | | | |
|---|---|---|---|---|---|
| X | 0.00 | Y | 0.00 | Z | 2.70 |
| α | −45.00 | β | 0.00 | γ | 0.00 |

Displacement and tilt(5)

| | | | | | |
|---|---|---|---|---|---|
| X | 0.00 | Y | 4.16 | Z | 2.70 |
| α | −90.00 | β | 0.00 | γ | 0.00 |

Displacement and tilt(6)

| | | | | | |
|---|---|---|---|---|---|
| X | 0.00 | Y | 4.67 | Z | 2.70 |
| α | −90.00 | β | 0.00 | γ | 0.00 |

Displacement and tilt(7)

| | | | | | |
|---|---|---|---|---|---|
| X | 0.00 | Y | 4.89 | Z | 2.70 |
| α | −90.00 | β | 0.00 | γ | −90.00 |

Displacement and tilt(8)

| | | | | | |
|---|---|---|---|---|---|
| X | 0.00 | Y | 12.18 | Z | 2.70 |
| α | −90.00 | β | 18.30 | γ | −90.00 |

Displacement and tilt(9)

| | | | | | |
|---|---|---|---|---|---|
| X | −2.85 | Y | 8.34 | Z | 2.70 |
| α | −90.00 | β | 63.70 | γ | −90.00 |

Displacement and tilt(10)

| | | | | | |
|---|---|---|---|---|---|
| X | 3.24 | Y | 8.26 | Z | 2.70 |
| α | 90.00 | β | 88.34 | γ | 90.00 |

Displacement and tilt(11)

| | | | | | |
|---|---|---|---|---|---|
| X | 3.72 | Y | 8.25 | Z | 2.70 |
| α | 0.00 | β | −90.00 | γ | 0.00 |

Displacement and tilt(12)

| | | | | | |
|---|---|---|---|---|---|
| X | 4.02 | Y | 8.25 | Z | 2.70 |
| α | 0.00 | β | −90.00 | γ | 0.00 |

Displacement and tilt(13)

| | | | | | |
|---|---|---|---|---|---|
| X | 4.65 | Y | 8.25 | Z | 2.70 |
| α | 0.00 | β | −90.00 | γ | 0.00 |

EXAMPLE 4

| | |
|---|---|
| Diameter of entrance pupil: | 1.27 mm |
| Half entrance angle of view[X]: | 26.6° |
| Half entrance angle of view[Y]: | 20.6° |
| Focal length[X]: | 4.1 mm |
| Focal length[Y]: | 4.4 mm |

| Surface No. | Radius of curvature | Surface separation | Displacement and tilt | Refractive index | Abbe's No. |
|---|---|---|---|---|---|
| Object plane | ∞ | ∞ | | | |
| 1 | ∞ | | (1) | 1.4950 | 65.0 |
| 2 | ∞ | | (2) | | |
| 3 | FFS[1] | | (3) | 1.5256 | 56.4 |
| 4 | FFS[2] (RE) | | (4) | 1.5256 | 56.4 |
| 5 | FFS[3] | | (5) | | |
| 6 | ∞(Stop) | | (6) | | |
| 7 | FFS[4] | | (7) | 1.5256 | 56.4 |
| 8 | FFS[5] (RE) | | (8) | 1.5256 | 56.4 |
| 9 | FFS[6] | | (9) | | |
| 10 | ∞ | | (10) | 1.5163 | 64.1 |
| 11 | ∞ | | (11) | | |
| Image plane | ∞ | | (12) | | |

FFS[1]

| | | | | | |
|---|---|---|---|---|---|
| $C_4$ | $3.9616 \times 10^{-2}$ | $C_6$ | $-4.2054 \times 10^{-2}$ | $C_8$ | $1.3727 \times 10^{-3}$ |
| $C_{10}$ | $6.4585 \times 10^{-3}$ | $C_{11}$ | $-9.5394 \times 10^{-4}$ | $C_{13}$ | $-5.3679 \times 10^{-3}$ |
| $C_{15}$ | $-4.4338 \times 10^{-3}$ | | | | |

FFS[2]

| | | | | | |
|---|---|---|---|---|---|
| $C_4$ | $-3.3462 \times 10^{-5}$ | $C_6$ | $-9.0793 \times 10^{-3}$ | $C_8$ | $3.9190 \times 10^{-4}$ |
| $C_{10}$ | $1.6208 \times 10^{-4}$ | $C_{11}$ | $-3.4593 \times 10^{-6}$ | $C_{13}$ | $-1.7121 \times 10^{-5}$ |
| $C_{15}$ | $-3.1413 \times 10^{-5}$ | | | | |

FFS[3]

| | | | | | |
|---|---|---|---|---|---|
| $C_4$ | $3.3987 \times 10^{-2}$ | $C_6$ | $1.1125 \times 10^{-1}$ | $C_8$ | $9.4059 \times 10^{-4}$ |
| $C_{10}$ | $-3.4179 \times 10^{-3}$ | $C_{11}$ | $-3.3500 \times 10^{-3}$ | $C_{13}$ | $-7.0494 \times 10^{-4}$ |
| $C_{15}$ | $-2.1413 \times 10^{-3}$ | | | | |

FFS[4]

| | | | | | |
|---|---|---|---|---|---|
| $C_4$ | $-7.4417 \times 10^{-2}$ | $C_6$ | $-5.8730 \times 10^{-2}$ | $C_8$ | $2.5042 \times 10^{-3}$ |
| $C_{10}$ | $-2.1917 \times 10^{-2}$ | $C_{11}$ | $-4.9969 \times 10^{-3}$ | $C_{13}$ | $-9.1821 \times 10^{-3}$ |
| $C_{15}$ | $7.0674 \times 10^{-4}$ | | | | |

FFS[5]

| | | | | | |
|---|---|---|---|---|---|
| $C_4$ | $3.6834 \times 10^{-3}$ | $C_6$ | $2.5557 \times 10^{-2}$ | $C_8$ | $1.0064 \times 10^{-3}$ |
| $C_{10}$ | $1.3099 \times 10^{-4}$ | $C_{11}$ | $-4.2399 \times 10^{-4}$ | $C_{13}$ | $-9.6762 \times 10^{-4}$ |
| $C_{15}$ | $4.3159 \times 10^{-4}$ | | | | |

FFS[6]

| | | | | | |
|---|---|---|---|---|---|
| $C_4$ | $2.3016 \times 10^{-2}$ | $C_6$ | $5.3844 \times 10^{-2}$ | $C_8$ | $4.2404 \times 10^{-3}$ |
| $C_{10}$ | $2.0380 \times 10^{-2}$ | $C_{11}$ | $-6.8972 \times 10^{-3}$ | $C_{13}$ | $-5.4397 \times 10^{-3}$ |
| $C_{15}$ | $7.2070 \times 10^{-3}$ | | | | |

Displacement and tilt(1)

| | | | | | |
|---|---|---|---|---|---|
| X | 0.00 | Y | 0.00 | Z | 0.00 |
| α | 0.00 | β | 0.00 | γ | 0.00 |

Displacement and tilt(2)

| | | | | | |
|---|---|---|---|---|---|
| X | 0.00 | Y | 0.00 | Z | 0.50 |
| α | 0.00 | β | 0.00 | γ | 0.00 |

Displacement and tilt(3)

| | | | | | |
|---|---|---|---|---|---|
| X | 0.00 | Y | 0.00 | Z | 0.96 |
| α | 0.00 | β | 0.00 | γ | 0.00 |

Displacement and tilt(4)

| | | | | | |
|---|---|---|---|---|---|
| X | 0.00 | Y | 0.00 | Z | 3.82 |
| α | −45.00 | β | 0.00 | γ | 0.00 |

Displacement and tilt(5)

| | | | | | |
|---|---|---|---|---|---|
| X | 0.00 | Y | 2.39 | Z | 3.82 |
| α | −90.00 | β | 0.00 | γ | 0.00 |

Displacement and tilt(6)

| | | | | | |
|---|---|---|---|---|---|
| X | 0.00 | Y | 3.40 | Z | 3.82 |
| α | −90.00 | β | 0.00 | γ | 0.00 |

Displacement and tilt(7)

| | | | | | |
|---|---|---|---|---|---|
| X | 0.00 | Y | 3.60 | Z | 3.82 |
| α | −90.00 | β | 0.00 | γ | −90.00 |

Displacement and tilt(8)

| | | | | | |
|---|---|---|---|---|---|
| X | 0.00 | Y | 5.35 | Z | 3.82 |
| α | −90.00 | β | −46.03 | γ | −90.00 |

Displacement and tilt(9)

| | | | | | |
|---|---|---|---|---|---|
| X | 1.93 | Y | 5.41 | Z | 3.82 |
| α | 90.00 | β | −83.95 | γ | 90.00 |

Displacement and tilt(10)

| | | | | | |
|---|---|---|---|---|---|
| X | 2.32 | Y | 5.41 | Z | 3.82 |
| α | 0.00 | β | −90.00 | γ | 0.00 |

Displacement and tilt(11)

| | | | | | |
|---|---|---|---|---|---|
| X | 2.62 | Y | 5.41 | Z | 3.82 |
| α | 0.00 | β | −90.00 | γ | 0.00 |

-continued

| Displacement and tilt(12) | | | | | |
|---|---|---|---|---|---|
| X | 3.24 | Y | 5.41 | Z | 3.82 |
| α | 0.00 | β | −90.00 | γ | 0.00 |

EXAMPLE 5

| | | |
|---|---|---|
| Diameter of entrance pupil: | | 1.27 mm |
| Half entrance angle of view[X]: | | 26.6° |
| Half entrance angle of view[Y]: | | 20.6° |
| Focal length[X]: | | 4.0 mm |
| Focal length[Y]: | | 4.3 mm |

| Surface No. | Radius of curvature | Surface separation | Displacement and tilt | Refractive index | Abbe's No. |
|---|---|---|---|---|---|
| Object plane | ∞ | ∞ | | | |
| 1 | ∞ | | (1) | 1.4950 | 65.0 |
| 2 | ∞ | | (2) | | |
| 3 | FFS[1] | | (3) | 1.5256 | 56.4 |
| 4 | FFS[2] (RE) | | (4) | 1.5256 | 56.4 |
| 5 | FFS[3] | | (5) | | |
| 6 | ∞(Stop) | | (6) | | |
| 7 | FFS[4] | | (7) | 1.5256 | 56.4 |
| 8 | FFS[5] (RE) | | (8) | 1.5256 | 56.4 |
| 9 | FFS[6] | | (9) | | |
| 10 | ∞ | | (10) | 1.5163 | 64.1 |
| 11 | ∞ | | (11) | | |
| Image plane | ∞ | | (12) | | |

FFS[1]

| $C_4$ | $4.2266 \times 10^{-2}$ | $C_6$ | $-4.4799 \times 10^{-2}$ | $C_8$ | $8.7203 \times 10^{-4}$ |
| $C_{10}$ | $7.0054 \times 10^{-3}$ | $C_{11}$ | $-1.3889 \times 10^{-3}$ | $C_{13}$ | $-7.2215 \times 10^{-3}$ |
| $C_{15}$ | $-5.8584 \times 10^{-3}$ | | | | |

FFS[2]

| $C_4$ | $3.0582 \times 10^{-5}$ | $C_6$ | $-8.6401 \times 10^{-3}$ | $C_8$ | $1.9951 \times 10^{-4}$ |
| $C_{10}$ | $1.7849 \times 10^{-4}$ | $C_{11}$ | $-1.1989 \times 10^{-5}$ | $C_{13}$ | $-5.6367 \times 10^{-5}$ |
| $C_{15}$ | $-6.8646 \times 10^{-5}$ | | | | |

FFS[3]

| $C_4$ | $3.7482 \times 10^{-2}$ | $C_6$ | $1.1994 \times 10^{-1}$ | $C_8$ | $4.4719 \times 10^{-4}$ |
| $C_{10}$ | $-3.9973 \times 10^{-3}$ | $C_{11}$ | $-3.2342 \times 10^{-3}$ | $C_{13}$ | $2.8310 \times 10^{-4}$ |
| $C_{15}$ | $-2.0528 \times 10^{-3}$ | | | | |

FFS[4]

| $C_4$ | $-7.6534 \times 10^{-2}$ | $C_6$ | $-5.2456 \times 10^{-2}$ | $C_8$ | $2.7445 \times 10^{-3}$ |
| $C_{10}$ | $-2.2625 \times 10^{-2}$ | $C_{11}$ | $-5.4339 \times 10^{-3}$ | $C_{13}$ | $-8.8405 \times 10^{-3}$ |
| $C_{15}$ | $5.1742 \times 10^{-4}$ | | | | |

FFS[5]

| $C_4$ | $4.0645 \times 10^{-3}$ | $C_6$ | $2.6032 \times 10^{-2}$ | $C_8$ | $1.2188 \times 10^{-3}$ |
| $C_{10}$ | $1.8484 \times 10^{-4}$ | $C_{11}$ | $-5.6907 \times 10^{-4}$ | $C_{13}$ | $-9.9903 \times 10^{-4}$ |
| $C_{15}$ | $4.3353 \times 10^{-4}$ | | | | |

FFS[6]

| $C_4$ | $2.1603 \times 10^{-2}$ | $C_6$ | $5.8156 \times 10^{-2}$ | $C_8$ | $6.0968 \times 10^{-3}$ |
| $C_{10}$ | $2.2412 \times 10^{-2}$ | $C_{11}$ | $-3.7661 \times 10^{-3}$ | $C_{13}$ | $-3.0283 \times 10^{-3}$ |
| $C_{15}$ | $8.1590 \times 10^{-3}$ | | | | |

| Displacement and tilt(1) | | | | | |
|---|---|---|---|---|---|
| X | 0.00 | Y | 0.00 | Z | 0.00 |
| α | 0.00 | β | 0.00 | γ | 0.00 |

| Displacement and tilt(2) | | | | | |
|---|---|---|---|---|---|
| X | 0.00 | Y | 0.00 | Z | 0.50 |
| α | 0.00 | β | 0.00 | γ | 0.00 |

| Displacement and tilt(3) | | | | | |
|---|---|---|---|---|---|
| X | 0.00 | Y | 0.00 | Z | 0.94 |
| α | 0.00 | β | 0.00 | γ | 0.00 |

| Displacement and tilt(4) | | | | | |
|---|---|---|---|---|---|
| X | 0.00 | Y | 0.00 | Z | 3.01 |
| α | −45.00 | β | 0.00 | γ | 0.00 |

| Displacement and tilt(5) | | | | | |
|---|---|---|---|---|---|
| X | 0.00 | Y | 2.33 | Z | 3.01 |
| α | −90.00 | β | 0.00 | γ | 0.00 |

| Displacement and tilt(6) | | | | | |
|---|---|---|---|---|---|
| X | 0.00 | Y | 3.28 | Z | 3.01 |
| α | −90.00 | β | 0.00 | γ | 0.00 |

| Displacement and tilt(7) | | | | | |
|---|---|---|---|---|---|
| X | 0.00 | Y | 3.48 | Z | 3.01 |
| α | −90.00 | β | 0.00 | γ | −90.00 |

| Displacement and tilt(8) | | | | | |
|---|---|---|---|---|---|
| X | 0.00 | Y | 5.19 | Z | 3.01 |
| α | −90.00 | β | −46.10 | γ | −90.00 |

| Displacement and tilt(9) | | | | | |
|---|---|---|---|---|---|
| X | 1.89 | Y | 5.26 | Z | 3.01 |
| α | 90.00 | β | −83.63 | γ | 90.00 |

| Displacement and tilt(10) | | | | | |
|---|---|---|---|---|---|
| X | 2.29 | Y | 5.29 | Z | 3.01 |
| α | 0.00 | β | −90.00 | γ | 0.00 |

| Displacement and tilt(11) | | | | | |
|---|---|---|---|---|---|
| X | 2.59 | Y | 5.29 | Z | 3.01 |
| α | 0.00 | β | −90.00 | γ | 0.00 |

| Displacement and tilt(12) | | | | | |
|---|---|---|---|---|---|
| X | 3.21 | Y | 5.29 | Z | 3.01 |
| α | 0.00 | β | −90.00 | γ | 0.00 |

EXAMPLE 6

| | | |
|---|---|---|
| Diameter of entrance pupil: | | 1.27 mm |
| Half entrance angle of view[X]: | | 26.6° |
| Half entrance angle of view[Y]: | | 20.6° |
| Focal length[X]: | | 4.0 mm |
| Focal length[Y]: | | 4.0 mm |

| Surface No. | Radius of curvature | Surface separation | Displacement and tilt | Refractive index | Abbe's No. |
|---|---|---|---|---|---|
| Object plane | ∞ | ∞ | | | |
| 1 | ∞ | | (1) | 1.4950 | 65.0 |
| 2 | ∞ | | (2) | | |
| 3 | FFS[1] | | (3) | 1.6069 | 27.0 |
| 4 | FFS[2] (RE) | | (4) | 1.6069 | 27.0 |
| 5 | FFS[3] (RE) | | (5) | 1.6069 | 27.0 |
| 6 | FFS[4] | | (6) | | |
| 7 | ∞(Stop) | | (7) | | |
| 8 | FFS[5] | | (8) | 1.5256 | 56.4 |
| 9 | FFS[6] (RE) | | (9) | 1.5256 | 56.4 |
| 10 | FFS[7] (RE) | | (10) | 1.5256 | 56.4 |
| 11 | FFS[8] | | (11) | | |

-continued

| | | | | | |
|---|---|---|---|---|---|
| 12 | ∞ | | (12) | 1.5163 | 64.1 |
| 13 | ∞ | | (13) | | |
| Image plane | ∞ | | (14) | | |

FFS[1]

| | | | | | |
|---|---|---|---|---|---|
| $C_4$ | $1.6091 \times 10^{-2}$ | $C_6$ | $1.7007 \times 10^{-2}$ | $C_8$ | $8.5578 \times 10^{-5}$ |
| $C_{10}$ | $5.6459 \times 10^{-5}$ | $C_{11}$ | $2.1816 \times 10^{-5}$ | $C_{13}$ | $2.9986 \times 10^{-4}$ |
| $C_{15}$ | $-2.5255 \times 10^{-4}$ | | | | |

FFS[2]

| | | | | | |
|---|---|---|---|---|---|
| $C_4$ | $1.2306 \times 10^{-2}$ | $C_6$ | $4.4210 \times 10^{-2}$ | $C_8$ | $-3.3468 \times 10^{-4}$ |
| $C_{10}$ | $-2.3918 \times 10^{-3}$ | $C_{11}$ | $3.2048 \times 10^{-5}$ | $C_{13}$ | $-2.0511 \times 10^{-5}$ |
| $C_{15}$ | $1.3173 \times 10^{-4}$ | | | | |

FFS[3]

| | | | | | |
|---|---|---|---|---|---|
| $C_4$ | $-1.8468 \times 10^{-2}$ | $C_6$ | $1.7145 \times 10^{-2}$ | $C_8$ | $-1.9670 \times 10^{-4}$ |
| $C_{10}$ | $-1.2147 \times 10^{-3}$ | $C_{11}$ | $-1.0462 \times 10^{-4}$ | $C_{13}$ | $-5.6839 \times 10^{-4}$ |
| $C_{15}$ | $2.3997 \times 10^{-5}$ | | | | |

FFS[4]

| | | | | | |
|---|---|---|---|---|---|
| $C_4$ | $-4.6313 \times 10^{-4}$ | $C_6$ | $4.7743 \times 10^{-3}$ | $C_8$ | $-8.6361 \times 10^{-4}$ |
| $C_{10}$ | $-2.6606 \times 10^{-4}$ | | | | |

FFS[5]

| | | | | | |
|---|---|---|---|---|---|
| $C_4$ | $1.7539 \times 10^{-2}$ | $C_6$ | $2.4793 \times 10^{-2}$ | $C_8$ | $1.8102 \times 10^{-4}$ |
| $C_{10}$ | $3.3830 \times 10^{-3}$ | $C_{11}$ | $-4.7712 \times 10^{-5}$ | $C_{13}$ | $7.9555 \times 10^{-4}$ |
| $C_{15}$ | $-7.5888 \times 10^{-4}$ | | | | |

FFS[6]

| | | | | | |
|---|---|---|---|---|---|
| $C_4$ | $-1.4471 \times 10^{-2}$ | $C_6$ | $-1.7526 \times 10^{-2}$ | $C_8$ | $-1.3089 \times 10^{-4}$ |
| $C_{10}$ | $4.3751 \times 10^{-4}$ | $C_{11}$ | $-9.2316 \times 10^{-6}$ | $C_{13}$ | $3.4973 \times 10^{-5}$ |
| $C_{15}$ | $-4.9484 \times 10^{-5}$ | | | | |

FFS[7]

| | | | | | |
|---|---|---|---|---|---|
| $C_4$ | $1.5531 \times 10^{-2}$ | $C_6$ | $1.1525 \times 10^{-2}$ | $C_8$ | $-5.9797 \times 10^{-4}$ |
| $C_{10}$ | $-1.4998 \times 10^{-6}$ | $C_{11}$ | $1.3856 \times 10^{-6}$ | $C_{13}$ | $3.5283 \times 10^{-5}$ |
| $C_{15}$ | $-5.4624 \times 10^{-5}$ | | | | |

FFS[8]

| | | | | | |
|---|---|---|---|---|---|
| $C_4$ | $4.9833 \times 10^{-2}$ | $C_6$ | $3.3573 \times 10^{-2}$ | $C_8$ | $-2.2342 \times 10^{-3}$ |
| $C_{10}$ | $1.1149 \times 10^{-4}$ | $C_{11}$ | $3.6664 \times 10^{-4}$ | $C_{13}$ | $2.0997 \times 10^{-3}$ |
| $C_{15}$ | $-6.9195 \times 10^{-4}$ | | | | |

Displacement and tilt(1)

| X | 0.00 | Y | 0.00 | Z | 0.00 |
|---|---|---|---|---|---|
| α | 0.00 | β | 0.00 | γ | 0.00 |

Displacement and tilt(2)

| X | 0.00 | Y | 0.00 | Z | 0.50 |
|---|---|---|---|---|---|
| α | 0.00 | β | 0.00 | γ | 0.00 |

Displacement and tilt(3)

| X | 0.00 | Y | 0.00 | Z | 0.71 |
|---|---|---|---|---|---|
| α | 0.00 | β | 0.00 | γ | 0.00 |

Displacement and tilt(4)

| X | 0.00 | Y | 0.00 | Z | 6.31 |
|---|---|---|---|---|---|
| α | 28.01 | β | 0.00 | γ | 0.00 |

Displacement and tilt(5)

| X | 0.00 | Y | −3.71 | Z | 3.81 |
|---|---|---|---|---|---|
| α | 73.01 | β | 0.00 | γ | 0.00 |

Displacement and tilt(6)

| X | 0.00 | Y | 2.90 | Z | 3.81 |
|---|---|---|---|---|---|
| α | 90.00 | β | 0.00 | γ | 0.00 |

Displacement and tilt(7)

| X | 0.00 | Y | 3.11 | Z | 3.81 |
|---|---|---|---|---|---|
| α | −90.00 | β | 0.00 | γ | 0.00 |

Displacement and tilt(8)

| X | 0.00 | Y | 3.21 | Z | 3.81 |
|---|---|---|---|---|---|
| α | 90.00 | β | 0.00 | γ | 90.00 |

Displacement and tilt(9)

| X | −0.00 | Y | 9.03 | Z | 3.81 |
|---|---|---|---|---|---|
| α | 90.00 | β | −21.10 | γ | 90.00 |

Displacement and tilt(10)

| X | −2.93 | Y | 5.80 | Z | 3.81 |
|---|---|---|---|---|---|
| α | 90.00 | β | −66.19 | γ | 90.00 |

Displacement and tilt(11)

| X | 2.31 | Y | 5.78 | Z | 3.81 |
|---|---|---|---|---|---|
| α | −90.00 | β | −89.56 | γ | −90.00 |

Displacement and tilt(12)

| X | 5.01 | Y | 5.79 | Z | 3.81 |
|---|---|---|---|---|---|
| α | 0.00 | β | −90.00 | γ | 0.00 |

Displacement and tilt(13)

| X | 5.31 | Y | 5.79 | Z | 3.81 |
|---|---|---|---|---|---|
| α | 0.00 | β | −90.00 | γ | 0.00 |

Displacement and tilt(14)

| X | 5.94 | Y | 5.79 | Z | 3.81 |
|---|---|---|---|---|---|
| α | 0.00 | β | −90.00 | γ | 0.00 |

EXAMPLE 7

| | |
|---|---|
| Diameter of entrance pupil: | 1.27 mm |
| Half entrance angle of view[X]: | 26.6° |
| Half entrance angle of view[Y]: | 20.6° |
| Focal length[X]: | 4.3 mm |
| Focal length[Y]: | 4.0 mm |

| Surface No. | Radius of curvature | Surface separation | Displacement and tilt | Refractive index | Abbe's No. |
|---|---|---|---|---|---|
| Object plane | ∞ | ∞ | | | |
| 1 | ∞ | | (1) | 1.4950 | 65.0 |
| 2 | ∞ | | (2) | | |
| 3 | FFS[1] | | (3) | 1.5256 | 56.4 |
| 4 | FFS[2] (RE) | | (4) | 1.5256 | 56.4 |
| 5 | FFS[3] | | (5) | | |
| 6 | ∞(Stop) | | (6) | | |
| 7 | FFS[4] | | (7) | 1.5256 | 56.4 |
| 8 | FFS[5] (RE) | | (8) | 1.5256 | 56.4 |
| 9 | FFS[6] | | (9) | | |
| 10 | ∞ | | (10) | 1.5163 | 64.1 |
| 11 | ∞ | | (11) | | |
| Image plane | ∞ | | (12) | | |

FFS[1]

| | | | | | |
|---|---|---|---|---|---|
| $C_4$ | $4.3629 \times 10^{-2}$ | $C_6$ | $-3.5958 \times 10^{-2}$ | $C_8$ | $1.2045 \times 10^{-4}$ |
| $C_{10}$ | $5.4092 \times 10^{-3}$ | $C_{11}$ | $-1.5101 \times 10^{-3}$ | $C_{13}$ | $-7.0489 \times 10^{-3}$ |
| $C_{15}$ | $-5.3215 \times 10^{-3}$ | | | | |

FFS[2]

| | | | | | |
|---|---|---|---|---|---|
| $C_6$ | $-8.1441 \times 10^{-3}$ | $C_{10}$ | $2.2177 \times 10^{-5}$ | $C_{15}$ | $-3.9365 \times 10^{-5}$ |

FFS[3]

| | | | | | |
|---|---|---|---|---|---|
| $C_4$ | $3.9640 \times 10^{-2}$ | $C_6$ | $1.1831 \times 10^{-1}$ | $C_8$ | $-1.9797 \times 10^{-4}$ |
| $C_{10}$ | $-4.5637 \times 10^{-3}$ | $C_{11}$ | $-3.7810 \times 10^{-3}$ | $C_{13}$ | $2.4290 \times 10^{-3}$ |
| $C_{15}$ | $-2.2506 \times 10^{-3}$ | | | | |

FFS[4]

| | | | | | |
|---|---|---|---|---|---|
| $C_4$ | $-7.4882 \times 10^{-2}$ | $C_6$ | $-4.4540 \times 10^{-2}$ | $C_8$ | $2.5029 \times 10^{-3}$ |
| $C_{10}$ | $-2.3411 \times 10^{-2}$ | $C_{11}$ | $-5.7378 \times 10^{-3}$ | $C_{13}$ | $-8.7523 \times 10^{-3}$ |
| $C_{15}$ | $-1.4576 \times 10^{-4}$ | | | | |

-continued

FFS[5]

| | | | | | | |
|---|---|---|---|---|---|---|
| $C_4$ | $4.2957 \times 10^{-3}$ | $C_6$ | $2.6698 \times 10^{-2}$ | $C_8$ | $1.1585 \times 10^{-3}$ | |
| $C_{10}$ | $1.9793 \times 10^{-4}$ | $C_{11}$ | $-6.6443 \times 10^{-4}$ | $C_{13}$ | $-9.6415 \times 10^{-4}$ | |
| $C_{15}$ | $4.2278 \times 10^{-4}$ | | | | | |

FFS[6]

| | | | | | |
|---|---|---|---|---|---|
| $C_4$ | $1.1685 \times 10^{-2}$ | $C_6$ | $6.1242 \times 10^{-2}$ | $C_8$ | $6.5990 \times 10^{-3}$ |
| $C_{10}$ | $2.3694 \times 10^{-2}$ | $C_{11}$ | $-1.0188 \times 10^{-3}$ | $C_{13}$ | $-2.2547 \times 10^{-3}$ |
| $C_{15}$ | $7.7475 \times 10^{-3}$ | | | | |

Displacement and tilt(1)

| X | 0.00 | Y | 0.00 | Z | 0.00 |
|---|---|---|---|---|---|
| α | 0.00 | β | 0.00 | γ | 0.00 |

Displacement and tilt(2)

| X | 0.00 | Y | 0.00 | Z | 0.50 |
|---|---|---|---|---|---|
| α | 0.00 | β | 0.00 | γ | 0.00 |

Displacement and tilt(3)

| X | 0.00 | Y | 0.00 | Z | 0.89 |
|---|---|---|---|---|---|
| α | 0.00 | β | 0.00 | γ | 0.00 |

Displacement and tilt(4)

| X | 0.00 | Y | 0.00 | Z | 3.01 |
|---|---|---|---|---|---|
| α | −45.00 | β | 0.00 | γ | 0.00 |

Displacement and tilt(5)

| X | 0.00 | Y | 2.18 | Z | 3.01 |
|---|---|---|---|---|---|
| α | −90.00 | β | 0.00 | γ | 0.00 |

Displacement and tilt(6)

| X | 0.00 | Y | 3.01 | Z | 3.01 |
|---|---|---|---|---|---|
| α | −90.00 | β | 0.00 | γ | 0.00 |

Displacement and tilt(7)

| X | 0.00 | Y | 3.21 | Z | 3.01 |
|---|---|---|---|---|---|
| α | −90.00 | β | 0.00 | γ | −90.00 |

Displacement and tilt(8)

| X | 0.00 | Y | 4.93 | Z | 3.01 |
|---|---|---|---|---|---|
| α | −90.00 | β | −46.16 | γ | −90.00 |

Displacement and tilt(9)

| X | 1.90 | Y | 5.00 | Z | 3.01 |
|---|---|---|---|---|---|
| α | 90.00 | β | −83.35 | γ | 90.00 |

Displacement and tilt(10)

| X | 2.30 | Y | 5.02 | Z | 3.01 |
|---|---|---|---|---|---|
| α | 0.00 | β | −90.00 | γ | 0.00 |

Displacement and tilt(11)

| X | 2.60 | Y | 5.02 | Z | 3.01 |
|---|---|---|---|---|---|
| α | 0.00 | β | −90.00 | γ | 0.00 |

Displacement and tilt(12)

| X | 3.22 | Y | 5.02 | Z | 3.01 |
|---|---|---|---|---|---|
| α | 0.00 | β | −90.00 | γ | 0.00 |

EXAMPLE 8

| | |
|---|---|
| Diameter of entrance pupil: | 1.27 mm |
| Half entrance angle of view[X]: | 26.6° |
| Half entrance angle of view[Y]: | 20.6° |
| Focal length[X]: | 4.0 mm |
| Focal length[Y]: | 3.6 mm |

| Surface No. | Radius of curvature | Surface separation | Displacement and tilt | Refractive index | Abbe's No. |
|---|---|---|---|---|---|
| Object plane | ∞ | ∞ | | | |
| 1 | ∞ | | (1) | 1.4950 | 65.0 |
| 2 | ∞ | | (2) | | |
| 3 | FFS[1] | | (3) | 1.5842 | 30.5 |
| 4 | FFS[2] (RE) | | (4) | 1.5842 | 30.5 |
| 5 | FFS[3] | | (5) | | |
| 6 | ∞(Stop) | | (6) | | |
| 7 | FFS[4] | | (7) | 1.5256 | 56.4 |
| 8 | FFS[5] (RE) | | (8) | 1.5256 | 56.4 |
| 9 | FFS[6] (RE) | | (9) | 1.5256 | 56.4 |
| 10 | FFS[7] | | (10) | | |
| 11 | ∞ | | (11) | 1.5163 | 64.1 |
| 12 | ∞ | | (12) | | |
| Image plane | ∞ | | (13) | | |

FFS[1]

| | | | | | |
|---|---|---|---|---|---|
| $C_4$ | $2.0546 \times 10^{-2}$ | $C_6$ | $6.0876 \times 10^{-2}$ | $C_8$ | $-1.6941 \times 10^{-3}$ |
| $C_{10}$ | $-3.7164 \times 10^{-3}$ | $C_{11}$ | $5.8505 \times 10^{-4}$ | $C_{13}$ | $5.1260 \times 10^{-4}$ |
| $C_{15}$ | $2.7272 \times 10^{-4}$ | | | | |

FFS[2]

| | | | | | |
|---|---|---|---|---|---|
| $C_4$ | $2.3414 \times 10^{-4}$ | $C_6$ | $2.7979 \times 10^{-2}$ | $C_8$ | $-6.0094 \times 10^{-4}$ |
| $C_{10}$ | $9.5370 \times 10^{-4}$ | $C_{11}$ | $-3.8800 \times 10^{-5}$ | $C_{13}$ | $-1.6408 \times 10^{-4}$ |
| $C_{15}$ | $-4.0821 \times 10^{-5}$ | | | | |

FFS[3]

| | | | | | |
|---|---|---|---|---|---|
| $C_4$ | $-1.0188 \times 10^{-2}$ | $C_6$ | $4.8395 \times 10^{-3}$ | $C_8$ | $-8.2611 \times 10^{-4}$ |
| $C_{10}$ | $6.8637 \times 10^{-3}$ | $C_{11}$ | $6.3207 \times 10^{-3}$ | $C_{13}$ | $-1.9246 \times 10^{-2}$ |
| $C_{15}$ | $-2.0395 \times 10^{-3}$ | | | | |

FFS[4]

| | | | | | |
|---|---|---|---|---|---|
| $C_4$ | $-4.0932 \times 10^{-2}$ | $C_6$ | $2.3444 \times 10^{-1}$ | $C_8$ | $-2.7353 \times 10^{-3}$ |
| $C_{10}$ | $3.3573 \times 10^{-3}$ | $C_{11}$ | $-1.2551 \times 10^{-3}$ | $C_{13}$ | $-1.9912 \times 10^{-2}$ |
| $C_{15}$ | $1.3156 \times 10^{-2}$ | | | | |

FFS[5]

| | | | | | |
|---|---|---|---|---|---|
| $C_4$ | $2.0899 \times 10^{-2}$ | $C_6$ | $3.0111 \times 10^{-2}$ | $C_8$ | $-8.0779 \times 10^{-4}$ |
| $C_{10}$ | $2.2131 \times 10^{-5}$ | $C_{11}$ | $-3.9723 \times 10^{-5}$ | $C_{13}$ | $4.6809 \times 10^{-5}$ |
| $C_{15}$ | $1.8799 \times 10^{-5}$ | | | | |

FFS[6]

| | | | | | |
|---|---|---|---|---|---|
| $C_4$ | $-1.7704 \times 10^{-2}$ | $C_6$ | $-1.2732 \times 10^{-2}$ | $C_8$ | $-1.6848 \times 10^{-3}$ |
| $C_{10}$ | $-8.4758 \times 10^{-4}$ | $C_{11}$ | $-2.0887 \times 10^{-5}$ | $C_{13}$ | $-8.1105 \times 10^{-5}$ |
| $C_{15}$ | $-4.0256 \times 10^{-5}$ | | | | |

FFS[7]

| | | | | | |
|---|---|---|---|---|---|
| $C_4$ | $2.5400 \times 10^{-2}$ | $C_6$ | $-9.4522 \times 10^{-2}$ | $C_8$ | $-1.1009 \times 10^{-2}$ |
| $C_{10}$ | $-7.0438 \times 10^{-3}$ | $C_{11}$ | $-3.1848 \times 10^{-3}$ | $C_{13}$ | $-7.4213 \times 10^{-3}$ |
| $C_{15}$ | $1.1954 \times 10^{-3}$ | | | | |

Displacement and tilt(1)

| X | 0.00 | Y | 0.00 | Z | 0.00 |
|---|---|---|---|---|---|
| α | 0.00 | β | 0.00 | γ | 0.00 |

Displacement and tilt(2)

| X | 0.00 | Y | 0.00 | Z | 0.50 |
|---|---|---|---|---|---|
| α | 0.00 | β | 0.00 | γ | 0.00 |

Displacement and tilt(3)

| X | 0.00 | Y | (Variable) | Z | 0.70 |
|---|---|---|---|---|---|
| α | 0.00 | β | 0.00 | γ | 0.00 |

Displacement and tilt(4)

| X | 0.00 | Y | (Variable) | Z | 2.69 |
|---|---|---|---|---|---|
| α | −45.00 | β | 0.00 | γ | 0.00 |

Displacement and tilt(5)

| X | 0.00 | Y | (Variable) | Z | 2.69 |
|---|---|---|---|---|---|
| α | −90.00 | β | 0.00 | γ | 0.00 |

Displacement and tilt(6)

| X | 0.00 | Y | 4.53 | Z | 2.69 |
|---|---|---|---|---|---|
| α | −90.00 | β | 0.00 | γ | 0.00 |

Displacement and tilt(7)

| X | 0.00 | Y | 4.74 | Z | 2.69 |
|---|---|---|---|---|---|
| α | −90.00 | β | 0.00 | γ | −90.00 |

-continued

Displacement and tilt(8)

| | | | | | |
|---|---|---|---|---|---|
| X | 0.00 | Y | 11.92 | Z | 2.69 |
| α | −90.00 | β | 18.46 | γ | −90.00 |

Displacement and tilt(9)

| | | | | | |
|---|---|---|---|---|---|
| X | −2.82 | Y | 8.17 | Z | 2.69 |
| α | −90.00 | β | 63.92 | γ | −90.00 |

Displacement and tilt(10)

| | | | | | |
|---|---|---|---|---|---|
| X | 3.15 | Y | 8.07 | Z | 2.69 |
| α | 90.00 | β | 87.84 | γ | 90.00 |

Displacement and tilt(11)

| | | | | | |
|---|---|---|---|---|---|
| X | 3.65 | Y | 8.07 | Z | 2.69 |
| α | 0.00 | β | −90.00 | γ | 0.00 |

Displacement and tilt(12)

| | | | | | |
|---|---|---|---|---|---|
| X | 3.95 | Y | 8.07 | Z | 2.69 |
| α | 0.00 | β | −90.00 | γ | 0.00 |

Displacement and tilt(13)

| | | | | | |
|---|---|---|---|---|---|
| X | 4.58 | Y | 8.07 | Z | 2.69 |
| α | 0.00 | β | −90.00 | γ | 0.00 |

(Variable displacement)

| | Object distance | |
|---|---|---|
| | Infinity | 300 mm |
| Displacement and tilt (3) Y | 0.00 | −0.11 |
| Displacement and tilt (4) Y | 0.00 | −0.11 |
| Displacement and tilt (5) Y | 4.06 | 3.96 |

EXAMPLE 9

| | |
|---|---|
| Diameter of entrance pupil: | 1.27 mm |
| Half entrance angle of view[X]: | 26.6° |
| Half entrance angle of view[Y]: | 20.6° |
| Focal length[X]: | 3.8 mm |
| Focal length[Y]: | 3.8 mm |

| Surface No. | Radius of curvature | Surface separation | Displacement and tilt | Refractive index | Abbe's No. |
|---|---|---|---|---|---|
| Object plane | ∞ | ∞ | | | |
| 1 | ∞ | | (1) | 1.4950 | 65.0 |
| 2 | ∞ | | (2) | | |
| 3 | FFS[1] | | (3) | 1.5842 | 30.5 |
| 4 | FFS[2] (RE) | | (4) | 1.5842 | 30.5 |
| 5 | FFS[3] | | (5) | | |
| 6 | ∞(Stop) | | (6) | | |
| 7 | FFS[4] | | (7) | 1.5256 | 56.4 |
| 8 | FFS[5] (RE) | | (8) | 1.5256 | 56.4 |
| 9 | FFS[6] (RE) | | (9) | 1.5256 | 56.4 |
| 10 | FFS[7] | | (10) | | |
| 11 | ∞ | | (11) | 1.5163 | 64.1 |
| 12 | ∞ | | (12) | | |
| Image plane | ∞ | | (13) | | |

FFS[1]

| | | | | | |
|---|---|---|---|---|---|
| $C_4$ | $2.7963 \times 10^{-2}$ | $C_6$ | $3.3427 \times 10^{-2}$ | $C_8$ | $-5.1888 \times 10^{-4}$ |
| $C_{10}$ | $-3.8534 \times 10^{-3}$ | $C_{11}$ | $8.9830 \times 10^{-4}$ | $C_{13}$ | $2.2239 \times 10^{-4}$ |
| $C_{15}$ | $-3.3038 \times 10^{-4}$ | | | | |

FFS[2]

| | | | | | |
|---|---|---|---|---|---|
| $C_4$ | $3.4437 \times 10^{-4}$ | $C_6$ | $2.4673 \times 10^{-2}$ | $C_8$ | $-2.5128 \times 10^{-4}$ |
| $C_{10}$ | $7.5584 \times 10^{-4}$ | $C_{11}$ | $-2.9278 \times 10^{-5}$ | $C_{13}$ | $-8.4864 \times 10^{-5}$ |
| $C_{15}$ | $-1.6528 \times 10^{-5}$ | | | | |

FFS[3]

| | | | | | |
|---|---|---|---|---|---|
| $C_4$ | $-6.8275 \times 10^{-2}$ | $C_6$ | $5.8499 \times 10^{-2}$ | $C_8$ | $-9.3924 \times 10^{-4}$ |
| $C_{10}$ | $7.6517 \times 10^{-3}$ | $C_{11}$ | $-5.0871 \times 10^{-3}$ | $C_{13}$ | $-4.5720 \times 10^{-3}$ |
| $C_{15}$ | $-2.0754 \times 10^{-4}$ | | | | |

FFS[4]

| | | | | | |
|---|---|---|---|---|---|
| $C_4$ | $-4.5663 \times 10^{-3}$ | $C_6$ | $1.8783 \times 10^{-1}$ | $C_8$ | $-2.2943 \times 10^{-3}$ |
| $C_{10}$ | $6.8410 \times 10^{-3}$ | $C_{11}$ | $-3.8661 \times 10^{-4}$ | $C_{13}$ | $-1.6654 \times 10^{-3}$ |
| $C_{15}$ | $3.5034 \times 10^{-3}$ | | | | |

FFS[5]

| | | | | | |
|---|---|---|---|---|---|
| $C_4$ | $2.0397 \times 10^{-2}$ | $C_6$ | $3.1101 \times 10^{-2}$ | $C_8$ | $-7.8656 \times 10^{-4}$ |
| $C_{10}$ | $2.0294 \times 10^{-4}$ | $C_{11}$ | $4.2526 \times 10^{-6}$ | $C_{13}$ | $2.1295 \times 10^{-5}$ |
| $C_{15}$ | $3.1019 \times 10^{-5}$ | | | | |

FFS[6]

| | | | | | |
|---|---|---|---|---|---|
| $C_4$ | $-1.7760 \times 10^{-2}$ | $C_6$ | $-1.2882 \times 10^{-2}$ | $C_8$ | $-1.6580 \times 10^{-3}$ |
| $C_{10}$ | $-6.1565 \times 10^{-4}$ | $C_{11}$ | $-1.4850 \times 10^{-6}$ | $C_{13}$ | $-1.0825 \times 10^{-4}$ |
| $C_{15}$ | $-1.7420 \times 10^{-5}$ | | | | |

FFS[7]

| | | | | | |
|---|---|---|---|---|---|
| $C_4$ | $-1.1625 \times 10^{-2}$ | $C_6$ | $-8.6638 \times 10^{-2}$ | $C_8$ | $-1.0966 \times 10^{-2}$ |
| $C_{10}$ | $-2.7272 \times 10^{-3}$ | $C_{11}$ | $-2.0328 \times 10^{-3}$ | $C_{13}$ | $-3.4369 \times 10^{-3}$ |
| $C_{15}$ | $-1.3695 \times 10^{-3}$ | | | | |

Displacement and tilt(1)

| | | | | | |
|---|---|---|---|---|---|
| X | 0.00 | Y | 0.00 | Z | 0.00 |
| α | 0.00 | β | 0.00 | γ | 0.00 |

Displacement and tilt(2)

| | | | | | |
|---|---|---|---|---|---|
| X | 0.00 | Y | 0.00 | Z | 0.50 |
| α | 0.00 | β | 0.00 | γ | 0.00 |

Displacement and tilt(3)

| | | | | | |
|---|---|---|---|---|---|
| X | 0.00 | Y | 0.00 | Z | 0.70 |
| α | 0.00 | β | 0.00 | γ | 0.00 |

Displacement and tilt(4)

| | | | | | |
|---|---|---|---|---|---|
| X | 0.00 | Y | 0.00 | Z | 2.80 |
| α | −45.00 | β | 0.00 | γ | 0.00 |

Displacement and tilt(5)

| | | | | | |
|---|---|---|---|---|---|
| X | 0.00 | Y | 3.41 | Z | 2.80 |
| α | −90.00 | β | 0.00 | γ | 0.00 |

Displacement and tilt(6)

| | | | | | |
|---|---|---|---|---|---|
| X | 0.00 | Y | 4.75 | Z | 2.80 |
| α | −90.00 | β | 0.00 | γ | 0.00 |

Displacement and tilt(7)

| | | | | | |
|---|---|---|---|---|---|
| X | (Variable) | Y | (Variable) | Z | 2.80 |
| α | −90.00 | β | 0.00 | γ | −90.00 |

Displacement and tilt(8)

| | | | | | |
|---|---|---|---|---|---|
| X | (Variable) | Y | (Variable) | Z | 2.80 |
| α | −90.00 | β | 18.37 | γ | −90.00 |

Displacement and tilt(9)

| | | | | | |
|---|---|---|---|---|---|
| X | (Variable) | Y | (Variable) | Z | 2.80 |
| α | −90.00 | β | 63.91 | γ | −90.00 |

Displacement and tilt(10)

| | | | | | |
|---|---|---|---|---|---|
| X | (Variable) | Y | (Variable) | Z | 2.80 |
| α | 90.00 | β | 87.14 | γ | 90.00 |

Displacement and tilt(11)

| | | | | | |
|---|---|---|---|---|---|
| X | 3.56 | Y | 8.12 | Z | 2.80 |
| α | 0.00 | β | −90.00 | γ | 0.00 |

Displacement and tilt(12)

| | | | | | |
|---|---|---|---|---|---|
| X | 3.86 | Y | 8.12 | Z | 2.80 |
| α | 0.00 | β | −90.00 | γ | 0.00 |

Displacement and tilt(13)

| | | | | | |
|---|---|---|---|---|---|
| X | 4.48 | Y | 8.12 | Z | 2.80 |
| α | 0.00 | β | −90.00 | γ | 0.00 |

EXAMPLE 10

|  | (Variable displacement) | | |
|---|---|---|---|
|  |  | Object distance | |
|  |  | Infinity | 100 mm |
| Displacement and tilt (7) | X | 0.00 | −0.11 |
| Displacement and tilt (7) | Y | 4.97 | 5.26 |
| Displacement and tilt (8) | X | 0.00 | −0.11 |
| Displacement and tilt (8) | Y | 11.87 | 12.16 |
| Displacement and tilt (9) | X | −2.71 | 2.82 |
| Displacement and tilt (9) | Y | 8.24 | 8.53 |
| Displacement and tilt (10) | X | 2.98 | 2.87 |
| Displacement and tilt (10) | Y | 8.13 | 8.42 |

| Diameter of entrance pupil: | 1.27 mm |
|---|---|
| Half entrance angle of view[X]: | 26.6° |
| Half entrance angle of view[Y]: | 20.6° |
| Focal length[X]: | 3.9 mm |
| Focal length[Y]: | 4.3 mm |

| Surface No. | Radius of curvature | Surface separation | Displacement and tilt | Refractive index | Abbe's No. |
|---|---|---|---|---|---|
| Object plane | ∞ | ∞ |  |  |  |
| 1 | ∞ |  | (1) | 1.4950 | 65.0 |
| 2 | ∞ |  | (2) |  |  |
| 3 | FFS[1] |  | (3) | 1.5256 | 56.4 |
| 4 | FFS[2] (RE) |  | (4) | 1.5256 | 56.4 |
| 5 | FFS[3] |  | (5) |  |  |
| 6 | ∞(Stop) |  | (6) |  |  |
| 7 | FFS[4] |  | (7) | 1.5256 | 56.4 |
| 8 | FFS[5] (RE) |  | (8) | 1.5256 | 56.4 |
| 9 | FFS[6] |  | (9) |  |  |
| 10 | ∞ |  | (10) | 1.5163 | 64.1 |
| 11 | ∞ |  | (11) |  |  |
| Image plane | ∞ |  | (12) |  |  |

FFS[1]

$C_4$ $4.4756 \times 10^{-2}$ $C_6$ $-3.9937 \times 10^{-2}$ $C_8$ $1.9063 \times 10^{-3}$
$C_{10}$ $9.4431 \times 10^{-3}$ $C_{11}$ $-2.3508 \times 10^{-3}$ $C_{13}$ $-9.4210 \times 10^{-3}$
$C_{15}$ $-7.1779 \times 10^{-3}$

FFS[2]

$C_4$ $3.9507 \times 10^{-5}$ $C_6$ $-1.0580 \times 10^{-2}$ $C_8$ $5.2588 \times 10^{-4}$
$C_{10}$ $2.3911 \times 10^{-4}$ $C_{11}$ $-2.0456 \times 10^{-5}$ $C_{13}$ $-5.9896 \times 10^{-5}$
$C_{15}$ $-8.4142 \times 10^{-5}$

FFS[3]

$C_4$ $7.5781 \times 10^{-2}$ $C_6$ $1.2914 \times 10^{-1}$ $C_8$ $1.2875 \times 10^{-3}$
$C_{10}$ $-5.0020 \times 10^{-3}$ $C_{11}$ $-3.5006 \times 10^{-3}$ $C_{13}$ $-4.4055 \times 10^{-3}$
$C_{15}$ $-3.5110 \times 10^{-3}$

FFS[4]

$C_4$ $-4.9123 \times 10^{-2}$ $C_6$ $-1.6509 \times 10^{-2}$ $C_8$ $1.1555 \times 10^{-3}$
$C_{10}$ $-2.2120 \times 10^{-2}$ $C_{11}$ $-7.1237 \times 10^{-3}$ $C_{13}$ $-1.7782 \times 10^{-2}$
$C_{15}$ $-2.0575 \times 10^{-3}$

FFS[5]

$C_4$ $4.0778 \times 10^{-3}$ $C_6$ $2.3644 \times 10^{-2}$ $C_8$ $6.0815 \times 10^{-4}$
$C_{10}$ $-1.8396 \times 10^{-4}$ $C_{11}$ $-5.7542 \times 10^{-4}$ $C_{13}$ $-1.1029 \times 10^{-3}$
$C_{15}$ $3.6481 \times 10^{-4}$

FFS[6]

$C_4$ $2.8735 \times 10^{-2}$ $C_6$ $2.1049 \times 10^{-2}$ $C_8$ $2.8137 \times 10^{-3}$
$C_{10}$ $1.9066 \times 10^{-2}$ $C_{11}$ $-4.4282 \times 10^{-3}$ $C_{13}$ $-7.5164 \times 10^{-3}$
$C_{15}$ $8.9010 \times 10^{-4}$ Displacement and tilt(1)

| X | 0.00 | Y | 0.00 | Z | 0.00 |
|---|---|---|---|---|---|
| α | 0.00 | β | 0.00 | γ | 0.00 |

Displacement and tilt(2)

| X | 0.00 | Y | 0.00 | Z | 0.50 |
|---|---|---|---|---|---|
| α | 0.00 | β | 0.00 | γ | 0.00 |

Displacement and tilt(3)

| X | 0.00 | Y | (Variable) | Z | 0.90 |
|---|---|---|---|---|---|
| α | 0.00 | β | 0.00 | γ | 0.00 |

Displacement and tilt(4)

| X | 0.00 | Y | (Variable) | Z | 3.02 |
|---|---|---|---|---|---|
| α | −45.00 | β | 0.00 | γ | 0.00 |

Displacement and tilt(5)

| X | 0.00 | Y | (Variable) | Z | 3.02 |
|---|---|---|---|---|---|
| α | −90.00 | β | 0.00 | γ | 0.00 |

Displacement and tilt(6)

| X | 0.00 | Y | 2.66 | Z | 3.02 |
|---|---|---|---|---|---|
| α | −90.00 | β | 0.00 | γ | 0.00 |

Displacement and tilt(7)

| X | 0.00 | Y | 2.86 | Z | 3.02 |
|---|---|---|---|---|---|
| α | −90.00 | β | 0.00 | γ | −90.00 |

Displacement and tilt(8)

| X | 0.00 | Y | 4.54 | Z | 3.02 |
|---|---|---|---|---|---|
| α | −90.00 | β | −46.11 | γ | −90.00 |

Displacement and tilt(9)

| X | 1.98 | Y | 4.62 | Z | 3.02 |
|---|---|---|---|---|---|
| α | 90.00 | β | −84.31 | γ | 90.00 |

Displacement and tilt(10)

| X | 2.30 | Y | 4.63 | Z | 3.02 |
|---|---|---|---|---|---|
| α | 0.00 | β | −90.00 | γ | 0.00 |

Displacement and tilt(11)

| X | 2.60 | Y | 4.63 | Z | 3.02 |
|---|---|---|---|---|---|
| α | 0.00 | β | −90.00 | γ | 0.00 |

Displacement and tilt(12)

| X | 3.22 | Y | 4.63 | Z | 3.02 |
|---|---|---|---|---|---|
| α | 0.00 | β | −90.00 | γ | 0.00 |

(Variable displacement)

|  |  | Object distance | |
|---|---|---|---|
|  |  | Infinity | 300 mm |
| Displacement and tilt (3) | Y | 0.00 | −0.07 |
| Displacement and tilt (4) | Y | 0.00 | −0.07 |
| Displacement and tilt (5) | Y | 2.06 | 2.00 |

Next, the values of conditions (1) to (4) in Examples 1 to 10 are given.

| Condition | Ex. 1 | Ex. 2 | Ex. 3 | Ex. 4 | Ex. 5 | Ex. 6 | Ex. 7 |
|---|---|---|---|---|---|---|---|
| (1) | 0.01 | 0.03 | 0.03 | 0.00 | 0.00 | 0.28 | 0.00 |
|  | 0.68 | 0.69 | 0.69 | 0.14 | 0.16 | −1.08 | 0.16 |
|  | 1.46 | 1.48 | 1.53 |  |  | 0.83 |  |
|  |  |  |  |  |  | 1.35 |  |

-continued

| Condition | Ex. 1 | Ex. 2 | Ex. 3 | Ex. 4 | Ex. 5 | Ex. 6 | Ex. 7 |
|---|---|---|---|---|---|---|---|
| (2) | 0.00 | 0.01 | 0.01 | 0.00 | 0.00 | 0.10 | 0.00 |
| (3) | — | — | — | −0.37 | −0.39 | — | −0.31 |
| (4) | 3 | 3 | 3 | 2 | 2 | 4 | 2 |

| Condition | Example 8 | Example 9 | Example 10 |
|---|---|---|---|
| (1) | 0.01 | 0.01 | 0.00 |
|  | 0.69 | 0.66 | 0.17 |
|  | 1.39 | 1.38 |  |
| (2) | 0.00 | 0.00 | 0.00 |
| (3) | — | — | −0.34 |
| (4) | 3 | 3 | 3 |

While, in the above examples, one optical element (decentered prism) is located before, and after the stop, it is understood that a plurality of optical elements (decenterd prisms) may be located before and/or after the stop. When the optical element is a decentered prism, it is not limited to a decentered prism capable of one or two internal reflections such as those shown in FIGS. 2 to 11. For instance, various decentered prisms capable of one or more internal reflections could be used.

Some exemplary decentered prisms usable as the optical element are now explained with reference to normal ray tracing. Assume here that each decentered prism P acts as a prism to form an image of a distant object on an image plane 136 via a pupil 131. However, each decentered prism P could also be used as a dedentered prism P to form an object image on the side of the pupil 131 by way of light rays incident from the side of the image plane 136.

Figure 38:
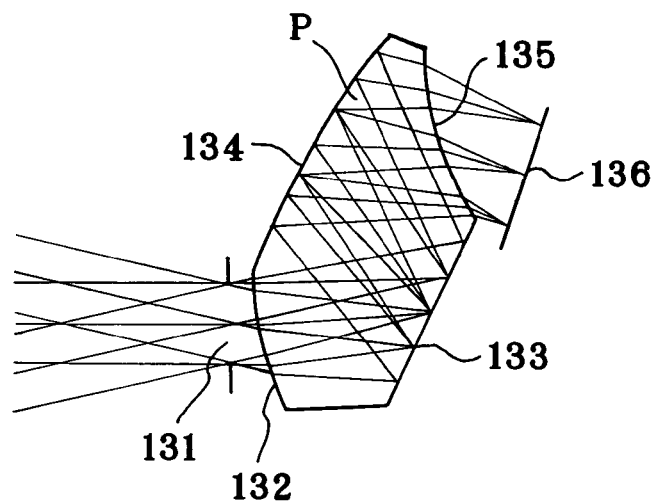
FIG. 38 is illustrative of one modification of the decentered prism.

Referring first to FIG. 38, a decentered prism P comprises a first surface 132, a second surface 133, a third surface 134 and a fourth surface 135. Incident light is incident through an entrance pupil 131 on the decentered prism P upon refracted through the first surface 132. Entering the decentered prism P, the light is internally reflected at the second surface 133 and then at the third surface 134 in such a way as to form a Z-shaped optical path. Finally, the light enters the fourth surface 135 through which it is refracted to form an image on an image plane 136.

Figure 39:
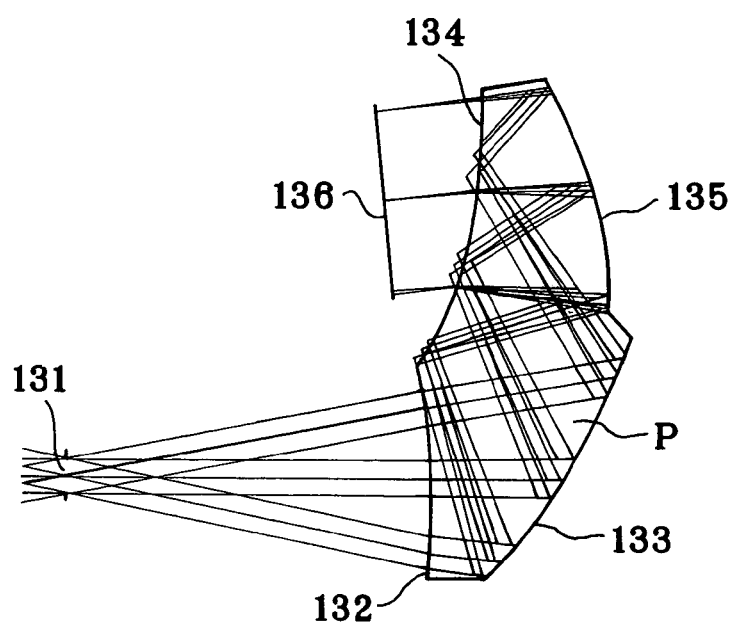
FIG. 39 is illustrative of another modification of the decentered prism.

Referring to FIG. 39, a decentered prism P comprises a first surface 132, a second surface 133, a third surface 134 and a fourth surface 135. Incident light is incident through an entrance pupil 131 on the decentered prism P upon refracted through the first surface 132. Entering the prism P, the light is internally reflected at the second surface 133 and then incident on the third surface 134 at which it is totally reflected. The reflected light is then incident on the fourth surface 135 at which it is internally reflected. Finally, the reflected light is again incident on the third surface 134 through which, this time, it is refracted to form an image on an image plane 136.

Figure 40:
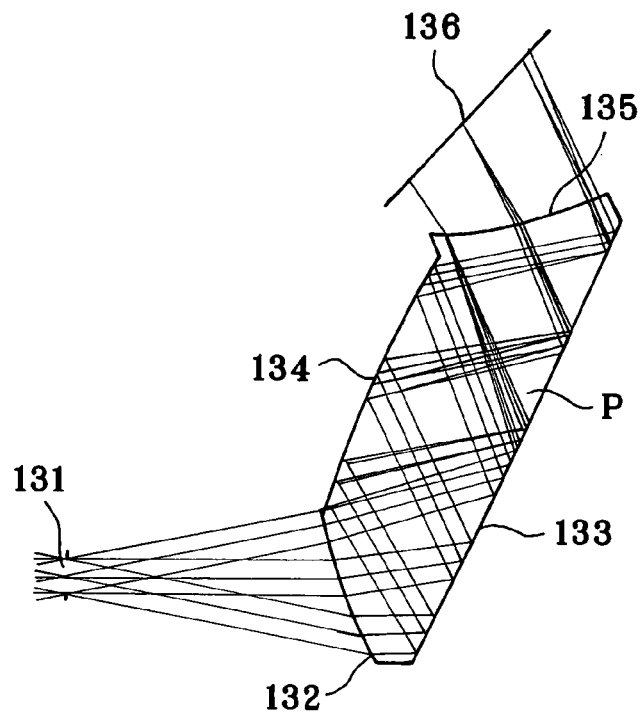
FIG. 40 is illustrative of yet another modification of the decentered prism.

Referring to FIG. 40, a decentered prism P comprises a first surface 132, a second surface 133, a third surface 134 and a fourth surface 135. Incident light is incident through an entrance pupil 131 on the decentered prism P upon refracted through the first surface 132. Entering the prism P, the light is internally reflected at the second surface 133 and then incident on the third surface 134 at which it is totally reflected. The reflected light reenters the second surface 133 at which it is internally reflected. Finally, the reflected light enters the fourth surface 135 through which it is refracted to form an image on an image plane 136.

Figure 41:
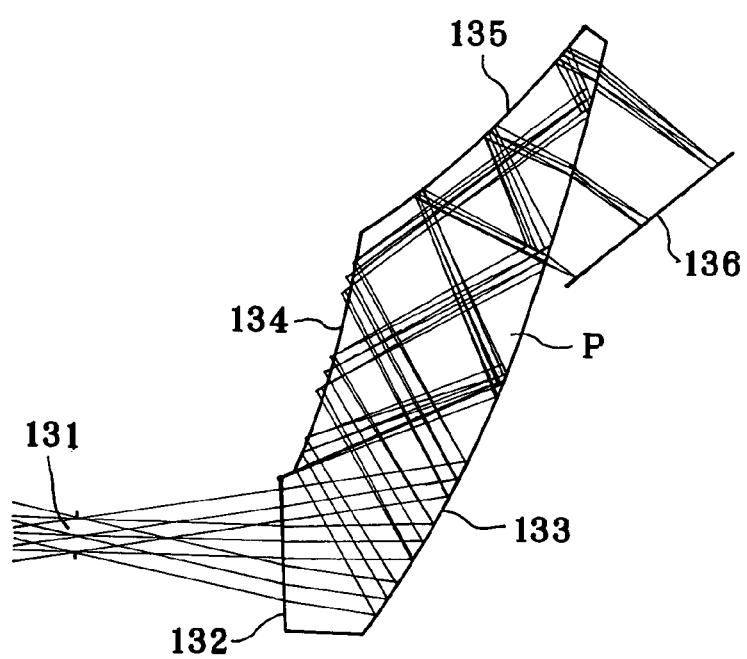
FIG. 41 is illustrative of a further modification of the decentered prism.

Referring to FIG. 41, a decentered prism P comprises a first surface 132, a second surface 133, a third surface 134 and a fourth surface 135. Incident light is incident through an entrance pupil 131 on the decentered prism P upon refracted through the first surface 132. Entering the decentered prism P, the light is internally reflected at the second surface 133 and then incident on the third surface 134 at which it is internally reflected. Subsequently, the light reenters the second surface 133 at which it is internally reflected, and the reflected light enters the fourth surface 135 at which it is internally reflected. Finally, the reflected light reenters the second surface 133 through which, this time, it is refracted to form an image on an image plane 136.

Figure 42:
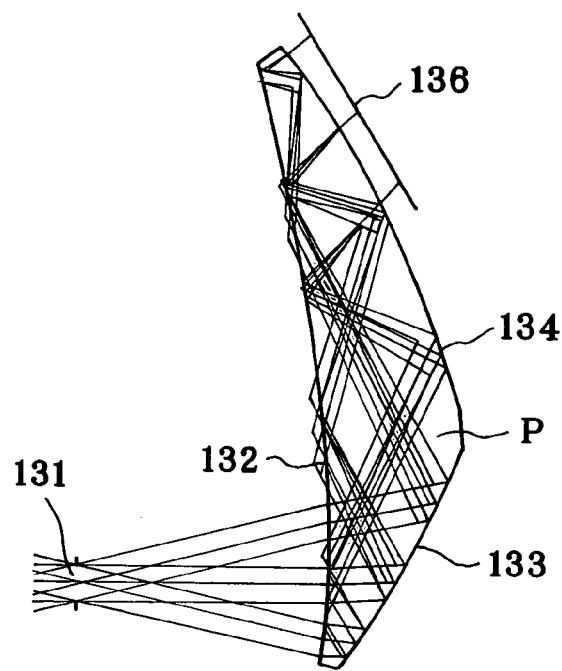
FIG. 42 is illustrative of a further modification of the decentered prism.

Referring to FIG. 42, a decentered prism P comprises a first surface 132, a second surface 133 and a third surface 134. Incident light is incident through an entrance pupil 131 on the decentered prism P upon refracted through the first surface 132. Entering the decentered prism P, the light is internally reflected at the second surface 133, reentering the first surface 132 at which, this time, it is totally reflected. Subsequently, the reflected light is internally reflected at the third surface 134, and again reenters the first surface 132 at which it is totally reflected. Finally, the reflected light reenters the third surface 134 through which, this time, it is refracted to form an image on an image plane 136.

Figure 43:
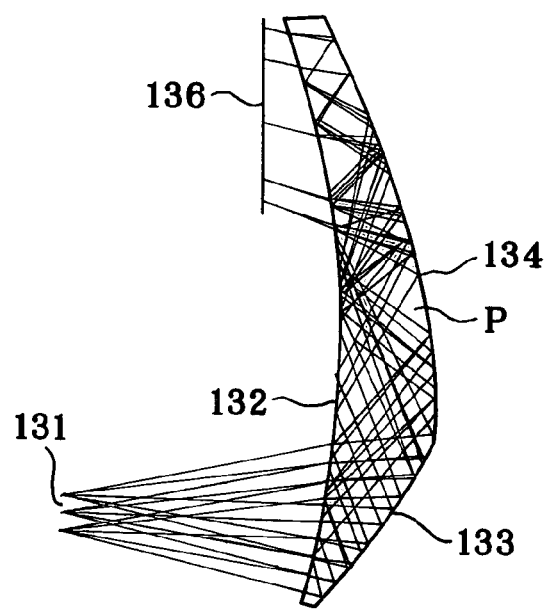
FIG. 43 is illustrative of a further modification of the decentered prism.

Referring to FIG. 43, a decentered prism P comprises a first surface 132, a second surface 133 and a third surface 134. Incident light is incident through an entrance pupil 131 on the decentered prism P upon refracted through the first surface 132. Entering the decentered prism P, the light is internally reflected at the second surface 133, reentering the first surface 132 at which, this time, it is totally reflected. Subsequently, the reflected light is internally reflected at the third surface 134, again reentering the first surface 132 at which it is totally reflected. Finally, the reflected light reenters the third surface 134 at which it is internally reflected, yet again reentering the first surface 132 through which it is now refracted to form an image on an image plane 136.

Figure 44:
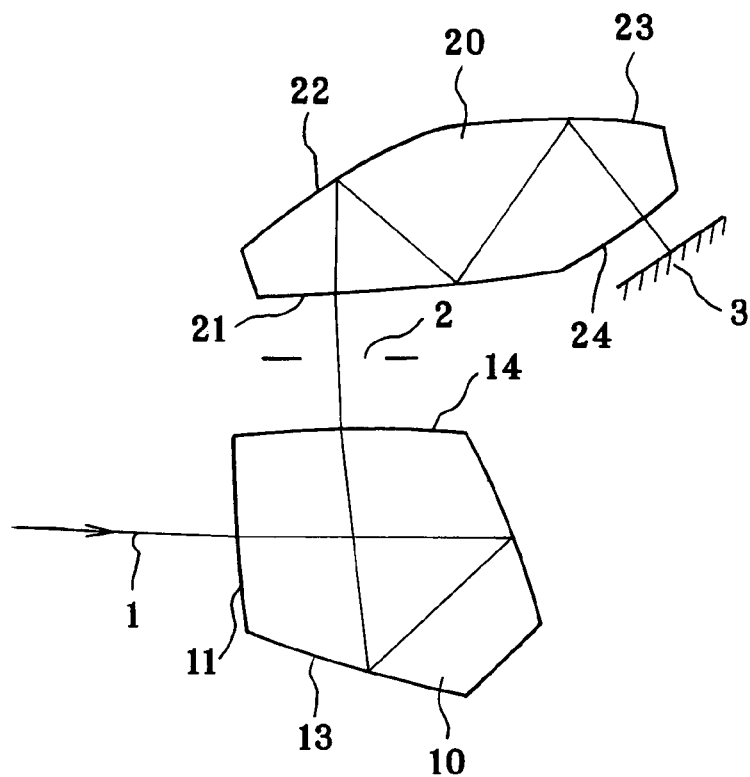
FIG. 44 is illustrative of another optical system of the invention, which comprises a combination of prisms different from that of Examples 1 to 10.

Further, it is acceptable to use a prism that comprises a first surface 21, a second surface 22, a third surface 23 and a fourth surface 24, and is capable of three internal reflections, for instance, a decentered prism 20 as shown in FIG. 44 to be referred to later. Alternatively, it is acceptable to use a prism that comprises a first surface 21, a second surface 22 and a third surface 23, and is capable of two internal reflections with the second surface 22 acting as a combined total reflection and exit surface, for instance, a decentered prism 20 shown in FIG. 45 to be referred to later. Yet alternatively, it is acceptable to use a prism that comprises a first surface 21, a second surface 22 and a third surface 23, and is capable of two internal reflections with the first surface 21 acting as a combined entrance and total reflection surface, for instance, a decentered prism 20 shown in FIG. 45 to be referred to later. Each of three such decentered prisms 20 could be used as the front optical element (decentered prism) or the rear optical element (decentered prism).

Some exemplary optical systems of the invention comprising a combination of optical elements (decentered prisms) different from those in Examples 1 to 10 are shown in FIGS. 44 to 47. However, specific numerical data are not omitted, and the decentered prism is simply called a prism. In the arrangements of FIGS. 44 to 47, a prism located on the image side with respect to a stop 2 should be rotated about 90° about an axial chief ray 1 relative to a prism located on the object side with respect to the stop 2. For a better understanding of illustration, however, the image-side prism is shown to be not rotated.

Referring to FIG. 44, a prism 10 is the same as in FIG. 7, and a prism 20 has a first surface 21, a second surface 22, a third surface 23 and a fourth surface 24 as optical function surfaces. The first surface 21 is a combined entrance and second reflecting surface; the second surface 22 is a first reflecting surface; the third surface 23 is a third reflecting surface; and the fourth surface 24 is an exit surface. Passing through the prism 10 and a stop 2, light transmits the entrance surface 21, arriving at the first reflecting surface 22 at which it is reflected and then totally reflected at the first surface 21. Subsequently, the reflected light is internally reflected at the third reflecting surface 23, transmitting the exit surface 24 to form an image on an image plane 3. Within the prism 20, light rays are internally reflected in such a way as to form an M-shaped optical path.

Figure 45:
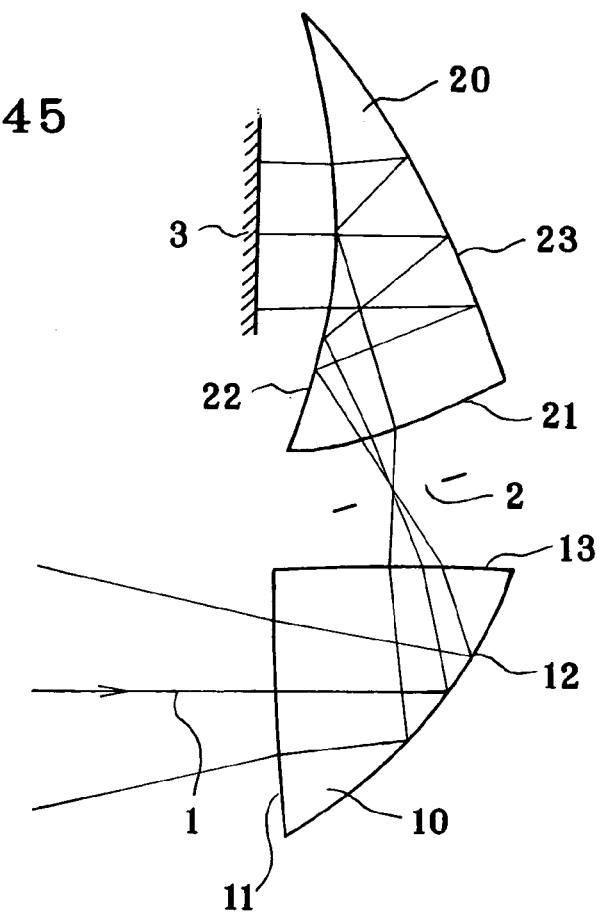
FIG. 45 is illustrative of yet another optical system of the invention, which comprises a combination of prisms different from that of Examples 1 to 10.

Referring to FIG. 45, a prism 10 is the same as in FIG. 2, and a prism 20 has a first surface 21, a second surface 22 and a third surface 23 as optical function surfaces. The first surface 21 is an entrance surface; the second surface 22 is a combined first reflecting and exit surface; and the third surface 23 is a second reflecting surface. Passing through the prism 10 and a stop 2, light rays transmit the entrance surface 21, arriving at the first reflecting surface 22 at which it is totally reflected. The reflected light is internally reflected at the second reflecting surface 23, and this time it transmits the second surface 22 to form an image on an image plane 3.

Figure 46:
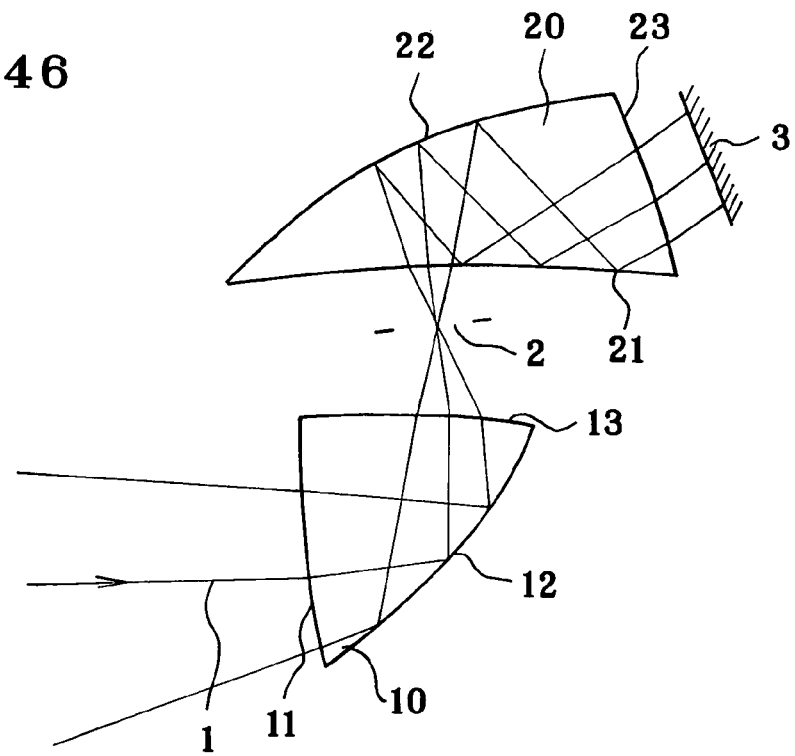
FIG. 46 is illustrative of a further optical system of the invention, which comprises a combination of prisms different from that of Examples 1 to 10.

Referring to FIG. 46, a prism 10 is the same as in FIG. 2, and a prism 20 has a first surface 21, a second surface 22 and a third surface 23 as optical function surfaces. The first surface 21 is a combined entrance and second reflecting surface; the second surface 22 is a first reflecting surface; and the third surface 23 is an exit surface. Passing through the front prism 10 and a stop 2, light rays transmit the entrance surface 21 for reflection at the first reflecting surface 22. This time, the reflected light is totally reflected at the first reflecting surface 21, transmitting the exit surface 23 to form an image on an image plane 3.

Figure 47:
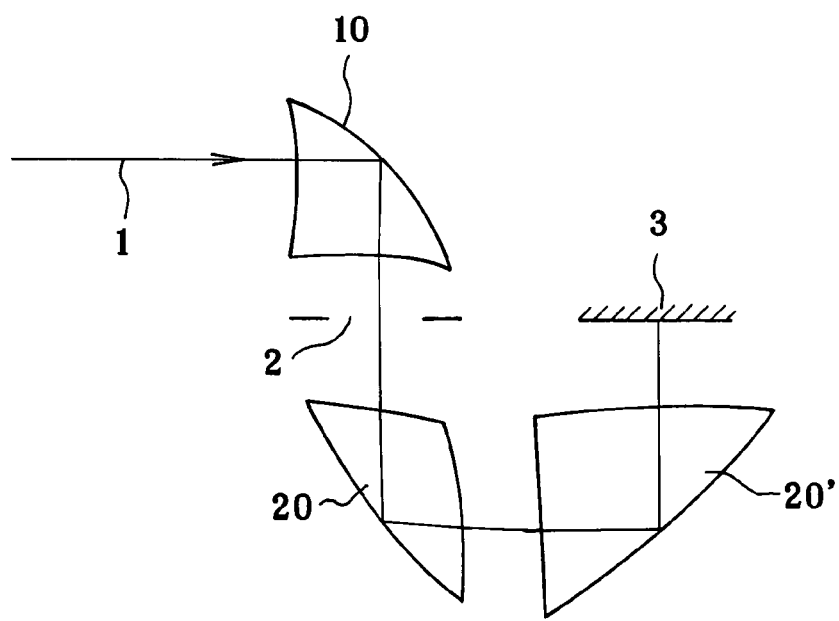
FIG. 47 is illustrative of a further optical system of the invention, which comprises a combination of prisms different from that of Examples 1 to 10.

FIG. 47 is illustrative of one exemplary construction of the optical system according to the invention. As shown in FIG. 47, one prism 10 is located in front of a stop 2, and two prisms 20, 20' are located in the rear of the stop 2. Any one of the prisms 10, 20, 20' is capable of one internal reflection.

The resinous material is used for the optical elements in Examples 1 to 10. Instead, however, an organic-inorganic composite material could be used. Organic-inorganic composite materials usable herein are now explained.

In an organic-inorganic composite material, an organic component and an inorganic component are mixed together into a composite material at a molecular level or a nano-scale. Some available forms include (1) a structure wherein a polymeric matrix comprising an organic skeleton and a matrix comprising an inorganic skeleton are entangled together and penetrated into each other, (2) a structure wherein inorganic fine particles (so-called nano-particles) much smaller than the wavelength of light on a nano-scale are uniformly dispersed throughout a polymeric matrix comprising an organic skeleton, and (3) a combined structure of both. Between the organic component and the inorganic component there are some interactions such as intermolecular forces, e.g., hydrogen bonds, dispersion forces and Coulomb force, attractive forces resulting from covalent bonds, ionic bonds and interaction of $\pi$ electron clouds, etc. In the organic-inorganic composite material, the organic component and the inorganic component are mixed together at a molecular level or at a scale level smaller than the wavelength of light. For this reason, that composite material provides a transparent material because of having little or no influence on light scattering. As can also be derived from Maxwell equation, the composite material possesses the optical characteristics of each of the organic and inorganic components. Therefore, the organic-inorganic composite material can have various optical properties (such as refractive index and chromatic dispersion) depending on the type and quantitative ratio of the organic and inorganic components present. Thus, it is possible to obtain various optical properties by blending together the organic and inorganic components at any desired ratio.

Some exemplary compositions of an organic-inorganic composite material comprising an acrylate resin (of the ultraviolet curable type) and nano-particles of zirconia ($ZrO_2$) are shown in Table 1; some exemplary compositions of an organic-inorganic composite material comprising an acrylate resin and nano-particles of zirconia ($ZrO_2$)/alumina ($Al_2O_3$) in Table 2; some exemplary composition of an organic-inorganic composite material comprising an acrylate resin and nano-particles of niobium oxide ($Nb_2O_5$) in Table 3; and some exemplary compositions of an acrylate resin and nano-particles of zirconium alkoxide/alumina ($Al_2O_3$) in Table 4.

TABLE 1

| Zirconia content | $n_d$ | $v_d$ | $n_C$ | $n_F$ | $n_g$ | Remarks |
|---|---|---|---|---|---|---|
| 0 | 1.49236 | 57.85664 | 1.48981 | 1.49832 | 1.50309 | 100% acrylic |
| 0.1 | 1.579526 | 54.85037 | 1.57579 | 1.586355 | 1.59311 | |
| 0.2 | 1.662128 | 53.223 | 1.657315 | 1.669756 | 1.678308 | |
| 0.3 | 1.740814 | 52.27971 | 1.735014 | 1.749184 | 1.759385 | |
| 0.4 | 1.816094 | 51.71726 | 1.809379 | 1.825159 | 1.836887 | |
| 0.5 | 1.888376 | 51.3837 | 1.880807 | 1.898096 | 1.911249 | |

TABLE 2

| Quantitative ratio of $Al_2O_3$ | Quantitative ratio of $ZrO_2$ | $n_d$ | $v_d$ | $n_C$ | $n_F$ | $n_g$ | Remarks |
|---|---|---|---|---|---|---|---|
| 0.1 | 0.4 | 1.831515 | 53.56672 | 1.824851 | 1.840374 | 1.851956 | 50% acrylate |
| 0.2 | 0.3 | 1.772832 | 56.58516 | 1.767125 | 1.780783 | 1.790701 | |
| 0.3 | 0.2 | 1.712138 | 60.97687 | 1.707449 | 1.719127 | 1.727275 | |
| 0.4 | 0.1 | 1.649213 | 67.85669 | 1.645609 | 1.655177 | 1.661429 | |
| 0.2 | 0.2 | 1.695632 | 58.32581 | 1.690903 | 1.702829 | 1.774891 | |

TABLE 3

| Content of $Nb_2O_5$ | Content of $Al_2O_3$ | $n_d$ | $v_d$ | $n_C$ | $n_F$ | $n_g$ |
|---|---|---|---|---|---|---|
| 0.1 | 0 | 1.589861 | 29.55772 | 1.584508 | 1.604464 | 1.617565 |
| 0.2 | 0 | 1.681719 | 22.6091 | 1.673857 | 1.70401 | 1.724457 |
| 0.3 | 0 | 1.768813 | 19.52321 | 1.758673 | 1.798053 | 1.8251 |
| 0.4 | 0 | 1.851815 | 17.80818 | 1.839583 | 1.887415 | 1.920475 |
| 0.5 | 0 | 1.931253 | 16.73291 | 1.91708 | 1.972734 | 2.011334 |

TABLE 4

| Content of $Al_2O_3$ (film) | Zirconia alkoxide | $n_d$ | $v_d$ | $n_C$ | $n_F$ |
|---|---|---|---|---|---|
| 0 | 0.3 | 1.533113 | 58.39837 | 1.530205 | 1.539334 |
| 0.1 | 0.27 | 1.54737 | 62.10192 | 1.544525 | 1.553339 |
| 0.2 | 0.24 | 1.561498 | 66.01481 | 1.558713 | 1.567219 |
| 0.3 | 0.21 | 1.575498 | 70.15415 | 1.572774 | 1.580977 |
| 0.4 | 0.18 | 1.589376 | 74.53905 | 1.586709 | 1.594616 |

Electronic equipment comprising such an inventive optical system as described above is now explained. Used for such electronic equipment is a taking unit wherein an object image formed through the above optical system is received by an image pickup device such as CCD or silver-halide film for taking. This image pickup unit could also be used as an optical unit using a small-format image pickup device, for instance, as an image pickup optical system in an endoscope. Alternatively, the image pickup unit could be used as a viewing unit designed to view an object image through an eyepiece lens, especially as an image pickup optical system in a camera.

The electronic equipment, for instance, includes digital cameras, video cameras, digital video units, information processors such as personal computers and mobile computers, telephone sets in general and easy-to-carry cellular phones in particular, personal digital assistants, and electronic endoscopes.

Figure 48:
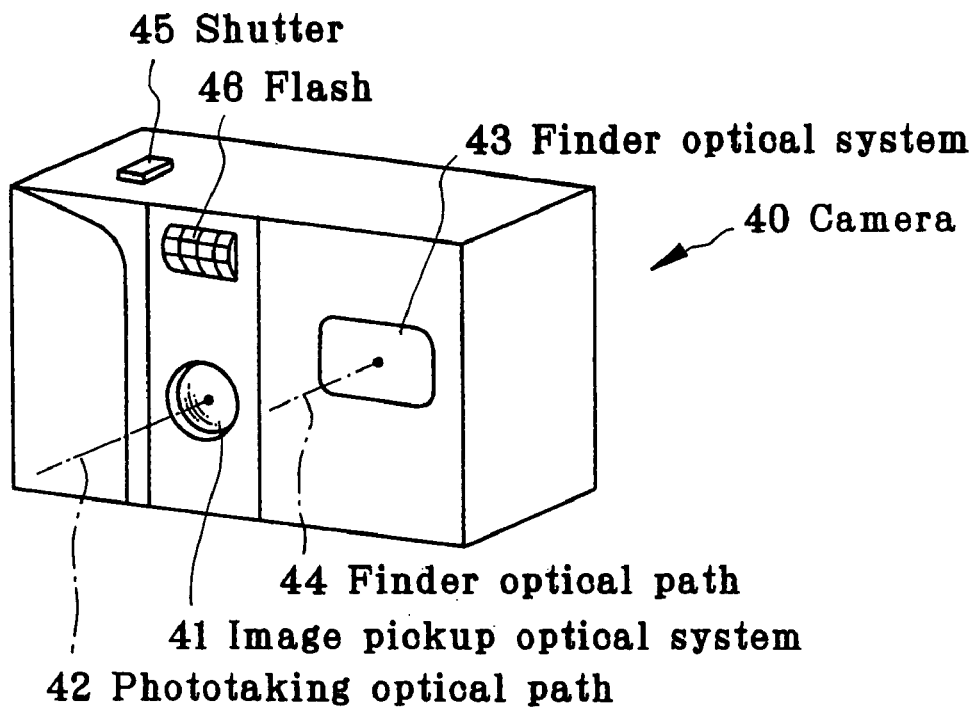
FIG. 48 is a front perspective view of an electronic camera to which the optical system of the invention is applied.
Figure 49:
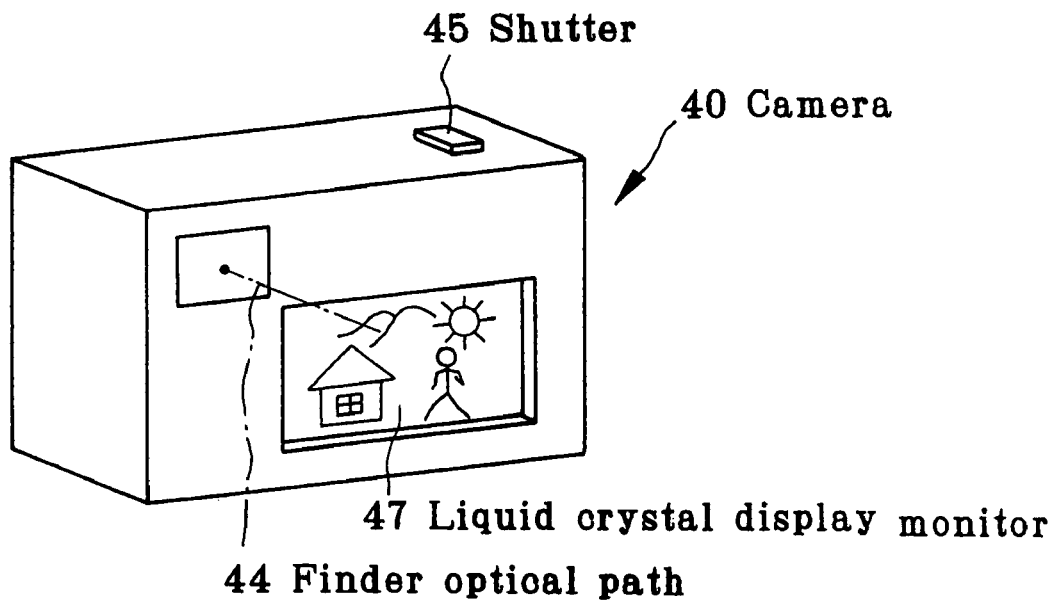
FIG. 49 is a rear perspective view of the electronic camera of FIG. 18.
Figure 50:
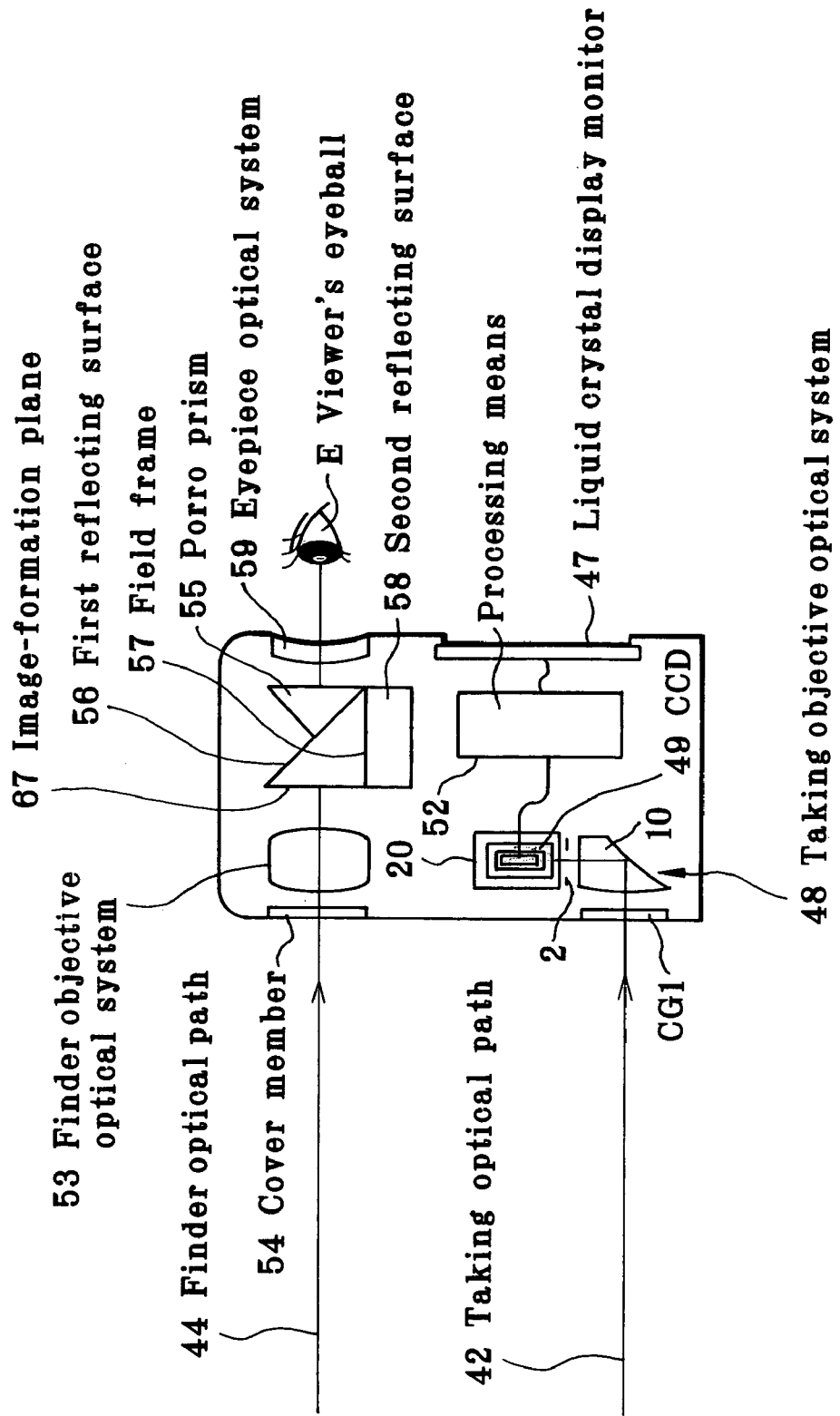
FIG. 50 is illustrative in section of the construction of the electronic camera of FIG. 48.

FIGS. 48, 49 and 50 are conceptual illustrations of an electronic camera, in which the optical system of the invention is incorporated as a taking objective optical system. FIG. 48 is a front perspective view of the outward appearance of an electronic camera 40, and FIG. 49 is a rear perspective view of the same. FIG. 50 is a sectional view of the construction of the electronic camera 40.

In this embodiment, the electronic camera 40 comprises a taking optical system 41 having a taking optical path 42, a finder optical system 43 having a finder optical path 44, a shutter 45, a flash 46, a liquid crystal monitor 47 and so on. As the user presses down the shutter 45 located on an upper portion of the camera 40, it causes taking to occur through a taking objective optical system 48.

On the taking optical path 42 there is located that taking objective optical system 48 that comprises a cover glass CG1, a front-group prism 10, an aperture stop 2 and a rear-group prism 20. Here the optical system of the invention is used for an optical system from the cover glass CG1 or the first prism 10 to the second prsim 20. An object image formed by the taking objective optical system 48 is formed on the image pickup plane of a CCD 49 via filters such as a low-pass filter and an infrared cut filter, not shown. The object image received at CCD 49 is shown as an electronic image on the liquid crystal monitor 47 via processing means 52, which monitor is mounted on the back of the camera. This processing means 52 may have a memory or the like therein to record taken electronic images. It is here noted that the memory could be provided separately from the processing means 52 or, alternatively, it could be constructed in such a way that images are electronically recorded and written thereon by means of floppy discs or the like. This camera could also be constructed in the form of a silver-halide camera using a silver-halide film in place of CCD 49.

Moreover, a finder objective optical system 53 is located on the finder optical path 44 with a cover member 54 located between them. An object image formed by that finder objective optical system 53 on an image-formation plane 67 is in turn formed on a field frame 57, which is attached to a Porro prism 55 that is an image-erecting member. Here, the field frame 57 is interposed between the first reflecting surface 56 and the second reflecting surface 58 of the Porro prism 55. In the rear of the Porro prism 55 there is located an eyepiece optical system 59 for guiding an erected image into the eyeball E of a viewer.

In the thus assembled camera 40, the taking objective optical system 48 can be set up with fewer optical elements in a compact, slimmed-down fashion. This, in turn, permits the camera itself to be reduced in size and thickness, and is favorable in view of design because of an increased degree of flexibility in where in the camera it is located.

Figure 51:
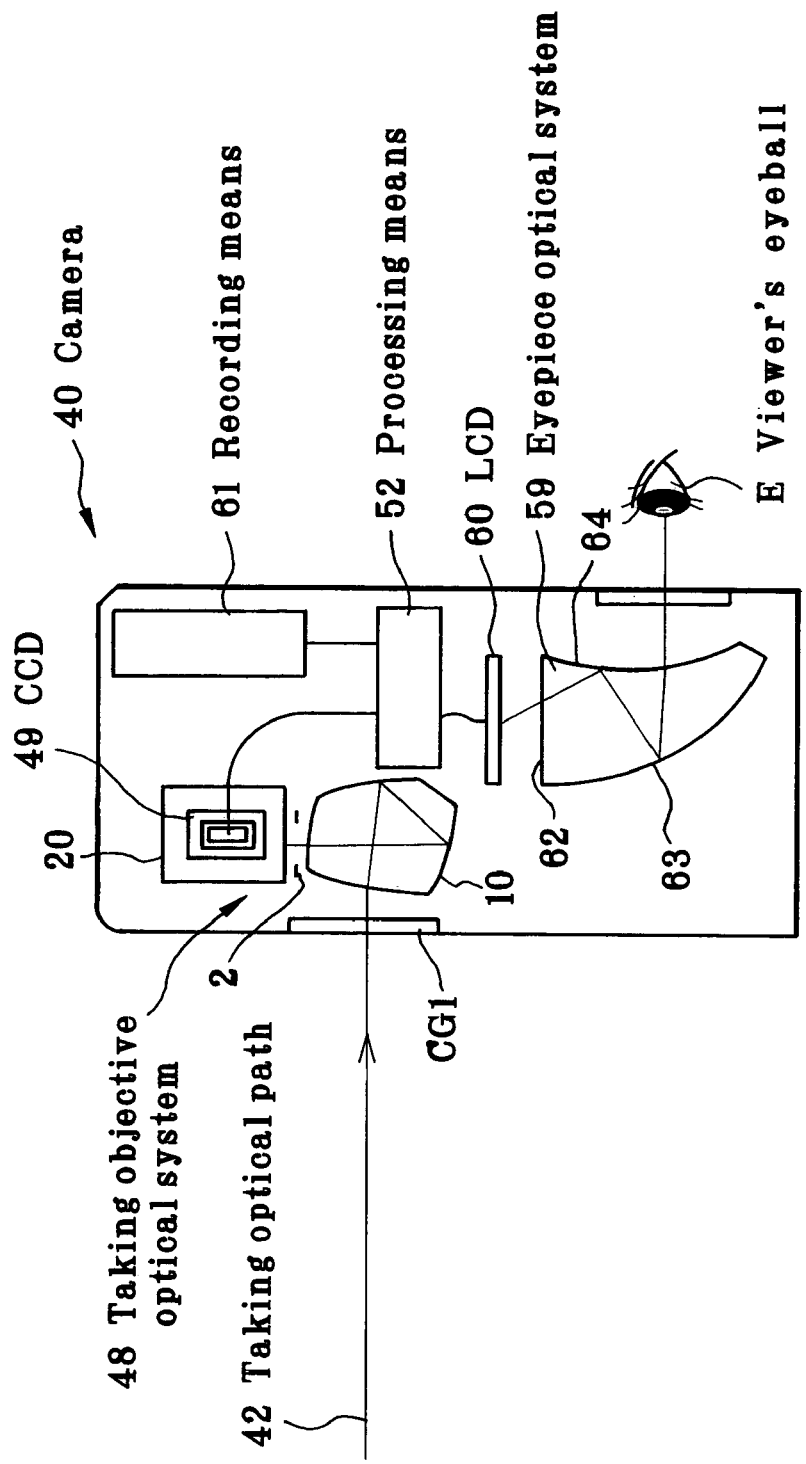

FIG. 51 is illustrative in conception of another embodiment of the electronic camera 40, in which the optical system of the invention is incorporated in the objective optical system 48 that is a taking portion of the camera 40. In this arrangement, the inventive optical system comprising a cover glass CG1, a front prism 10, an aperture stop 2 and a rear prism 20 is used for the taking objective optical system 45 located on a taking optical path 42.

An object image formed by the taking objective optical system 48 is formed on the image pickup plane of a CCD 49 via filters such as a low-pass filter and an infrared cut filter, not shown. The object image received at CCD 49 is shown as an electronic image on a liquid crystal display device (LCD) 60 via processing means 52 that also controls recording means 61. It is here noted that the recording means 61 is provided to record the object image taken by CCD 49 in the form of electronic information. The image appearing on LCD 60 is guided to the eyeball E of a viewer via an eyepiece optical system 59.

This eyepiece optical system 59 comprises a decentered prism that is herein composed of three surfaces, i.e., an entrance surface 62, a reflecting surface 63 and a combined reflection and refraction surface 64. At least one or preferably both of the two surfaces 63 and 64 having reflecting action are composed of a free-form surface symmetric with respect to plane, which has only one symmetric plane that gives power to light beams and corrects decentration aberrations. The taking objective optical system 48 could further comprise other lenses (positive lens and negative lens) on the object or image side of the prisms 10, 20 or between them.

In the thus assembled camera 40, the taking objective optical system 48 can be set up with fewer optical elements in a compact, slimmed-down fashion. This, in turn, permits the camera itself to be reduced in size and thickness, and is favorable in view of design because of an increased degree of flexibility in where in the camera it is located.

Figure 52:
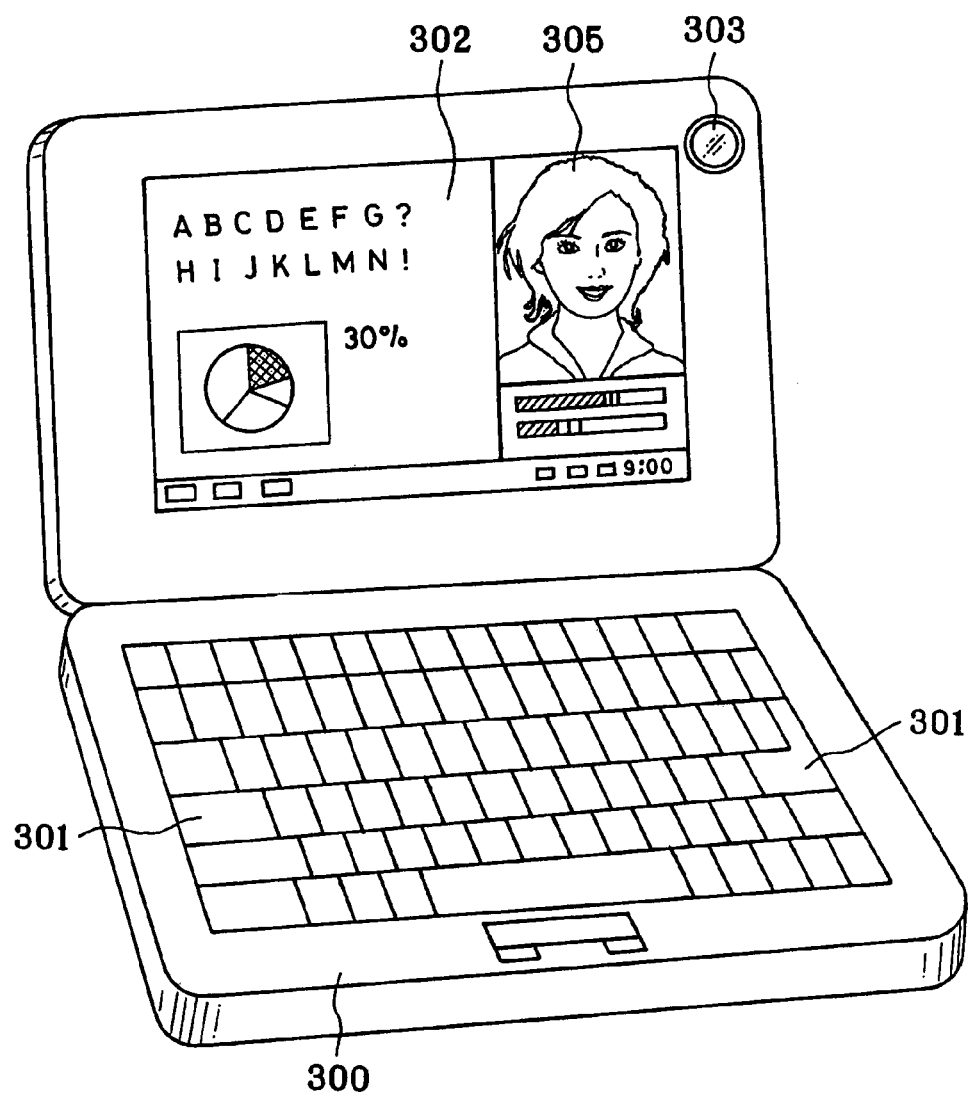
FIG. 52 is a front perspective view of a personal computer with a cover opened, in which the optical system of the invention is built as an objective optical system.
Figure 53:
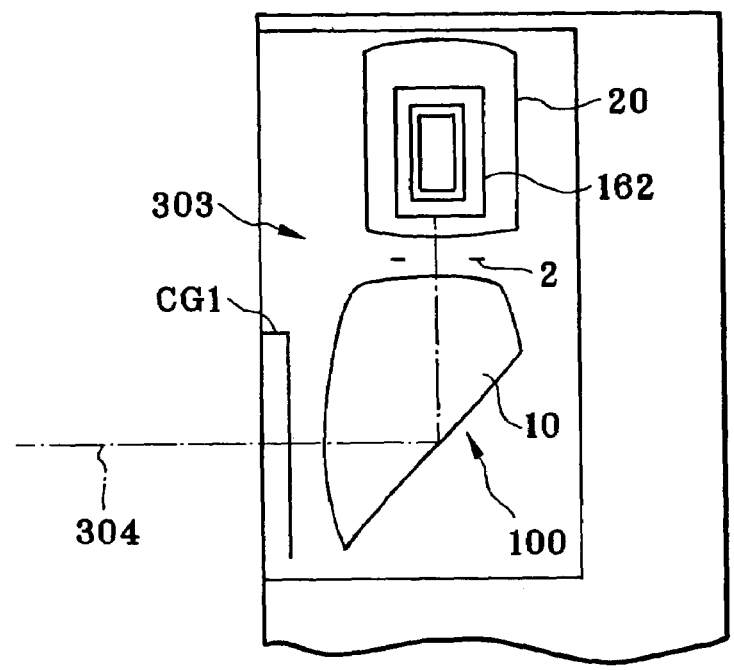
FIG. 53 is a sectional view of a taking optical system in the personal computer.
Figure 54:
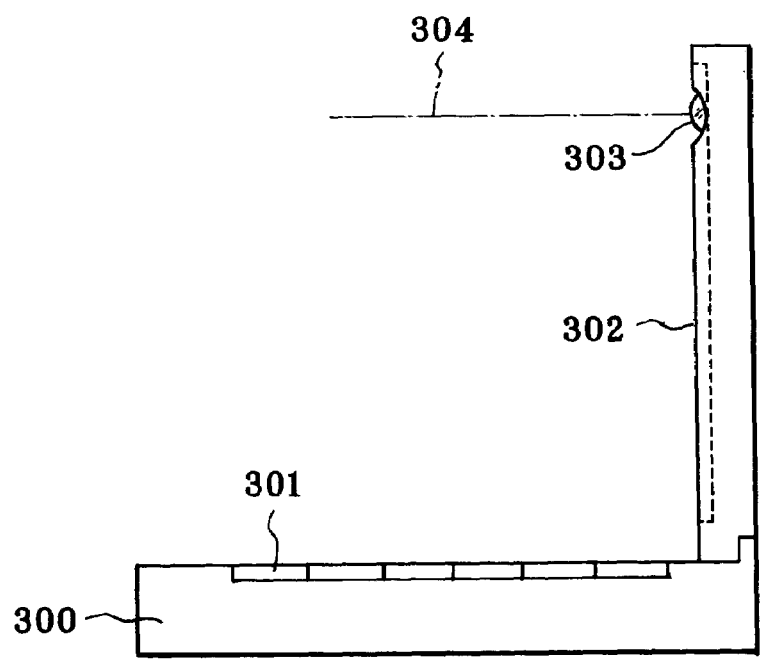
FIG. 54 is a side view of the setting shown in FIG. 52.

FIGS. 52, 53 and 54 are illustrative of a personal computer that is one example of the information processor in which the optical system of the invention is built.

FIG. 52 is a front perspective view of a personal computer 300 in use with a cover put up, FIG. 53 is a side view of a phototaking optical system 303 in the personal computer 300, and FIG. 54 is a side view of the state of FIG. 52. As shown in FIGS. 52, 53 and 54, the personal computer 300 comprises a keyboard 301, information processing means and recording means, a monitor 302 and a taking optical system 303.

Here the keyboard 301 is provided for the operator to enter information from the outside in the computer. The information processing means and recording means are not shown. The monitor 302 could be any one of a transmission type liquid crystal display device illuminated from its back surface by a backlight (not shown), a reflection type liquid crystal display device designed to display images by reflection of light coming from the front, a CRT display or the like. The taking optical system 303 is provided for taking an image of the operator and surrounding images. While the taking optical system 303 is shown as being built in the upper-right portion of the monitor 302, it is understood that it is not limited thereto; it could be located somewhere around the monitor 302 or keyboard 301.

This taking optical system 303 comprises, on a taking optical path 304, an objective optical system 100 comprising the optical system of the invention and an image pickup device chip 162 for receiving an image. These are built in the personal computer 300. An object image received at the image pickup device chip 162 is entered via a terminal in processing means of the personal computer 300, and shown as an electronic image on the monitor 302. As an example, an image 305 taken of the operator is shown in FIG. 52. This image 305 could be transmitted to and shown on a personal computer on the other end via suitable processing means and the Internet or telephone line.

FIGS. 55(*a*), 55(*b*) and 55(*c*) are illustrative of a telephone set that is another example of the information processor in which the optical system of the invention is built, especially a convenient-to-carry cellular phone.

FIG. 55(*a*) and FIG. 55(*b*) are a front view and a side view of a cellular phone 400, respectively, and FIG. 55(*c*) is a sectional view of a taking optical system 405. As shown in FIGS. 55(*a*), 55(*b*) and 55(*c*), the cellular phone 400 comprises a microphone 401, a speaker 402, an input dial 403, a monitor 404, a taking optical system 405, an antenna 406, and processing means (not shown).

Here the microphone 401 is to enter the voice of the operator as information in the computer, and the speaker 402 is to produce the voice of the person on the other end. The input dial 403 is for the operator to enter information in the computer. The monitor 404 is to show the images taken of the operator per se or the person on the other end and indicate information such as a telephone number. A liquid crystal display is used as the monitor 404. The antenna 406 is to transmit and receive communications waves. The processor means is to process image information, communications information, input signals, etc. It is here noted that the components or their positions are not limited to those shown.

The taking optical system 405 comprises an objective optical system 100 comprising the optical system of the invention and an image pickup device chip 162 for receiving an object image. Here the optical system of the invention is used for the objective optical system 100, and these are built in the cellular phone 400. An object image received at the image pickup device chip 162 is entered via a terminal in processing means (not shown), so that the object image can be displayed as an electronic image on the monitor 404 and/or a monitor at the other end. The processing means also includes a signal processing function for converting information about the object image received at the image pickup device chip 162 into transmittable signals, thereby sending the image to the person at the other end.

Figure 56A:
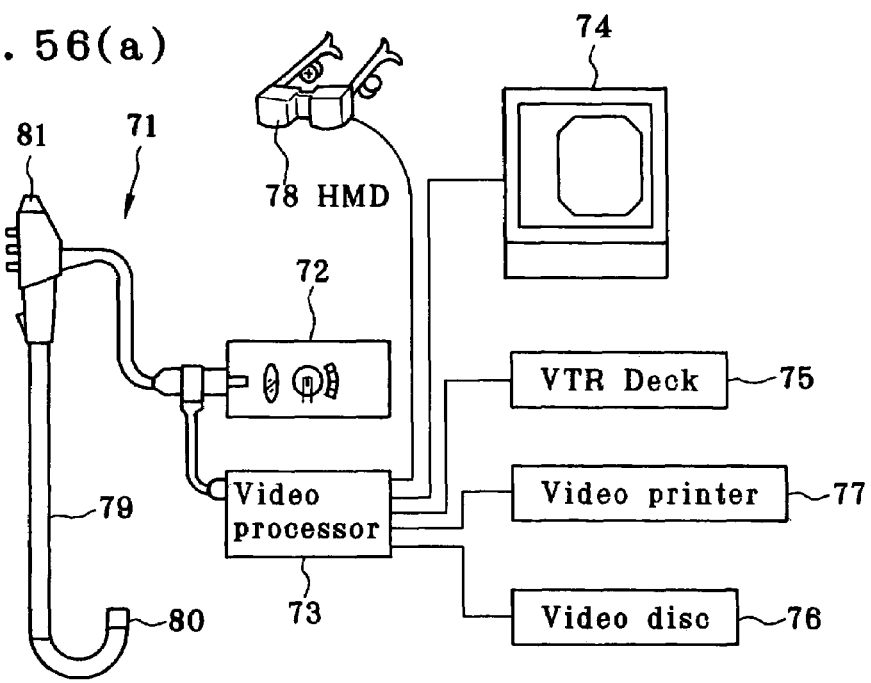
FIG. 56(a) is a system architecture view of an electronic endoscope to which the optical system of the invention is applied.
Figure 56B:
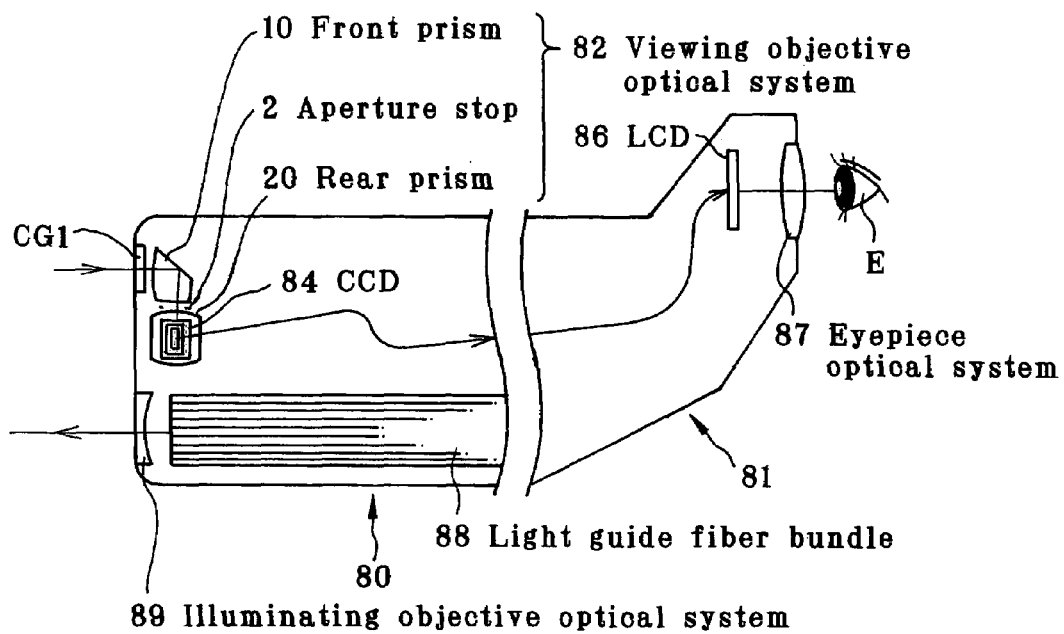
FIG. 56(b) is illustrative in conception of the optical system.

Referring then to FIGS. 56(*a*) and 56(*b*), they are illustrative in conception of an objective optical system 82 in a viewing system of an electronic endoscope, in which the optical system of the invention is built.

As depicted in FIG. 56(*a*), this electronic endoscope comprises an electronic endoscope 71, a light source unit 72 for supplying illumination light thereto, a video processor 73, a monitor 74, a VTR deck 75, a video disc 76, a video printer 77 and a head-mounted image display (HMD) 78. The video processor 73 is to process signals corresponding to the electronic endoscope 71; the monitor 74 is to display thereon image signals produced out of the video processor 73; the VTR deck 75 and video disc 76 are connected to the video processor 73 to record image signals, etc.; and the video printer 77 is to print out image signals as images.

In the electronic endoscope 71, an end portion of an insert 79 and its eyepiece portion 81 are set up as shown in FIG. 56(*b*). A light beam emanating from the light source unit 72 is guided through a light guide fiber bundle 88 to illuminate a site under observation via an illumination objective optical system 89. Light from that site is guided through a cover glass CG1 to a viewing objective optical system 82 comprising the optical system of the invention to thereby form an image as an object image. This object image is formed on the image pickup plane of a CCD 84 via filters such as a low-pass filter and an infrared cut filter, not shown. Further, the object image is converted into image signals by CCD 84, which are directly shown on the monitor 74 by means of the video processor 73 shown in FIG. 54(*a*).

The image signals are recorded in the VTR deck 75 and video disc 76, or otherwise they are printed out of the video printer 77. The image signals are also displayed on the image display device of HMD 78 on the wearer. At the same time, the image signals converted by CCD 84 are shown as an electronic image on the liquid crystal display (LCD) 86 of the eyepiece portion 81. Then, the displayed image is guided to the eyeball E of the viewer via an eyepiece optical system 87.

This endoscope can be set up with a reduced number of optical members yet with high performance and at low costs.

Figure 57:
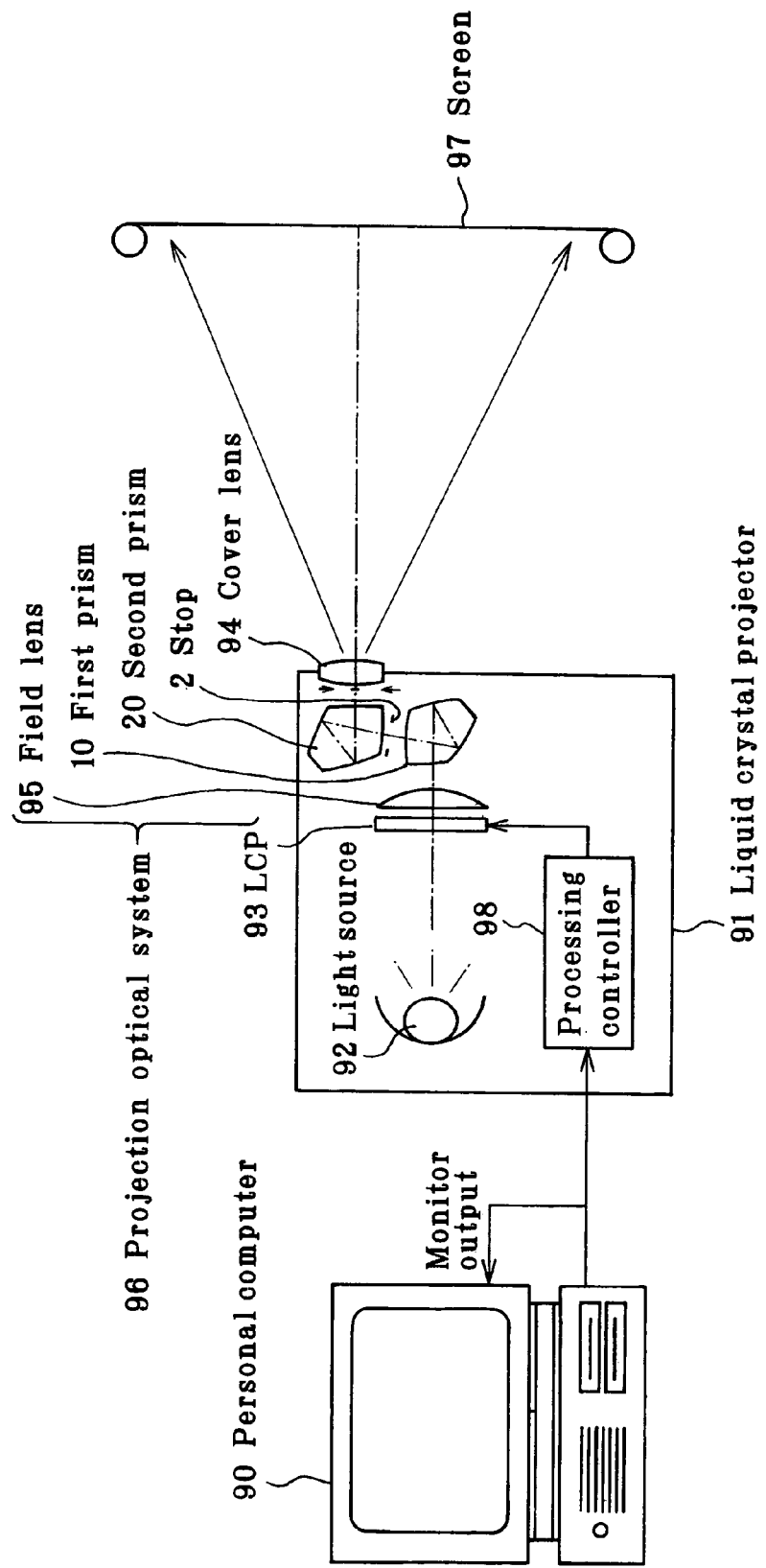
FIG. 57 is illustrative in conception of a presentation system to which the optical system of the invention is applied.

The optical system of the invention could also be used as a projection optical system. FIG. 57 is illustrative in conception of a presentation system set up using a personal computer 90 and a liquid crystal projector 91 in combination. In FIG. 57, the optical system of the invention is used for a projection optical system 96 of the liquid crystal projector 91. More specifically, the projection optical system 96 is set up with the optical system of the invention comprising a first prism 10, an aperture stop 2 and a second prism 20. In an actual application, the prism 10 should be located on the side of a liquid crystal panel (LCP) 93 with respect to the stop 2, and the prism 20 located on the projection side with respect to the stop 2 should be at a position rotated about 90° about an axial chief ray 1; however, it is located while not rotated for a better understanding of illustration. In other words, a screen 97 must be located in front of, or in the rear of, the paper and parallel therewith.

In FIG. 57, image/input data created on the personal computer 90 are branched out of a monitor output to a processing controller 98 of the liquid crystal projector 91. At that processing controller 98, the input data are processed and sent out to the liquid crystal panel (LCP) 93. On the liquid crystal panel 93, an image corresponding to the input image data is shown. After the amount of transmission of light from a light source 92 is determined depending on the gradation of the image appearing on the liquid crystal panel 93, that light is projected onto the screen 97 via the projection optical system 96 comprising a field lens 95 located just before the liquid crystal panel 93; the first prism 10, aperture stop 2 and second prism 20 that form the optical system of the invention; and a cover lens 94 that is a positive lens.

This projector can be set up with a reduced number of optical members yet with high performance and compactness and at low cost.

What we claim is:

1. An optical system comprising:
    a stop,
    an object-side reflecting surface located on an object side of the optical system with respect to said stop,
    an image-side reflecting surface located on an image side of the optical system with respect to said stop, and
    an image pickup device, wherein:
    said object-side reflecting surface and said image-side reflecting surface are each located obliquely to an optical axis of the optical system,
    said object-side reflecting surface and said image-side reflecting surface are located such that a reference plane for said object-side reflecting surface and a reference plane for said image-side reflecting surface cross at any angle wherein when an axial chief ray is defined by a light ray propagating from a center of an object to a center of an image through a center of the stop, the reference plane for each reflecting surface is given by a plane defined by an entrance-side axial chief ray and a reflection-side axial chief ray regarding each reflecting surface, and
    said object-side reflecting surface and said image-side reflecting surface have a rotationally asymmetric aspheric shape.

2. An optical system, comprising:
    a stop,
    at least two reflecting surfaces located obliquely to an optical axis of the optical system,
    a rotationally asymmetric aspheric refracting surface, and
    an image pickup device, wherein:
    each of said at least two reflecting surfaces has a rotationally asymmetric aspheric shape,
    one of said at least two reflecting surfaces and another reflecting surface are located such that a reference plane for said one reflecting surface and a reference plane for said another reflecting surface cross at any angle wherein when an axial chief ray is defined by a light ray propagating from a center of an object to a center of an image through a center of the stop, the reference plane for each reflecting surface is given by a plane defined by an entrance-side axial chief ray and a reflection-side axial chief ray regarding each reflecting surface, and
    all reflecting surfaces having said rotationally asymmetric aspheric shape satisfy condition (1):

$$-5 < Rry/Rrx < 5 \qquad (1)$$

where Rry is a radius of curvature of each reflecting surface in a line-of-intersection direction, and Rrx is a radius of curvature of each reflecting surface in a direction vertical to the line-of-intersection direction with the proviso that a line of intersection with each of said at least two reflecting surfaces is defined by a line of intersection of each reflecting surface with the reference plane.

3. An optical system, comprising:
    a stop,
    at least two reflecting surfaces located obliquely to an optical axis of the optical system, rotationally asymmetric aspheric refracting surfaces, and
    an image pickup device, wherein:
    said at least two reflecting surfaces have a rotationally asymmetric aspheric shape,
    one of said at least two reflecting surfaces and another reflecting surface are located such that a reference plane for said one reflecting surface and a reference plane for said another reflecting surface cross at any angle wherein when an axial chief ray is defined by a light ray propagating from a center of an object to a center of an image through a center of the stop, the reference plane for each reflecting surface is given by a plane defined by an entrance-side axial chief ray and a reflection-side axial chief ray regarding each reflecting surface, and
    an object-side reflecting surface of said reflecting surfaces, located nearest to an object side of the optical system, has a rotationally asymmetric aspheric shape, and
    said object-side reflecting surface satisfies condition (2):

$$-0.5 < 1/(Rr1x \cdot P1y) < 0.5 \qquad (2)$$

where Rr1x is a radius of curvature of said object-side reflecting surface in a direction vertical to a line-of-intersection direction regarding said object-side reflecting surface, and P1y is a power of the optical system in said line-of-intersection direction regarding said object-side reflecting surface with the proviso that a line of intersection regarding said object-side reflecting surface is defined by a line of intersection of said object-side reflecting surface with the reference plane.

4. An optical system, comprising:
a stop,
at least two reflecting surfaces located obliquely to an optical axis of the optical system,
rotationally asymmetric aspheric refracting surfaces, and
an image pickup device, wherein:
said at least two reflecting surfaces have a rotationally asymmetric aspheric shape,
one of said at least two reflecting surfaces and another reflecting surface are located such that a reference plane for said one reflecting surface and a reference plane for said another reflecting surface cross at any angle wherein when an axial chief ray is defined by a light ray propagating from a center of an object to a center of an image through a center of the stop, the reference plane for each reflecting surface is given by a plane defined by an entrance-side axial chief ray and a reflection-side axial chief ray regarding each reflecting surface, and
an object-side refracting surface of said rotationally asymmetric aspheric refracting surfaces, located nearest to an object side of the optical system, satisfies condition (3):

$$-3<1/(Rt1y \cdot P2y)<0 \quad (3)$$

where Rt1y is a radius of curvature of said object-side refracting surface in a line-of-intersection direction regarding said object-side refracting surface, and P2y is a power of the optical system in said line-of-intersection direction regarding said object-side refracting surface with the proviso that a line of intersection regarding said object-side refracting surface is defined by a line of intersection of said object-side refracting surface with a reference plane for a reflecting surface of said reflecting surfaces, located nearest to the object side of the optical system.

5. The optical system according to claim 1, wherein all reflecting surfaces having a rotationally asymmetric aspheric shape in said reflecting surfaces satisfy condition (1):

$$-5<Rry/Rrx<5 \quad (1)$$

where Rry is a radius of curvature of each reflecting surface in a line-of-intersection direction, and Rrx is a radius of curvature of each reflecting surface in a direction vertical to the line-of-intersection direction with the proviso that a line of intersection regarding each of said reflecting surfaces is defined by a line of intersection of each reflecting surface with the reference plane.

6. The optical system according to claim 1, wherein said reflecting surface located nearest to the object side of the optical system has a rotationally asymmetric aspheric shape and satisfies condition (2):

$$-0.5<1/(Rr1x \cdot P1y)<0.5 \quad (2)$$

where Rr1x is a radius of curvature of said reflecting surface located nearest to the object side in a direction vertical to a line-of-intersection direction regarding said reflecting surface located nearest to the object side, and P1y is a power of the optical system in said line-of-intersection direction regarding said reflecting surface located nearest to the object side with the proviso that a line of intersection regarding each reflecting surface is defined by a line of intersection of each reflecting surface with the reference plane.

7. The optical system according to claim 1, wherein there is provided at least one rotationally asymmetric aspheric refracting surface wherein a line of intersection regarding each reflecting surface is defined by a line of intersection of each reflecting surface with the reference plane, and
an object-side refracting surface, defined by a reflecting surface located nearest to the object side in said rotationally asymmetric aspheric refracting surfaces, satisfies condition (3):

$$-3<1/(Rt1y \cdot P2y)<0 \quad (3)$$

where Rt1y is a radius of curvature of said object-side refracting surface in a line-of-intersection direction regarding said object-side refracting surface, and P2y is a power of the optical system in said line-of-intersection direction regarding said object-side refracting surface with the proviso that a line of intersection regarding said object-side refracting surface is defined by a line of intersection of said object-side refracting surface with a reference plane for a reflecting surface of said reflecting surfaces, located nearest to the object side of the optical system.

8. The optical system according to claim 7, wherein all reflecting surfaces and all refracting surfaces have a rotationally asymmetric aspheric shape.

9. The optical system according to claim 1, wherein at least one optical element located on the object side of the optical system with respect to said stop comprises at least one reflecting surface and at least two refracting surfaces.

10. The optical system according to claim 1, wherein at least one optical element located on the image side of the optical system with respect to said stop comprises at least one reflecting surface and at least two refracting surfaces.

11. The optical system in any one of claim 9 or 10, wherein focusing is carried out by movement of said at least one optical element.

12. The optical system according to claim 1, wherein focusing is carried out by movement of at least said image pickup device.

13. The optical system according to claim 1, wherein said stop is located substantially vertically to an image pickup plane of said image pickup device.

14. The optical system according to claim 1, wherein the respective reflecting surfaces are located such that a light beam is reflected on a line of intersection of the object-side reflecting surface of said reflecting surfaces, located nearest to the object side of the optical system, with the reference plane for said object-side reflecting surface to form an image substantially in a short-side direction of said image pickup device, and
a light beam is reflected on a line of intersection of the image-side reflecting surface of said reflecting surfaces, located nearest to the image side of the optical system, with the reference plane for said image-side reflecting surface to form an image substantially in a long-side direction of said image pickup device.

15. The optical system according to claim 1, wherein a total number of reflections satisfies condition (4):

$$2 \leq R_{a11} \leq 4 \quad (4)$$

where $R_{a11}$ is the total number of reflections.

16. The optical system according to claim 1, which further comprises a light shield member interposed between said reflecting surfaces.

17. The optical system according to claim 16, wherein said light shield member is integral with said stop.

18. The optical system according to claim 1, which comprises at least one lens.

19. The optical system according to claim 18, wherein said at least one lens is located on an image side of the optical system with respect to all said reflecting surfaces.

20. The optical system according to claim 18, wherein upon taking, said at least one lens is mounted on an object side of the optical system with respect to all said reflecting surfaces.

21. The optical system according to claim 1, wherein an organic-inorganic composite material is used as an optical material for at least one optical element that forms a part of the optical system.

22. The optical system according to claim 21, wherein said organic-inorganic composite material comprises nanoparticles of zirconia.

23. The optical system according to claim 21, wherein said organic-inorganic composite material comprises nanoparticles of a niobium oxide.

24. The optical system according to claim 21, wherein said organic-inorganic composite material comprises nanoparticles of a hydrolysate of zirconium alkoxide, and alumina.

25. Electronic equipment, which comprises the optical system according to claim 1.

26. The electronic equipment according to claim 25, which comprises a means for electrical correction of a shape of an image formed through said optical system.

27. The electronic equipment according to claim 26, wherein said correction uses a parameter that differs for each wavelength region.

28. The optical system according to claim 2, wherein said one reflecting surface is located on the object side of the optical system with respect to said stop, and said another reflecting surface is located on the image side of the optical system with respect to said stop.

* * * * *